(12) United States Patent
Wilson et al.

(10) Patent No.: US 10,362,219 B2
(45) Date of Patent: Jul. 23, 2019

(54) AVATAR CREATION AND EDITING

(71) Applicant: Apple Inc., Cupertino, CA (US)

(72) Inventors: Christopher Wilson, San Francisco, CA (US); Guillaume Barlier, San Mateo, CA (US); Sebastian Bauer, San Francisco, CA (US); Elizabeth Caroline Cranfill, San Francisco, CA (US); Aurelio Guzman, San Jose, CA (US); Tiffany S. Jon, Sunnyvale, CA (US); Behkish J. Manzari, San Francisco, CA (US); Nicole R. Ryan, San Francisco, CA (US); Nicolas Scapel, Sunnyvale, CA (US); Marco Triverio, San Francisco, CA (US); Marcel Van Os, San Francisco, CA (US); Giancarlo Yerkes, Manlo Park, CA (US)

(73) Assignee: Apple Inc., Cupertino, CA (US)

( * ) Notice: Subject to any disclaimer, the term of this patent is extended or adjusted under 35 U.S.C. 154(b) by 104 days.

(21) Appl. No.: 15/713,490

(22) Filed: Sep. 22, 2017

(65) Prior Publication Data
US 2018/0091732 A1 Mar. 29, 2018

Related U.S. Application Data

(60) Provisional application No. 62/399,294, filed on Sep. 23, 2016.

(51) Int. Cl.
*G06T 7/20* (2017.01)
*G06T 7/70* (2017.01)
(Continued)

(52) U.S. Cl.
CPC ......... *H04N 5/23222* (2013.01); *G06F 3/048* (2013.01); *G06F 3/0488* (2013.01);
(Continued)

(58) Field of Classification Search
CPC .......... H04N 5/23216; H04N 5/23219; H04N 5/23222; H04N 5/23293; G06F 3/048;
(Continued)

(56) References Cited

U.S. PATENT DOCUMENTS 6,351,556 B1 2/2002 Loui et al.
6,606,411 B1 8/2003 Loui et al.
(Continued)

FOREIGN PATENT DOCUMENTS

CN 101196786 A 6/2008
CN 101291409 A 10/2008
(Continued)

OTHER PUBLICATIONS

PC world, "How to make AR Emojis on the Samsung Galaxy S9", You Tube, Available Online: https://www.youtube.com/watch?v=8wQlCfulkz0, Feb. 25, 2018, 2 pages.
(Continued)

*Primary Examiner* — Christopher S Kelley
*Assistant Examiner* — Asmamaw G Tarko
(74) *Attorney, Agent, or Firm* — Dentons US LLP

(57) ABSTRACT

The present disclosure generally relates to creating and editing user avatars. In some examples, guidance is provided to a user while capturing image data for use in generating a user-specific avatar. In some examples, a user interface allows a user to intuitively customize a user avatar. In some examples, avatars are generated for a messaging session based on an avatar model for a user of the messaging application. In some examples, an avatar editing interface updates a user avatar in response to gestures and based on the type of gesture and the avatar feature that is selected for editing.

13 Claims, 42 Drawing Sheets

(51) Int. Cl.
*H04N 5/232* (2006.01)
*G06F 3/048* (2013.01)
*G06F 3/0488* (2013.01)
*G06F 3/0484* (2013.01)
*G06K 9/00* (2006.01)
*G06T 13/40* (2011.01)
*G06T 19/20* (2011.01)

(52) U.S. Cl.
CPC ............ *G06F 3/04845* (2013.01); *G06T 7/20* (2013.01); *G06T 7/70* (2017.01); *H04N 5/23219* (2013.01); *H04N 5/23293* (2013.01); *G06K 9/00268* (2013.01); *G06T 13/40* (2013.01); *G06T 19/20* (2013.01); *G06T 2207/30196* (2013.01); *G06T 2207/30244* (2013.01); *H04N 5/23216* (2013.01)

(58) Field of Classification Search
CPC .............. G06F 3/0488; G06F 3/04845; G06K 9/00268; G06T 7/70; G06T 7/20; G06T 13/40; G06T 19/20; G06T 2207/30196; G06T 2207/30244
USPC ........................................................ 348/158
See application file for complete search history.

(56) References Cited

U.S. PATENT DOCUMENTS

| | | |
|---|---|---|
| 6,915,011 B2 | 7/2005 | Loui et al. |
| 7,180,524 B1 | 2/2007 | Axelrod |
| 7,227,976 B1 | 6/2007 | Jung et al. |
| 7,325,198 B2 | 1/2008 | Adcock et al. |
| 7,421,449 B2 | 9/2008 | Williams et al. |
| 7,636,733 B1 | 12/2009 | Rothmuller |
| 7,680,340 B2 | 3/2010 | Luo et al. |
| 7,716,194 B2 | 5/2010 | Williams et al. |
| 7,747,625 B2 | 6/2010 | Gargi et al. |
| 7,788,592 B2 | 8/2010 | Williams et al. |
| 7,831,100 B2 | 11/2010 | Gallagher |
| 7,843,454 B1 | 11/2010 | Biswas |
| 7,908,554 B1 | 3/2011 | Blattner |
| 7,991,234 B2 | 8/2011 | Hamasaki et al. |
| 8,028,249 B2 | 9/2011 | Loui et al. |
| RE43,260 E | 3/2012 | Paalasmaa et al. |
| 8,169,438 B1 | 5/2012 | Baraff et al. |
| 8,200,669 B1 | 6/2012 | Iampietro et al. |
| 8,295,546 B2 | 10/2012 | Craig et al. |
| 8,352,471 B2 | 1/2013 | Oami |
| 8,406,473 B2 | 3/2013 | Tanaka |
| 8,571,331 B2 | 10/2013 | Cifarelli |
| 8,896,652 B2 | 11/2014 | Ralston |
| 9,042,646 B2 | 5/2015 | Das et al. |
| 9,094,576 B1 | 7/2015 | Karakotsios |
| 9,123,086 B1 | 9/2015 | Freeland et al. |
| 9,143,601 B2 | 9/2015 | Padmanabhan et al. |
| 9,153,031 B2 | 10/2015 | El-Saban et al. |
| 9,207,837 B2 | 12/2015 | Paretti et al. |
| 9,230,241 B1 | 1/2016 | Singh et al. |
| 9,264,660 B1 | 2/2016 | Petterson et al. |
| 9,286,546 B2 | 3/2016 | O'Malley et al. |
| 9,349,414 B1 | 5/2016 | Furment et al. |
| 9,411,506 B1 * | 8/2016 | Prado ................ G06F 3/04883 |
| 9,448,708 B1 | 9/2016 | Bennett et al. |
| 9,602,559 B1 | 3/2017 | Barros et al. |
| 9,628,416 B2 | 4/2017 | Henderson |
| 9,686,497 B1 | 6/2017 | Terry |
| 2002/0168108 A1 | 11/2002 | Loui et al. |
| 2003/0033296 A1 | 2/2003 | Rothmuller et al. |
| 2004/0019640 A1 | 1/2004 | Bartram et al. |
| 2004/0125150 A1 | 7/2004 | Adcock et al. |
| 2005/0044066 A1 | 2/2005 | Hooper et al. |
| 2005/0076056 A1 | 4/2005 | Paalasmaa et al. |
| 2005/0128305 A1 | 6/2005 | Hamasaki et al. |
| 2005/0134945 A1 | 6/2005 | Gallagher |
| 2005/0195221 A1 | 9/2005 | Berger et al. |
| 2006/0036960 A1 | 2/2006 | Loui |
| 2006/0090141 A1 | 4/2006 | Loui et al. |
| 2006/0155757 A1 | 7/2006 | Williams et al. |
| 2006/0156237 A1 | 7/2006 | Williams et al. |
| 2006/0156245 A1 | 7/2006 | Williams et al. |
| 2006/0156246 A1 | 7/2006 | Williams et al. |
| 2006/0188144 A1 | 8/2006 | Sasaki et al. |
| 2007/0008321 A1 | 1/2007 | Gallagher et al. |
| 2007/0245236 A1 | 10/2007 | Lee |
| 2008/0052242 A1 | 2/2008 | Merritt et al. |
| 2008/0091637 A1 | 4/2008 | Escamilla et al. |
| 2008/0152201 A1 | 6/2008 | Zhang et al. |
| 2008/0256577 A1 | 10/2008 | Funaki et al. |
| 2008/0298571 A1 | 12/2008 | Kurtz et al. |
| 2009/0006965 A1 | 1/2009 | Bodin et al. |
| 2009/0027337 A1 | 1/2009 | Hildreth |
| 2009/0063542 A1 | 3/2009 | Bull et al. |
| 2009/0113350 A1 | 4/2009 | Hibino et al. |
| 2009/0144173 A1 | 6/2009 | Mo et al. |
| 2009/0202114 A1 | 8/2009 | Morin et al. |
| 2009/0210793 A1 | 8/2009 | Yee et al. |
| 2009/0216806 A1 | 8/2009 | Feuerstein et al. |
| 2009/0297022 A1 | 12/2009 | Pettigrew et al. |
| 2009/0300513 A1 | 12/2009 | Nims et al. |
| 2009/0319472 A1 | 12/2009 | Jain et al. |
| 2009/0325701 A1 | 12/2009 | Andres Del Valle |
| 2010/0045828 A1 | 2/2010 | Gallagher |
| 2010/0114891 A1 | 5/2010 | Oami |
| 2010/0124941 A1 | 5/2010 | Cho |
| 2010/0150456 A1 | 6/2010 | Tanaka |
| 2010/0188426 A1 | 7/2010 | Ohmori et al. |
| 2010/0277470 A1 | 11/2010 | Margolis |
| 2010/0287053 A1 | 11/2010 | Ganong et al. |
| 2011/0007174 A1 | 1/2011 | Bacivarov et al. |
| 2011/0050564 A1 | 3/2011 | Alberth et al. |
| 2011/0072394 A1 | 3/2011 | Victor et al. |
| 2011/0099199 A1 | 4/2011 | Stalenhoef et al. |
| 2011/0099478 A1 | 4/2011 | Gallagher et al. |
| 2011/0126148 A1 | 5/2011 | Krishnaraj et al. |
| 2011/0145275 A1 | 6/2011 | Stewart |
| 2011/0221755 A1 | 9/2011 | Geisner et al. |
| 2011/0248992 A1 | 10/2011 | Van et al. |
| 2011/0249073 A1 | 10/2011 | Cranfill et al. |
| 2011/0252344 A1 | 10/2011 | Van Os |
| 2011/0267368 A1 | 11/2011 | Casillas et al. |
| 2011/0282867 A1 | 11/2011 | Palermiti, Ii et al. |
| 2011/0304632 A1 | 12/2011 | Evertt et al. |
| 2012/0079378 A1 | 3/2012 | Goossens |
| 2012/0299945 A1 | 11/2012 | Aarabi |
| 2012/0309520 A1 | 12/2012 | Evertt et al. |
| 2013/0022282 A1 | 1/2013 | Cooper |
| 2013/0040660 A1 | 2/2013 | Fisher et al. |
| 2013/0135315 A1 | 5/2013 | Bares et al. |
| 2013/0145292 A1 | 6/2013 | Cohen et al. |
| 2013/0156275 A1 | 6/2013 | Amacker et al. |
| 2013/0159900 A1 | 6/2013 | Pendharkar |
| 2013/0198176 A1 | 8/2013 | Kim |
| 2013/0201104 A1 | 8/2013 | Ptucha et al. |
| 2014/0046914 A1 | 2/2014 | Das et al. |
| 2014/0064572 A1 | 3/2014 | Panzer et al. |
| 2014/0137013 A1 | 5/2014 | Matas |
| 2014/0143693 A1 * | 5/2014 | Goossens ............... G06Q 10/10 715/764 |
| 2014/0181089 A1 | 6/2014 | Desmond et al. |
| 2014/0198234 A1 | 7/2014 | Kobayashi et al. |
| 2014/0218371 A1 | 8/2014 | Du et al. |
| 2014/0222809 A1 | 8/2014 | Hochmuth et al. |
| 2014/0236882 A1 | 8/2014 | Rishe |
| 2014/0250126 A1 | 9/2014 | Baldwin et al. |
| 2014/0282011 A1 | 9/2014 | Dellinger et al. |
| 2014/0289222 A1 | 9/2014 | Sharpe et al. |
| 2014/0333671 A1 | 11/2014 | Phang et al. |
| 2014/0337324 A1 | 11/2014 | Chao et al. |
| 2014/0351720 A1 | 11/2014 | Yin |
| 2014/0368601 A1 | 12/2014 | deCharms |
| 2015/0005013 A1 | 1/2015 | Cao et al. |
| 2015/0078621 A1 | 3/2015 | Choi et al. |
| 2015/0078680 A1 | 3/2015 | Shakib et al. |

(56) References Cited

U.S. PATENT DOCUMENTS

| | | |
|---|---|---|
| 2015/0091896 A1 | 4/2015 | Tarquini et al. |
| 2015/0213604 A1* | 7/2015 | Li et al. ............... G06T 13/40 345/473 |
| 2015/0227611 A1 | 8/2015 | Bao et al. |
| 2015/0287162 A1 | 10/2015 | Canan et al. |
| 2016/0030844 A1 | 2/2016 | Nair et al. |
| 2016/0092035 A1 | 3/2016 | Crocker et al. |
| 2016/0092043 A1 | 3/2016 | Missig et al. |
| 2016/0140146 A1 | 5/2016 | Wexler et al. |
| 2016/0217601 A1 | 7/2016 | Tsuda et al. |
| 2016/0226926 A1 | 8/2016 | Singh et al. |
| 2016/0247309 A1 | 8/2016 | Li et al. |
| 2016/0259413 A1 | 9/2016 | Anzures et al. |
| 2016/0259497 A1 | 9/2016 | Bauer et al. |
| 2016/0259498 A1 | 9/2016 | Foss et al. |
| 2016/0259499 A1 | 9/2016 | Kocienda et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0267067 A1 | 9/2016 | Mays et al. |
| 2016/0328875 A1 | 11/2016 | Fang et al. |
| 2016/0370974 A1 | 12/2016 | Stenneth |
| 2017/0046065 A1 | 2/2017 | Zeng et al. |
| 2017/0083086 A1 | 3/2017 | Mazur et al. |
| 2017/0111616 A1 | 4/2017 | Li et al. |
| 2017/0140214 A1 | 5/2017 | Matas et al. |
| 2017/0164888 A1 | 6/2017 | Matsuda et al. |
| 2017/0206095 A1 | 7/2017 | Gibbs et al. |
| 2017/0244959 A1 | 8/2017 | Ranjeet et al. |
| 2017/0357382 A1 | 12/2017 | Miura et al. |
| 2018/0004404 A1 | 1/2018 | Delfino et al. |
| 2018/0047200 A1 | 2/2018 | O'hara et al. |
| 2018/0095649 A1 | 4/2018 | Valdivia et al. |
| 2018/0114543 A1 | 4/2018 | Novikoff |
| 2018/0165862 A1 | 6/2018 | Sawaki |
| 2018/0181668 A1 | 6/2018 | Zhang et al. |
| 2018/0189549 A1 | 7/2018 | Inomata |
| 2018/0191944 A1 | 7/2018 | Carbonell et al. |
| 2018/0268589 A1 | 9/2018 | Grant |
| 2018/0364872 A1 | 12/2018 | Miura et al. |

FOREIGN PATENT DOCUMENTS

| | | |
|---|---|---|
| CN | 101854278 A | 10/2010 |
| EP | 1592212 A1 | 11/2005 |
| EP | 3026636 A1 | 6/2016 |
| EP | 3051525 A1 | 8/2016 |
| EP | 3211587 A1 | 8/2017 |
| JP | 2000-112997 A | 4/2000 |
| JP | 2008-059614 A | 3/2008 |
| JP | 2008-236794 A | 10/2008 |
| JP | 2010-118056 A | 5/2010 |
| JP | 6240301 B1 | 11/2017 |
| JP | 6266736 B1 | 1/2018 |
| JP | 2018-106365 A | 7/2018 |
| WO | 2009/082814 A1 | 7/2009 |
| WO | 2009/150425 A2 | 12/2009 |
| WO | 2009/155991 A1 | 12/2009 |
| WO | 2010/059188 A2 | 5/2010 |
| WO | 2013/152453 A1 | 10/2013 |
| WO | 2016/045005 A1 | 3/2016 |
| WO | 2016/064435 A1 | 4/2016 |
| WO | 2016/101124 A1 | 6/2016 |
| WO | 2018/049430 A2 | 3/2018 |

OTHER PUBLICATIONS

Spellburst, "The Sims 3: Create A Sim With Me | #2—Dark Fairy + Full CC List!", Available online at: https://www.youtube.com/watch?v=Dy_5g9B-wkA, Oct. 9, 2017, 2 pages.

Office Action received for Danish Patent Application No. PA201670608, dated Jan. 14, 2019, 7 pages.

Kozak, Tadeusz, "When You're Video Chatting on Snapchat, How Do You Use Face Filters?", Quora, Online Available at: https://www.quora.com/When-youre-video-chatting-on-Snapchat-how-do-you-use-face-filters, Apr. 29, 2018, 1 page.

Lang, Brian, "How to Audio & Video Chat with Multiple Users at the Same Time in Groups", Snapchat 101, Online Available at: https://smartphones.gadgethacks.com/how-to/snapchat-101-audio-video-chat-with-multiple-users-same-time-groups-0184113/, Apr. 17, 2018, 4 pages.

Notice of Allowance received for U.S. Appl. No. 15/275,294, dated Jun. 6, 2018, 8 pages.

international Search Report and Written Opinion received for PCT Application No. PCT/US2017/049795, dated Dec. 27. 2017, 26 pages.

International Search Report and Written Opinion Received for PCT Patent Application No. PCT/US2017/035322, dated Oct. 5, 2017, 18 pages.

Invitation to Pay Additional Fees received for Pot Patent Application No. PCT/US2017/035322, dated Aug. 7, 2017, 4 pages.

Non-Final Office Action received for U.S. Appl. No. 15/275,294, dated Dec. 23. 2016, 16 pages.

Non-Final Office Action received for U.S. Appl. No. 15/275,294, dated Nov. 3, 2017, 29 pages.

Notice of Allowance received for U.S. Appl. No. 15/275,294, dated Jun. 30, 2017, 8 pages.

Search Report and opinion received for Danish Patent Application No. PA201670508, dated Jan. 3, 2017, 15 pages.

Search Report and Opinion received for Danish Patent Application No. PA201670609, dated Feb. 1, 2017, 11 pages.

Office Action received for Danish Patent Application No. PA201670608, dated Jan. 23, 2018, 10 pages.

Office Action received for Danish Patent Application No. PA201670609, dated Jan. 26, 2018, 8 pages.

Koti, Kotresh, "Colour with Asian Paints.A Mobail App by Android Application—2018", Available Online at <https://www.youtube.com/watch?v=M6EIO7ErYd0&feature=youtu.be&t=81>, May 6, 2018, 2 pages.

Slashgear, "Samsung AR Emoji demo on the Galaxy S9", Available Online at <https://www.youtube.com/watch?v=GQwNKzY4C9Y>, Feb. 25, 2018, 3 pages.

Chen et al., "Event Detection from Flickr Data through Wavelet-based Spatial Analysis", Proceeding of the 18th ACM Conference on Information and Knowledge Management, CIKM, 2009, pp. 523-532.

Das et al., "Event Classification in Personal Image Collections", IEEE Intl. Workshop on Media Information Analysis for Personal and Social Applications at ICME, 2009, pp. 1660-1663.

Das et al., "Event-based Location Matching for Consumer Image Collections", CIVR, Proc. of the ACM Int. Conf. on Image and Video Retrieval, 2008, 5 pages.

Gallagher et al., "Image Annotation Using Personal Calendars as Context", ACM. Intl. Conf. on Multimedia, 2008, 4 pages.

Han et al., "Density-Based Methods", Data Mining Concepts and Techniques, Elsevier, 2006, pp. 418-420.

International Search Report and Written Opinion received for PCT Patent Application No. PCT/US2011/048169, dated Oct. 21, 2011, 9 pages.

Liao, T. Warren., "Clustering of Time Series Data—a Survey", Pattern Recognition, vol. 38, 2005, pp. 1857-1874.

Marwan et al., "Generalised Recurrence Plot Analysis for Spatial Data", Physics Letters A, vol. 360, 2007, pp. 545-551.

Van Wijk et al., "Cluster and Calendar based Visualization of Time Series Data", IEEE Comput. Soc., 1999, 7 pages.

Brett, "How to Create Your AR Emoji on the Galaxy S9 and S9+", Available online at: <https://www.youtube.com/watch?v=HHMdcBpC8MQ>, Mar. 16, 2018, 5 pages.

Invitation to Pay Additional Fees received for PCT Patent Application No. PCT/US2017/049795, dated Nov. 3, 2017, 3 pages.

Office Action received for Danish Patent Application No. PA201670609, dated May 7, 2018, 4 pages.

International Preliminary Report on Patentability received for PCT Patent Application No. PCT/US2017/035322, dated Dec. 27, 2018, 13 pages.

(56) References Cited

OTHER PUBLICATIONS

Notice of Allowance received for Korean Patent Application No. 10-2018-7034875, dated Dec. 12, 2018, 4 pages (1 pages of English Translation and 3 pages of Official Copy).
Office Action received for Australian Patent Application No. 2017284958, dated Dec. 13, 2018, 3 pages.
Fedko, Daria, "AR Hair Styles", Online Available at <https://www.youtube.com/watch?v=FrS6tHRbFE0>, Jan. 24, 2017, 2 pages.
Hughes, Neil, "Apple Explores Merging Cloud Content with Locally Stored Media Library", available at <http://appleinsider.com/articles/11/02/10/apple_explores_merging_cloud_content_with_locally_stored_media_library.html>, Feb. 10, 2011, 4 pages.
"Here are Warez Files", Eve Online Character Creator, Available online at: <http://theherearewarezfiles.blogspot.com/2014/03/eve-online-character-creator-download.html>, Mar. 3, 2014, 7 pages.
International Preliminary Report on Patentability received for PCT Patent Application No. PCT/US2017/049795, dated Apr. 4, 2019, 16 pages.

\* cited by examiner

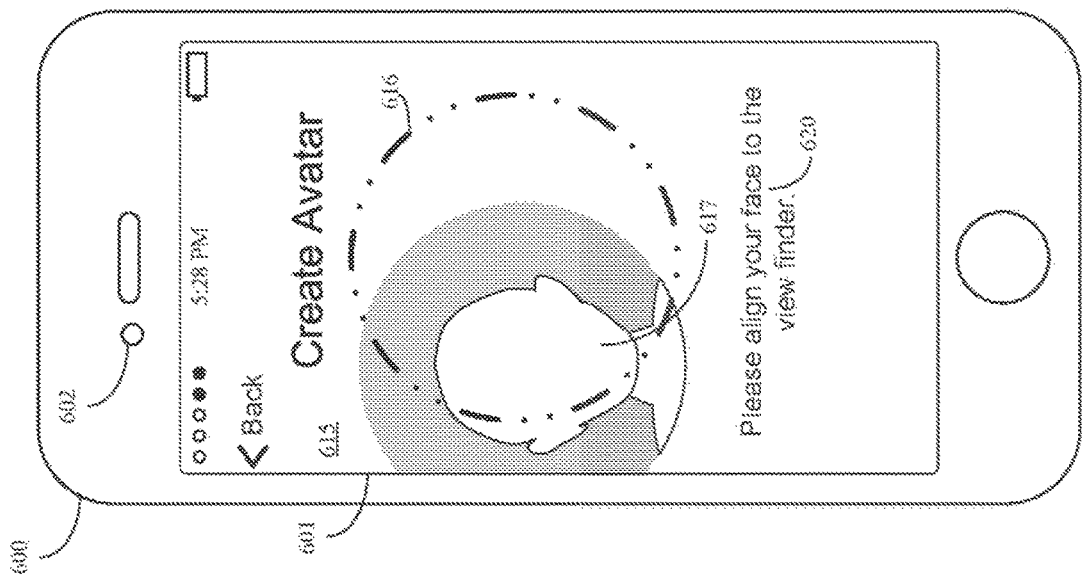

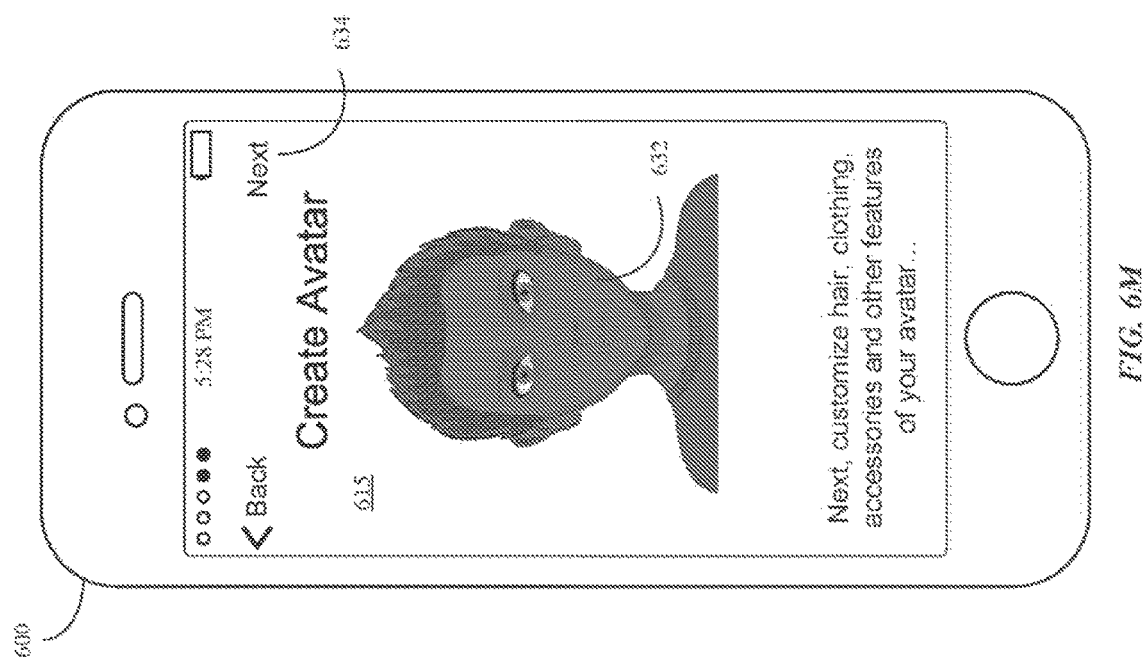

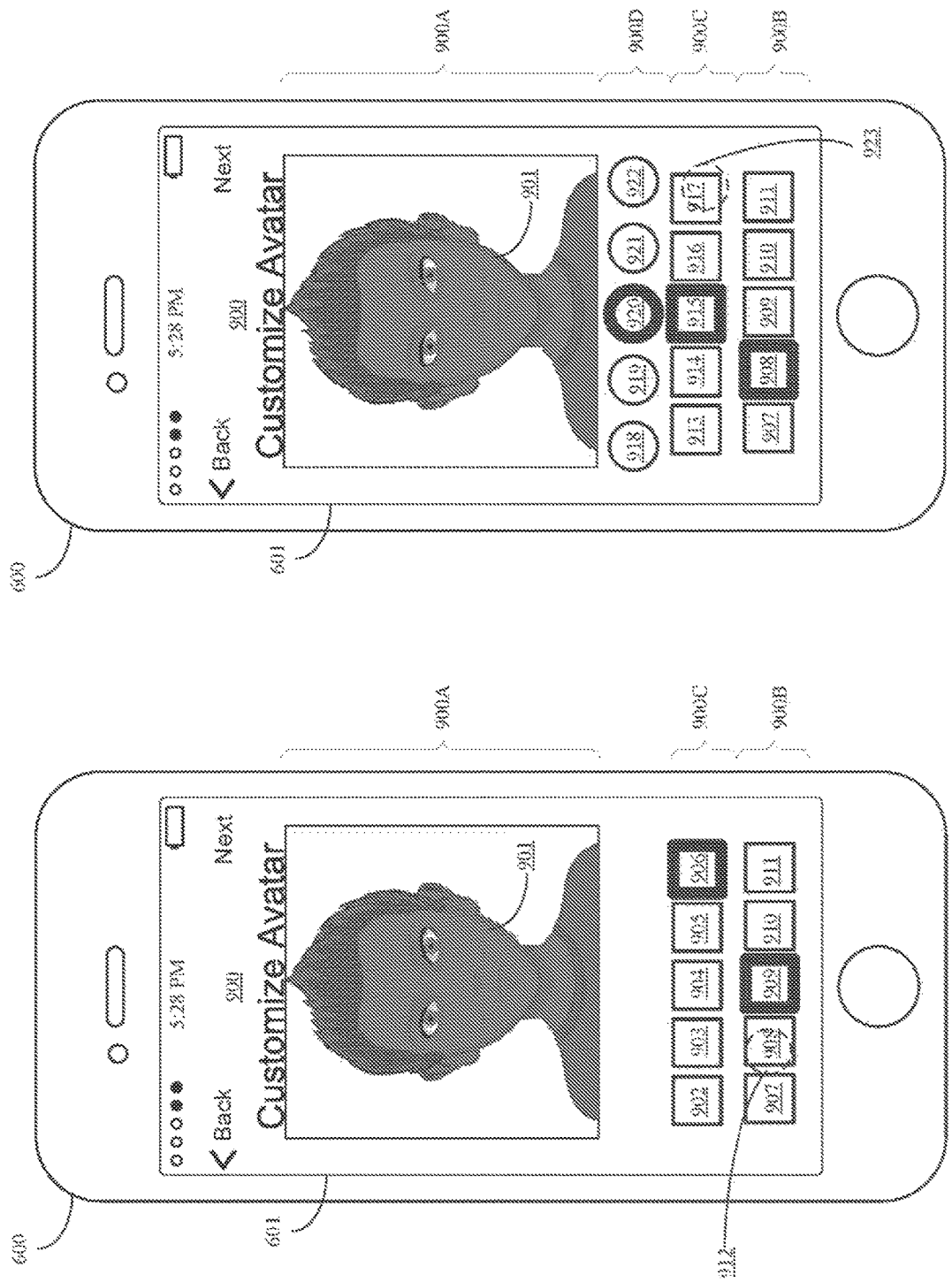

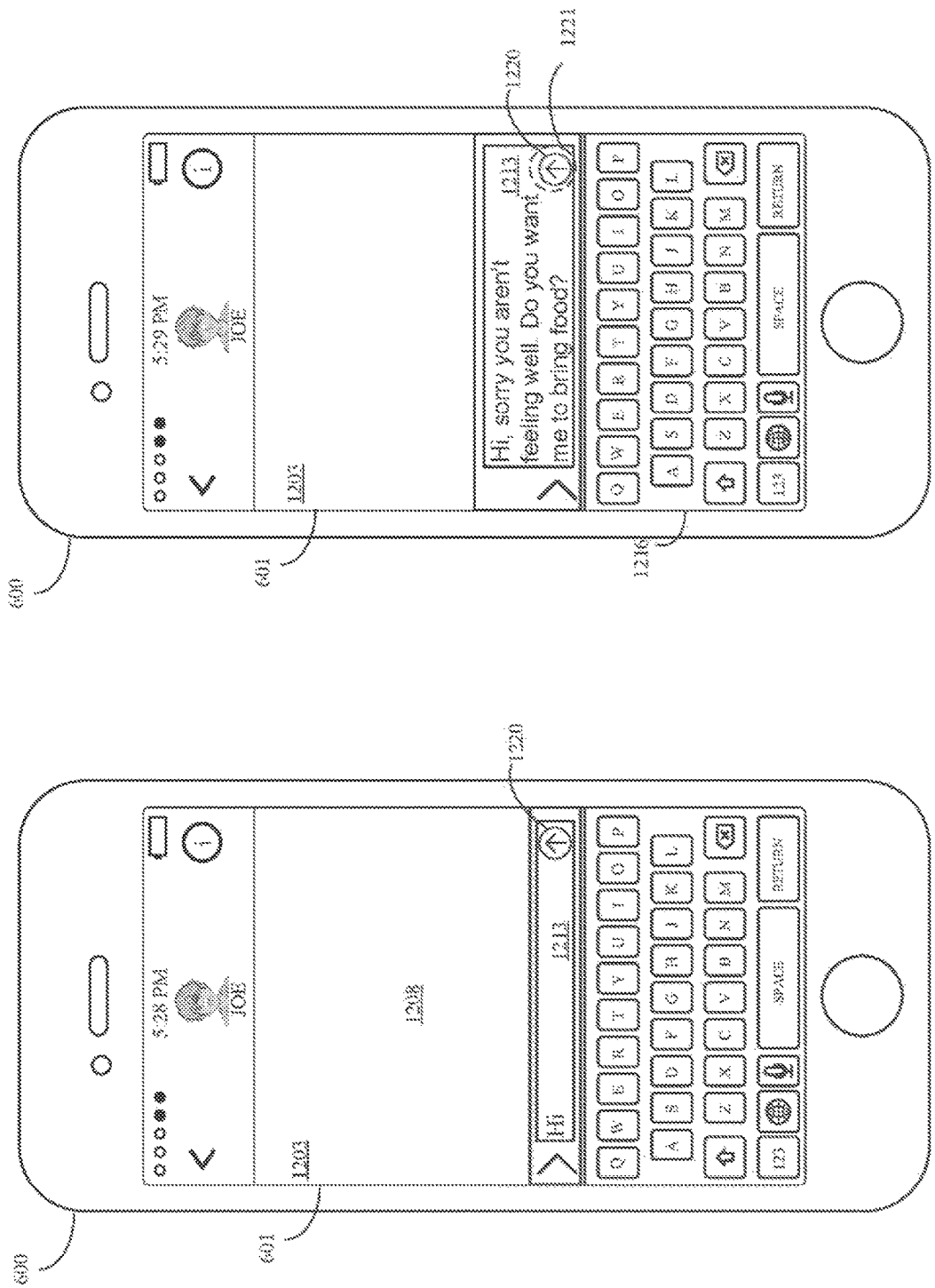

AVATAR CREATION AND EDITING

This application claims priority to U.S. Provisional Patent Application 62/399,294, entitled "AVATAR CREATION AND EDITING", filed Sep. 23, 2016, the content of which is hereby incorporated by reference in its entirety.

FIELD

The present disclosure relates generally to computer user interfaces, and more specifically to techniques for avatar creation and editing.

BACKGROUND

Avatars are used to represent the users of electronic devices. The avatars can represent the appearance of a user or can represent an idealized or completely fictional representation of the user. Avatars can then be associated with a user so that the appearance of the avatar to others indicates triggers an association or link with the user.

BRIEF SUMMARY

Some techniques for avatar creation and editing using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for avatar creation and editing. Such methods and interfaces optionally complement or replace other methods for avatar creation and editing. Such methods and interfaces reduce the cognitive burden on a user and produce a more efficient human-machine interface. For battery-operated computing devices, such methods and interfaces conserve power and increase the time between battery charges.

In accordance with an embodiment, an electronic device with a display and one or more cameras displays displaying a placeholder avatar on the display, wherein the display of the placeholder avatar is based on a first position of a user with respect to a field of view of the one or more cameras of the electronic device. While displaying the placeholder avatar, the electronic device detects movement of the user to a second position with respect to the field of view of the one or more cameras. In response to detecting the movement of the user to the second position with respect to the field of view of the one or more cameras, the electronic device, in accordance with a determination that the second position of the user with respect to the field of view of the one or more cameras meets the first set of image criteria, captures first image data of the user with the one or more cameras; and in accordance with a determination that the second position of the user with respect to the field of view of the one or more cameras does not meet the first set of image criteria and while continuing to display the placeholder avatar, provides first guidance to the user to change position with respect to the electronic device to a first target position.

An embodiment of a transitory computer readable storage medium stores one or more programs, the one or more programs comprise instructions, which when executed by one or more processors of an electronic device with a display and one or more cameras, cause the device to display a placeholder avatar on the display, wherein the display of the placeholder avatar is based on a first position of a user with respect to a field of view of the one or more cameras of the electronic device; while displaying the placeholder avatar, detect movement of the user to a second position with respect to the field of view of the one or more cameras; in response to detecting the movement of the user to the second position with respect to the field of view of the one or more cameras: in accordance with a determination that the second position of the user with respect to the field of view of the one or more cameras meets the first set of image criteria, capture first image data of the user with the one or more cameras; and in accordance with a determination that the second position of the user with respect to the field of view of the one or more cameras does not meet the first set of image criteria and while continuing to display the placeholder avatar, provide first guidance to the user to change position with respect to the electronic device to a first target position.

In accordance with an embodiment, an electronic device with a display and one or more input devices displays an avatar editing user interface that includes concurrently display, on the display, of an avatar having a plurality of editable features; a feature-selection control region that includes representations of a plurality of avatar features, including a first avatar feature that is currently selected for modification and a second avatar feature that is not currently selected for modification; and a feature-option control region that includes representations of a plurality of options for the first avatar feature for selection including a first option for the first avatar feature that is currently selected and a second option for the first avatar feature that is not currently selected; while displaying the avatar editing user interface, detecting an input in the avatar editing user interface; and in response to detecting the input: in accordance with a determination that the input corresponds to selection of the second avatar feature in the feature-selection control region: updating the feature-selection control region to indicate that the second avatar feature is currently selected; and updating the feature-option control region to include representations of a plurality of options for the second avatar feature for selection including a first option for the second avatar feature that is currently selected and a second option for the second avatar feature that is not currently selected; in accordance with a determination that the input corresponds to selection of the second option for the first avatar feature in the feature-option control region: updating the feature-option control region to indicate that the second option for the first avatar feature is currently selected; and updating the avatar to change the appearance of the first avatar feature in accordance with the second option for the first avatar feature.

An embodiment of a transitory computer readable storage medium stores one or more programs, the one or more programs comprise instructions, which when executed by one or more processors of an electronic device with a display and one or more input devices, cause the device to display an avatar editing user interface that includes concurrently displaying, on the display: an avatar having a plurality of editable features; a feature-selection control region that includes representations of a plurality of avatar features, including a first avatar feature that is currently selected for modification and a second avatar feature that is not currently selected for modification; a feature-option control region that includes representations of a plurality of options for the first avatar feature for selection including a first option for the first avatar feature that is currently selected and a second option for the first avatar feature that is not currently selected; while displaying the avatar editing user interface, detect an input in the avatar editing user interface; and in response to detecting the input: in accordance with a determination that the input corresponds to selection of the second avatar feature in the feature-selection control region: update the feature-selection control region to indicate that the second avatar feature is currently selected; and update the feature-option control region to include representations of a plurality of options for the second avatar feature for selection including a first option for the second avatar feature that is currently selected and a second option for the second avatar feature that is not currently selected; in accordance with a determination that the input corresponds to selection of the second option for the first avatar feature in the feature-option control region: update the feature-option control region to indicate that the second option for the first avatar feature is currently selected; and update the avatar to change the appearance of the first avatar feature in accordance with the second option for the first avatar feature.

In accordance with an embodiment, an electronic device with a display and one or more input devices displays a messaging interface for a messaging application for transmitting messages between a first user of the device and other users, wherein the first user is represented in the messaging application by an avatar of the user that distinguishes the first user of the device from other users; while displaying the messaging user interface, receives a first request to display a sticker user interface for selecting stickers to send to a second user; in response to the first request to display the sticker user interface, displays a sticker user interface that includes a first plurality of avatar stickers generated based on the avatar of the user, including concurrently displaying, on the display: a first avatar sticker generated based on a modification of the avatar that represents the user, and a second avatar sticker generated based on a modification of the avatar that represents the user and is different from the first avatar sticker; while displaying the plurality affordance for the avatar selection interface on the display, detects, via the one or more input devices, a sequence of one or more inputs that corresponds to a request to send a respective avatar sticker from the first user to the second user via the messaging application; and in response to detecting the sequence of one or more inputs: in accordance with a determination that the sequence of one or more inputs corresponds to selection of the first avatar sticker, sends the first avatar sticker to the second user from the first user to the second user via the messaging application; and in accordance with a determination that the sequence of one or more inputs corresponds to selection of the second avatar sticker, sends the second avatar sticker from the first user to the second user via the messaging application.

An embodiment of a transitory computer readable storage medium stores one or more programs, the one or more programs comprise instructions, which when executed by one or more processors of an electronic device with a display and one or more input devices, cause the device to display a messaging interface for a messaging application for transmitting messages between a first user of the device and other users, wherein the first user is represented in the messaging application by an avatar of the user that distinguishes the first user of the device from other users; while displaying the messaging user interface, receive a first request to display a sticker user interface for selecting stickers to send to a second user; in response to the first request to display the sticker user interface, display a sticker user interface that includes a first plurality of avatar stickers generated based on the avatar of the user, including concurrently displaying, on the display: a first avatar sticker generated based on a modification of the avatar that represents the user, and a second avatar sticker generated based on a modification of the avatar that represents the user and is different from the first avatar sticker; while displaying the plurality affordance for the avatar selection interface on the display, detect, via the one or more input devices, a sequence of one or more inputs that corresponds to a request to send a respective avatar sticker from the first user to the second user via the messaging application; and in response to detecting the sequence of one or more inputs: in accordance with a determination that the sequence of one or more inputs corresponds to selection of the first avatar sticker, send the first avatar sticker to the second user from the first user to the second user via the messaging application; and in accordance with a determination that the sequence of one or more inputs corresponds to selection of the second avatar sticker, send the second avatar sticker from the first user to the second user via the messaging application.

In accordance with an embodiment, an electronic device with a display and a touch-sensitive surface displays, on the display, an avatar editing interface including an avatar having a plurality of editable features; while a respective feature of the plurality of editable features is a currently selected feature, detects, on the touch-sensitive surface a first gesture that includes movement of one or more contacts on the touch-sensitive surface; in response to detecting the first gesture: in accordance with a determination that the first gesture is a first type of gesture and that the respective feature is a first feature, updates the display of the avatar by modifying a first characteristic of the first feature, wherein the first characteristic of the first feature is associated with the first gesture type; and in accordance with a determination that the first gesture is a second type of gesture that is different from the first type of gesture and that the respective feature is the first feature, updates the display of the avatar by modifying a second characteristic of the first feature that is different from the first characteristic of the first feature, wherein the second characteristic of the first feature is associated with the second gesture type.

A non-transitory computer readable storage medium storing one or more programs, the one or more programs comprising instructions, which when executed by one or more processors of an electronic device with a display and one or more input devices, cause the device to: display, on the display, an avatar editing interface including an avatar having a plurality of editable features, while a respective feature of the plurality of editable features is a currently selected feature, detect, on the touch-sensitive surface a first gesture that includes movement of one or more contacts on the touch-sensitive surface; in response to detecting the first gesture: in accordance with a determination that the first gesture is a first type of gesture and that the respective feature is a first feature, update the display of the avatar by modifying a first characteristic of the first feature, wherein the first characteristic of the first feature is associated with the first gesture type; and in accordance with a determination that the first gesture is a second type of gesture that is different from the first type of gesture and that the respective feature is the first feature, update the display of the avatar by modifying a second characteristic of the first feature that is different from the first characteristic of the first feature, wherein the second characteristic of the first feature is associated with the second gesture type.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for avatar creation and editing, thereby increasing the effectiveness, efficiency, and user satisfaction with such devices. Such methods and interfaces may complement or replace other methods for avatar creation and editing.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 6A-6M illustrate exemplary user interfaces for creating user avatars.

FIGS. 9A-9H illustrate exemplary user interfaces for customizing a user avatar.

FIGS. 12A-12J illustrate exemplary user interfaces for using avatar stickers in messages.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for avatar creation and editing. For example, while programs already exist for creating and editing avatars, these programs are inefficient and difficult to use compared to the techniques below, which allow a user to create and edit avatars to be as realistic or unrealistic as necessary. Such techniques can reduce the cognitive burden on a user who creates and edits an avatar, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for creating and editing avatars.

FIGS. 6A-6M illustrate exemplary user interfaces for creating a user avatar. FIGS. 7A-7B is a flow diagram illustrating methods of creating a user avatar in accordance with some embodiments. The user interfaces in FIGS. 6A-6M are used to illustrate the processes described below, including the processes in FIGS. 7A-7B.

Figure 8:
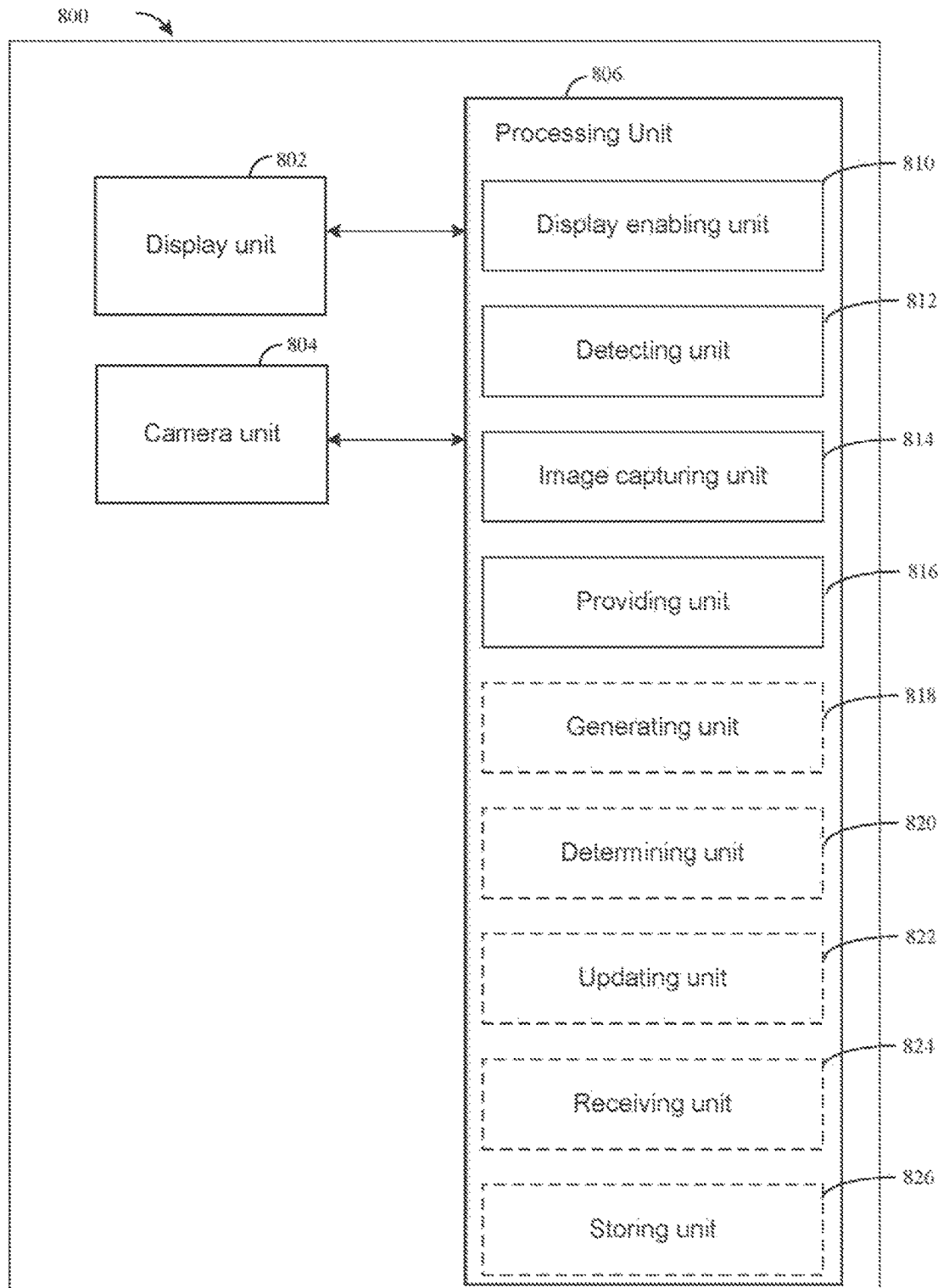
FIG. 8 shows an exemplary functional block diagram of an electronic device.
Figure 9D:
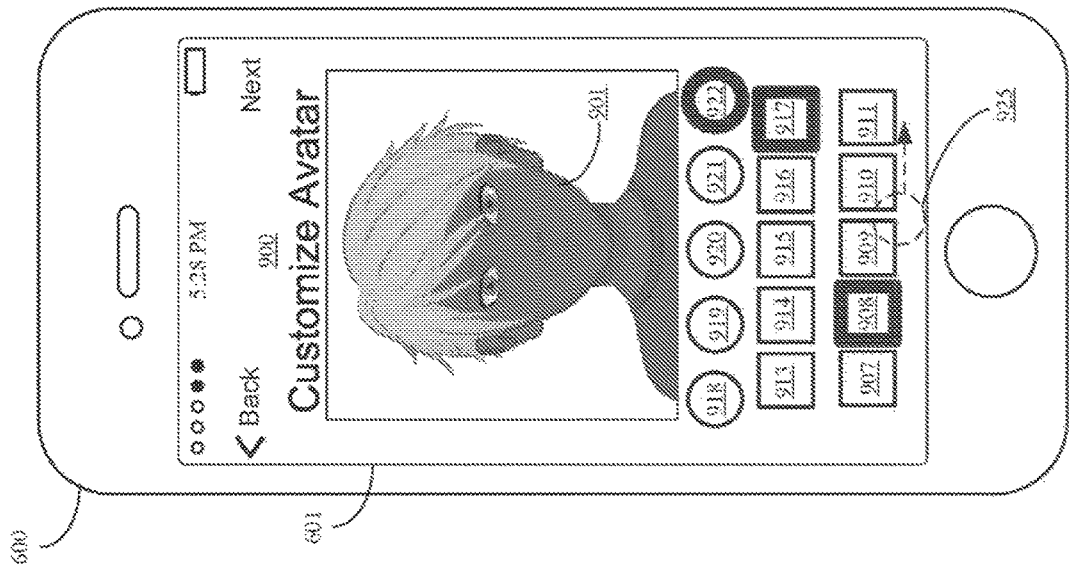

FIGS. 9A-9H illustrate exemplary user interfaces for customizing a user avatar. FIGS. 10A-10B is a flow diagram illustrating methods of accessing for customizing a user avatar in accordance with some embodiments. The user interfaces in FIGS. 8A-8D are used to illustrate the processes described below, including the processes in FIGS. 10A-10B.

Figure 12B:
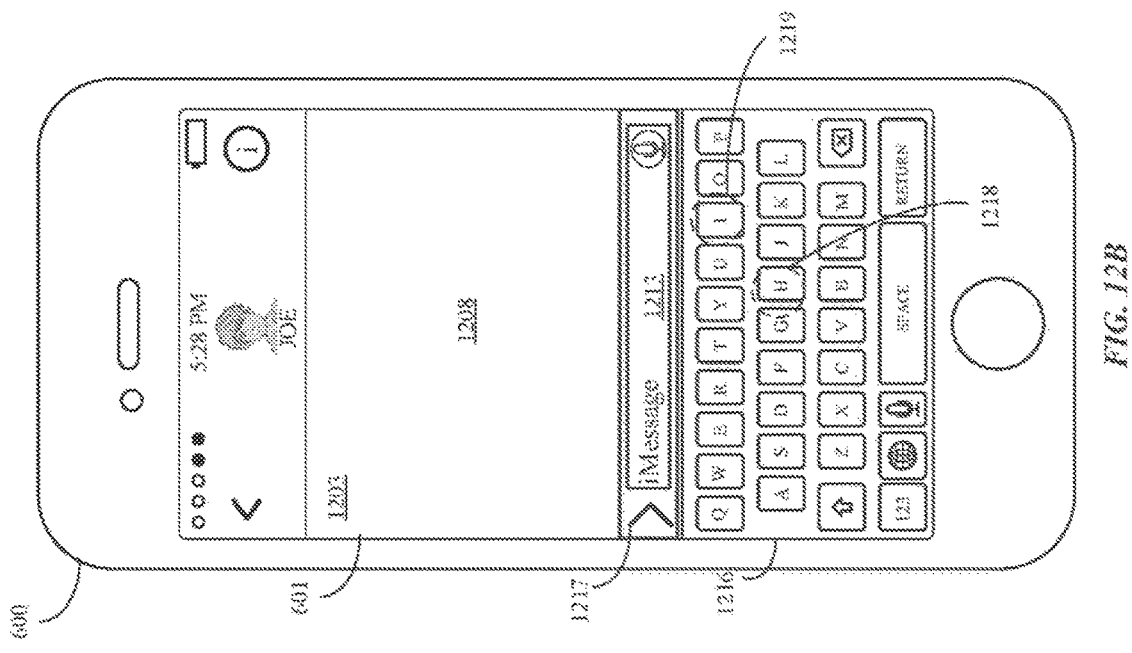

FIGS. 12A-12J illustrate exemplary user interfaces for creating and using avatar stickers with messages. FIGS. 13A-13B is a flow diagram illustrating methods of accessing for creating and using avatar stickers with messages in accordance with some embodiments. The user interfaces in FIGS. 12A-12J are used to illustrate the processes described below, including the processes in FIGS. 13A-13B.

FIGS. 15A-15F illustrate exemplary user interfaces for editing an avatar using gestures. FIGS. 16A-16B is a flow diagram illustrating methods of accessing for editing an avatar using gestures in accordance with some embodiments. The user interfaces in FIGS. 15A-15F are used to illustrate the processes described below, including the processes in FIGS. 16A-16B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
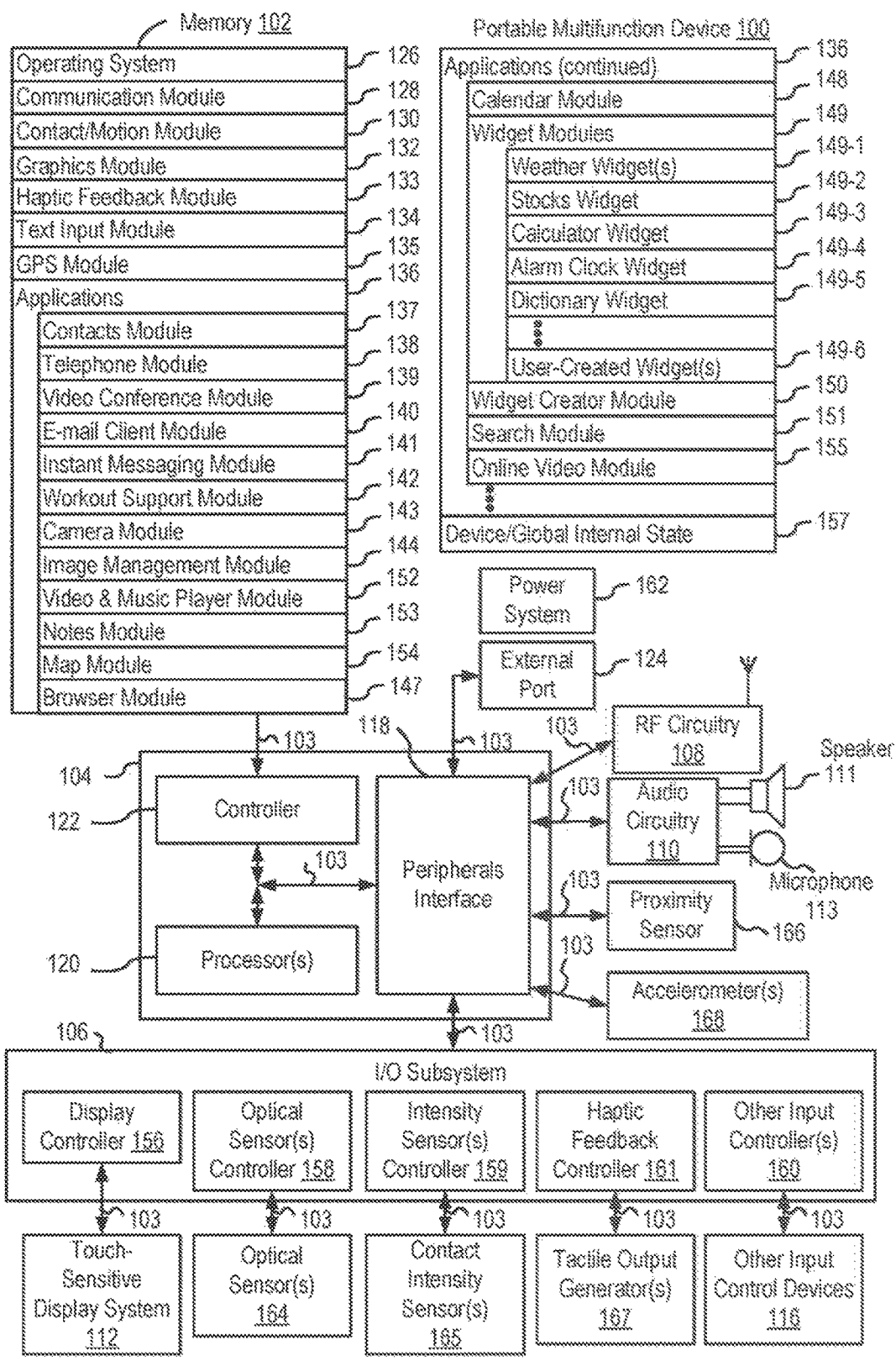
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoW), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touch-screen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
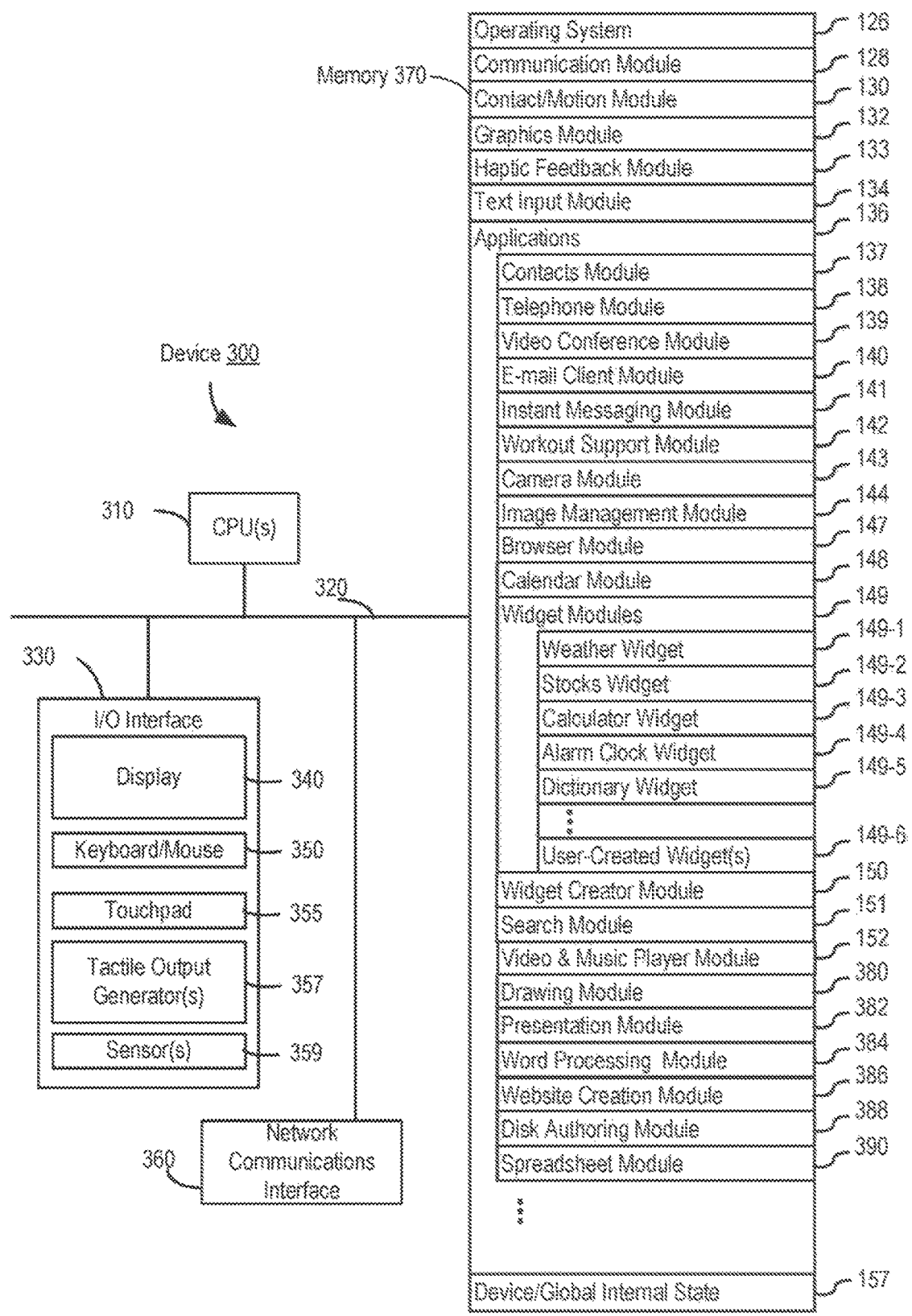
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
 Contacts module 137 (sometimes called an address book or contact list);
 Telephone module 138;
 Video conference module 139;
 E-mail client module 140;
 Instant messaging (IM) module 141;
 Workout support module 142;
 Camera module 143 for still and/or video images;
 Image management module 144;
 Video player module;
 Music player module;
 Browser module 147;
 Calendar module 148;
 Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
 Widget creator module 150 for making user-created widgets 149-6;
 Search module 151;
 Video and music player module 152, which merges video player module and music player module;
 Notes module 153;
 Map module 154; and/or
 Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
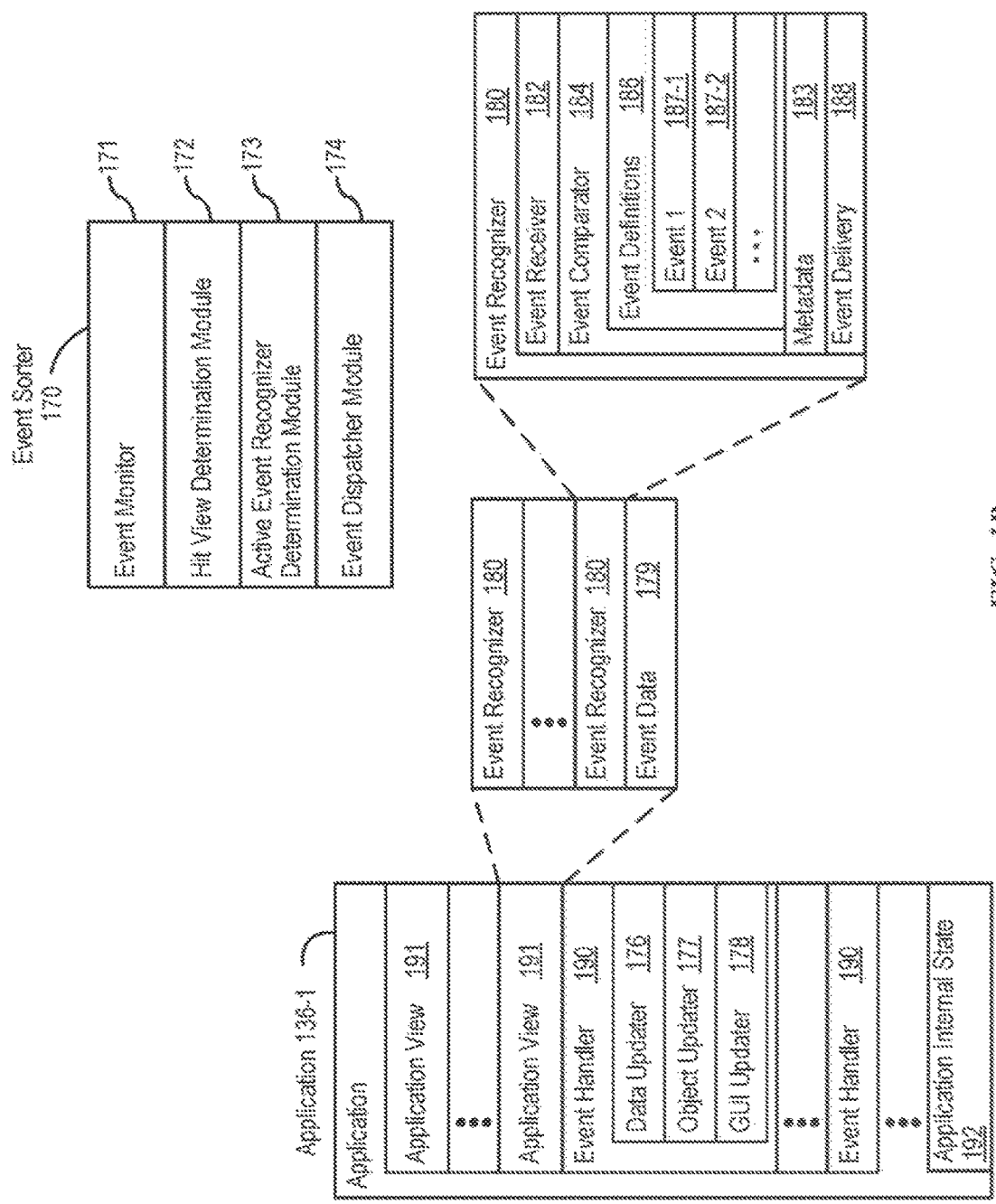
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
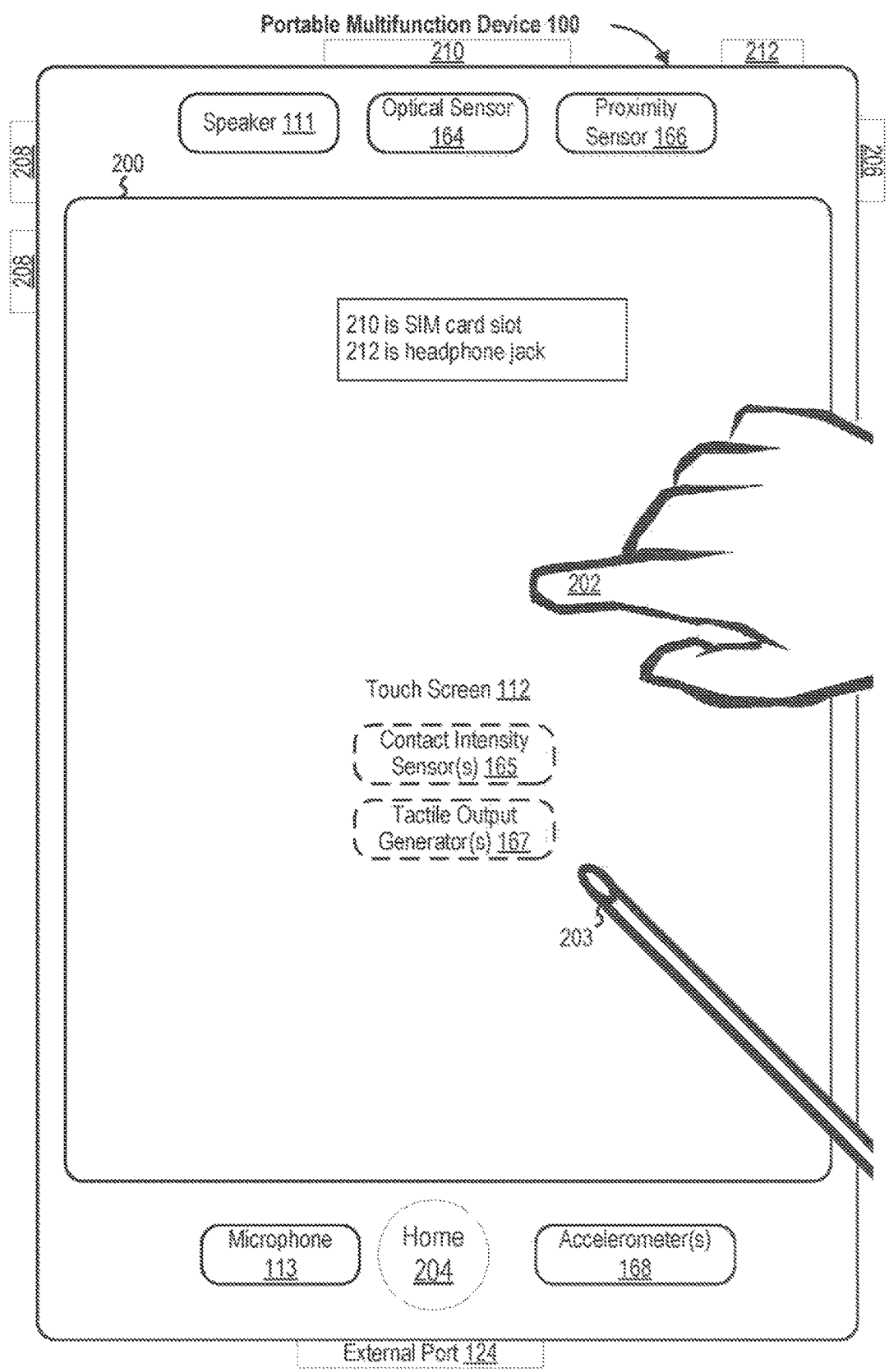
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
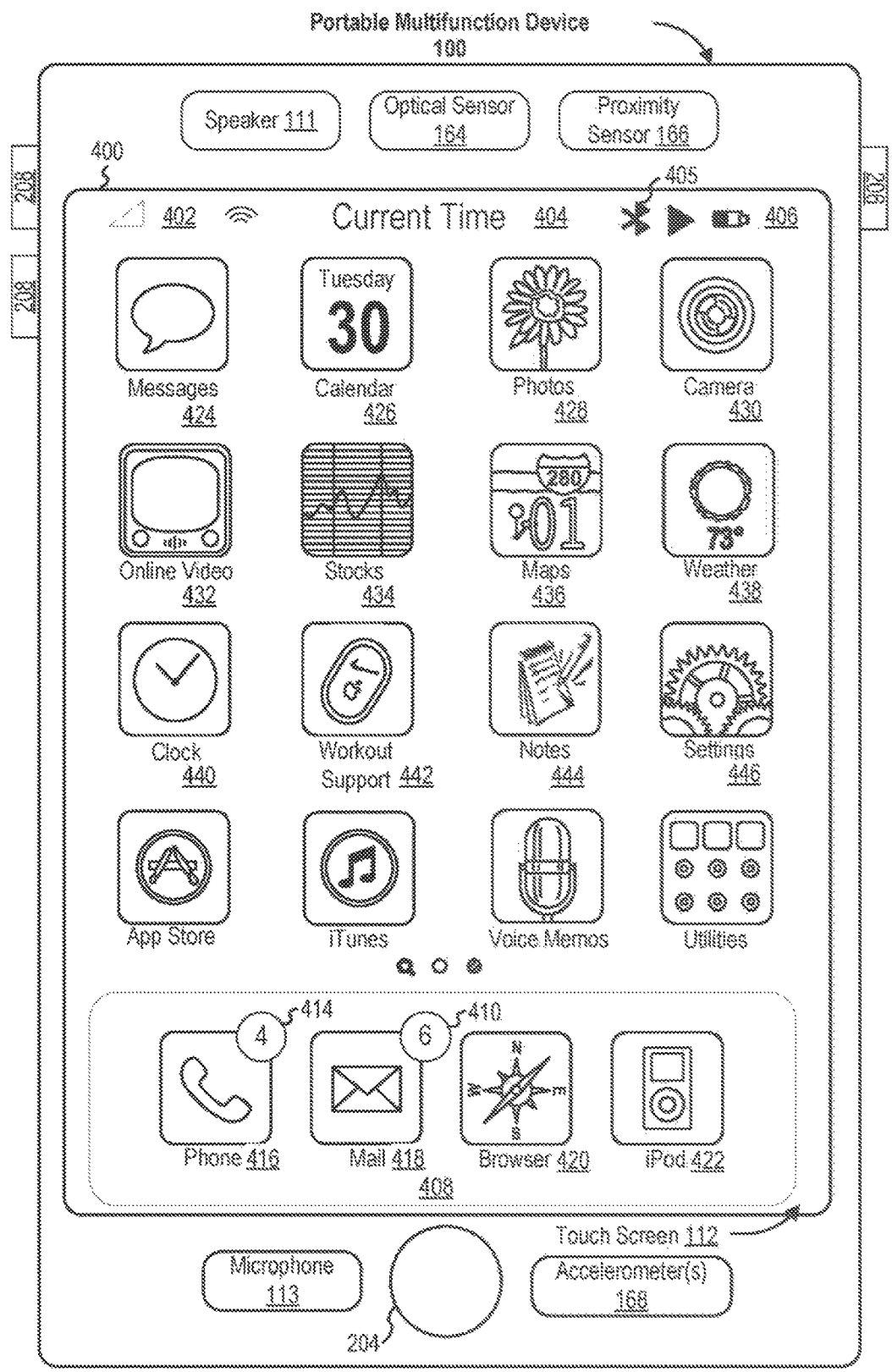
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
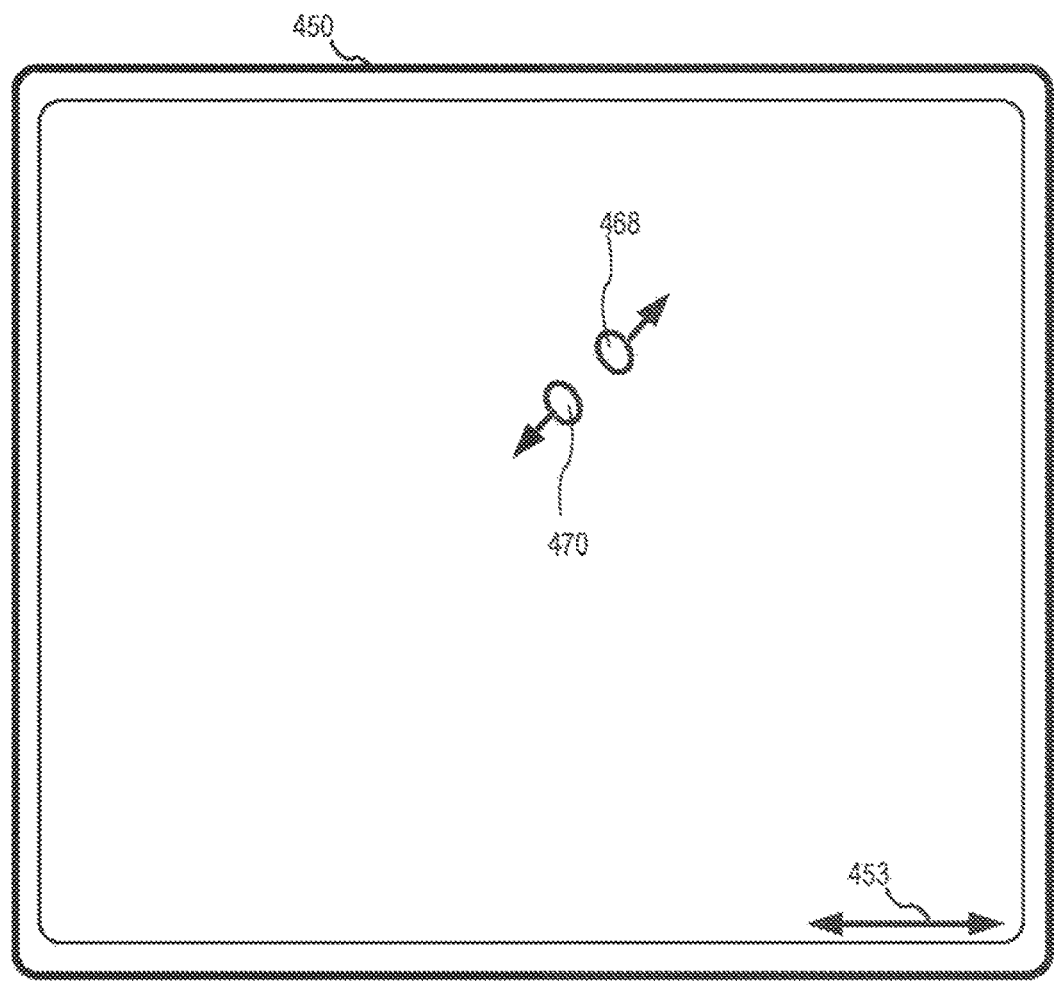
FIG. 4B illustrates an exemplary user interface for a multifunction device with a touch-sensitive surface that is separate from the display in accordance with some embodiments.
Figure 4B:
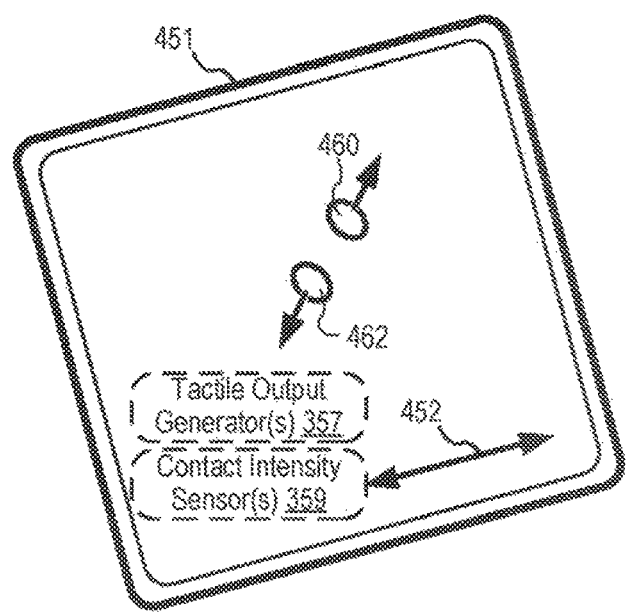

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
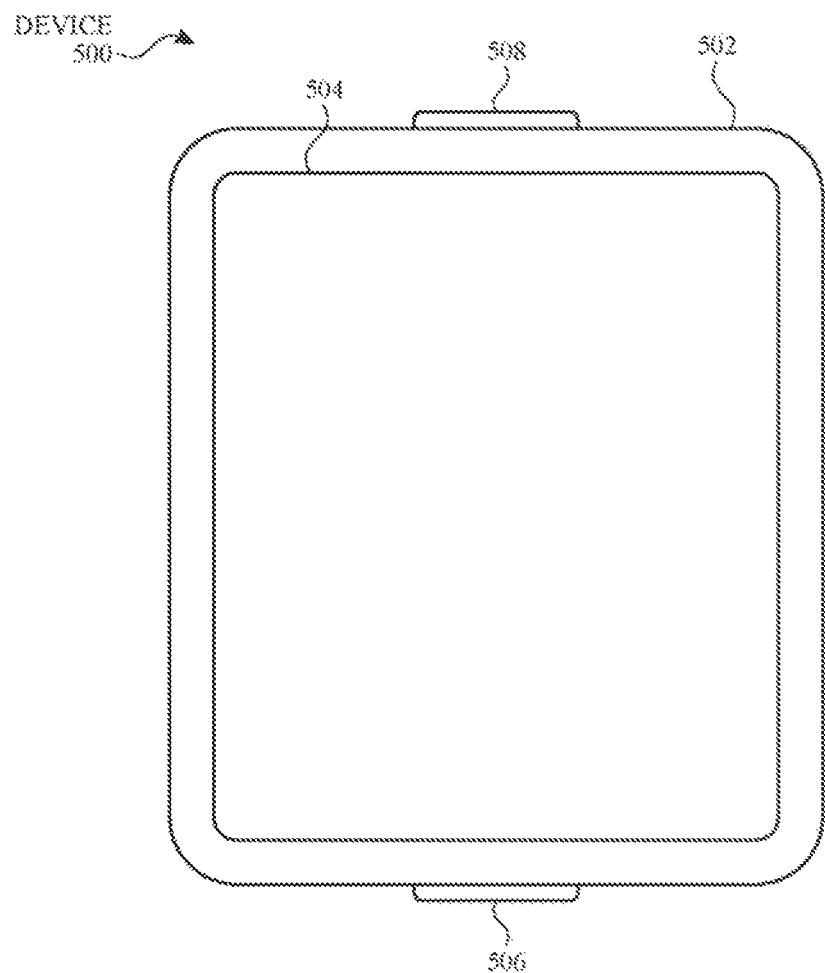
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
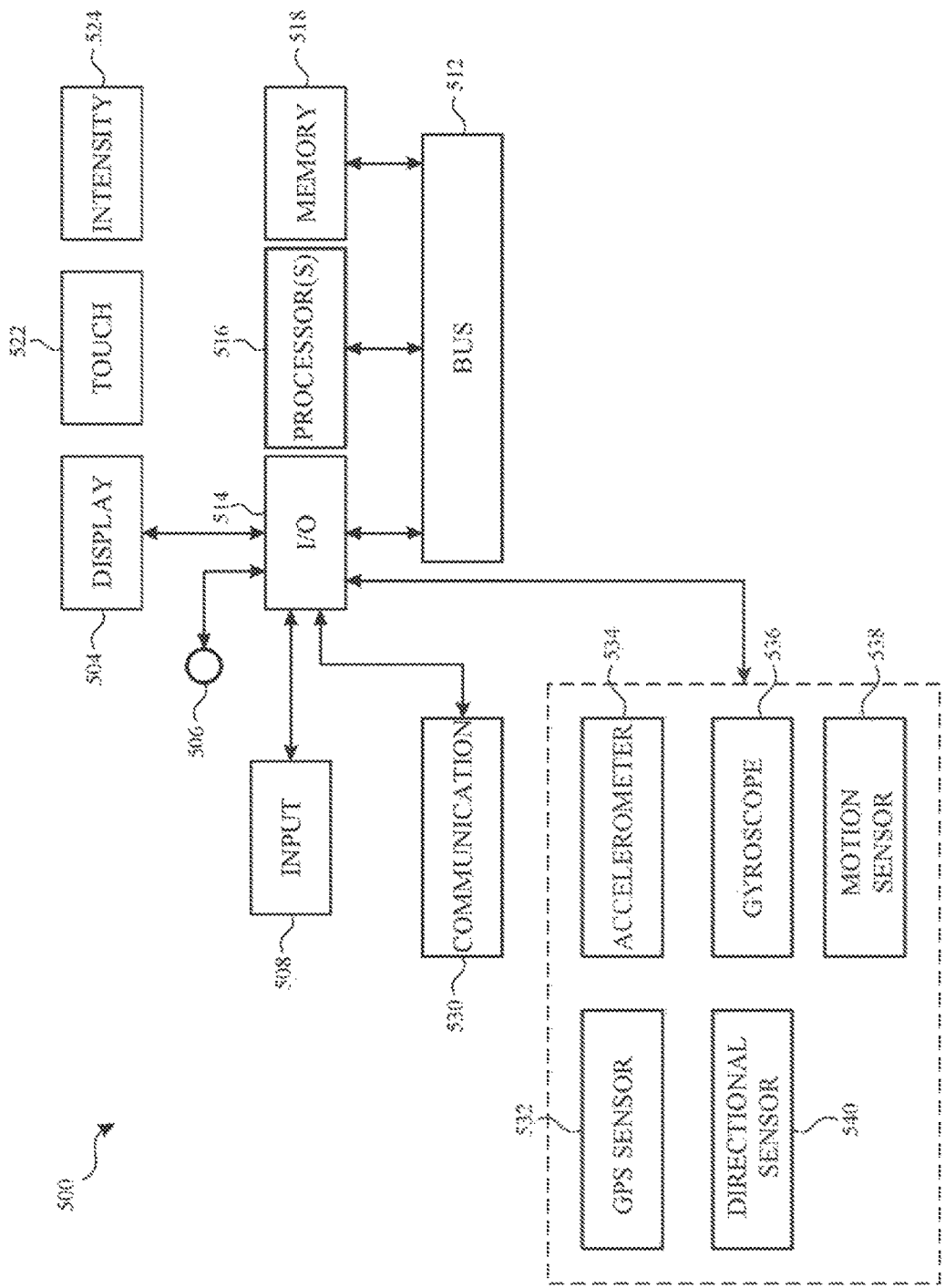
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 (FIGS. 7A-7B), 1000 (FIGS. 10A-10B), 1300 (FIGS. 13A-13B), and 1600 (FIGS. 16A-16B). Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6M illustrate exemplary user interfaces for creating avatars (e.g., emoji or other graphical representation such as a non-photorealistic graphical representation), in accordance with some embodiments. The user interfaces in these figures are used to illustrate the processes described below, including the processes in FIGS. 7A-7B.

Figure 6A:
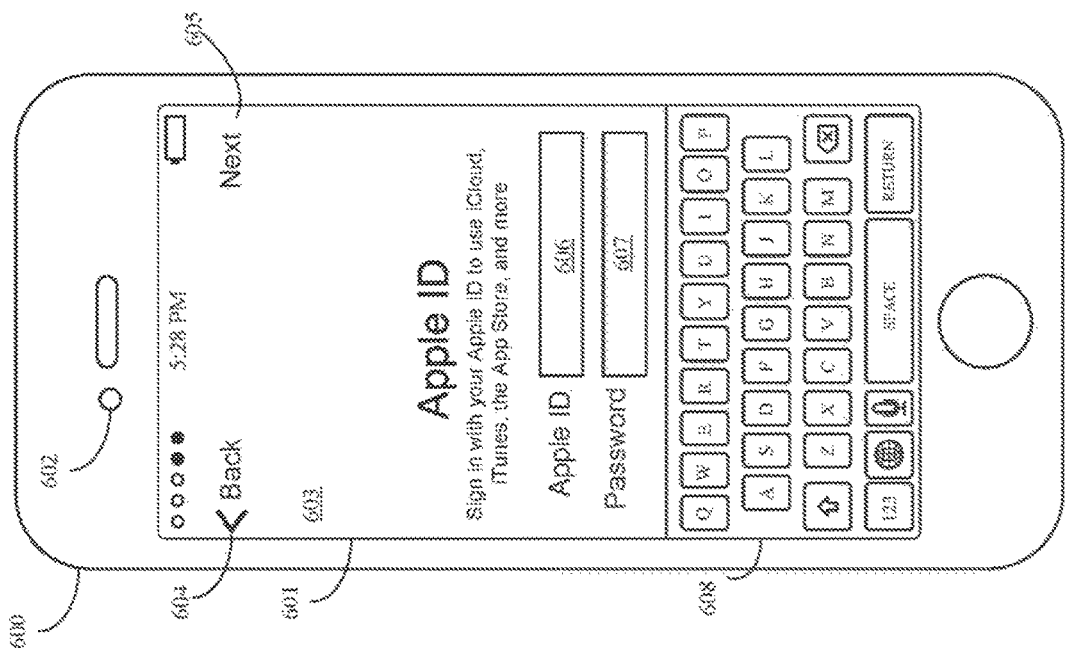
Figure 7A:
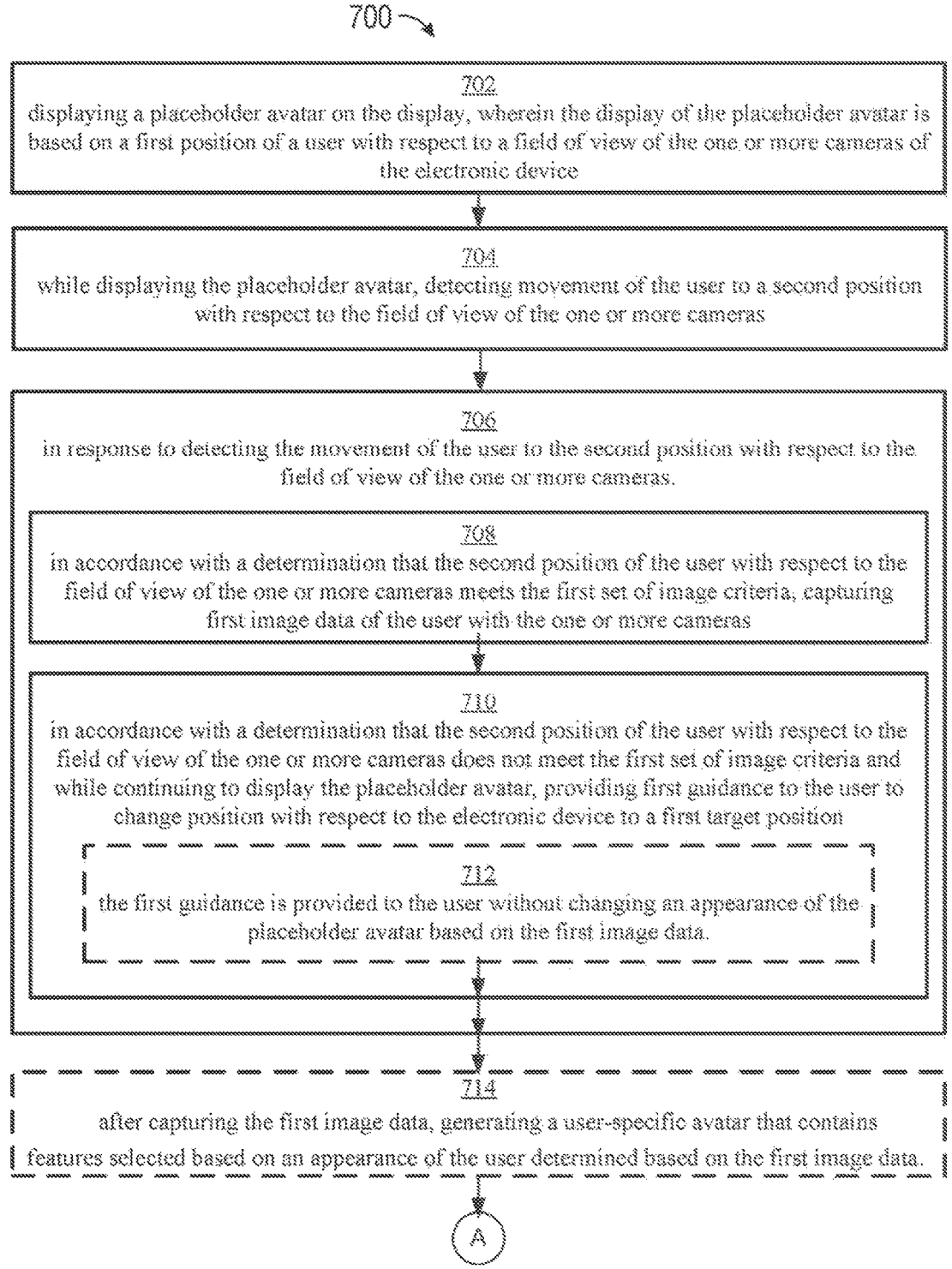
FIGS. 7A-7B is a flow diagram illustrating a method for creating user avatars.
Figure 7B:
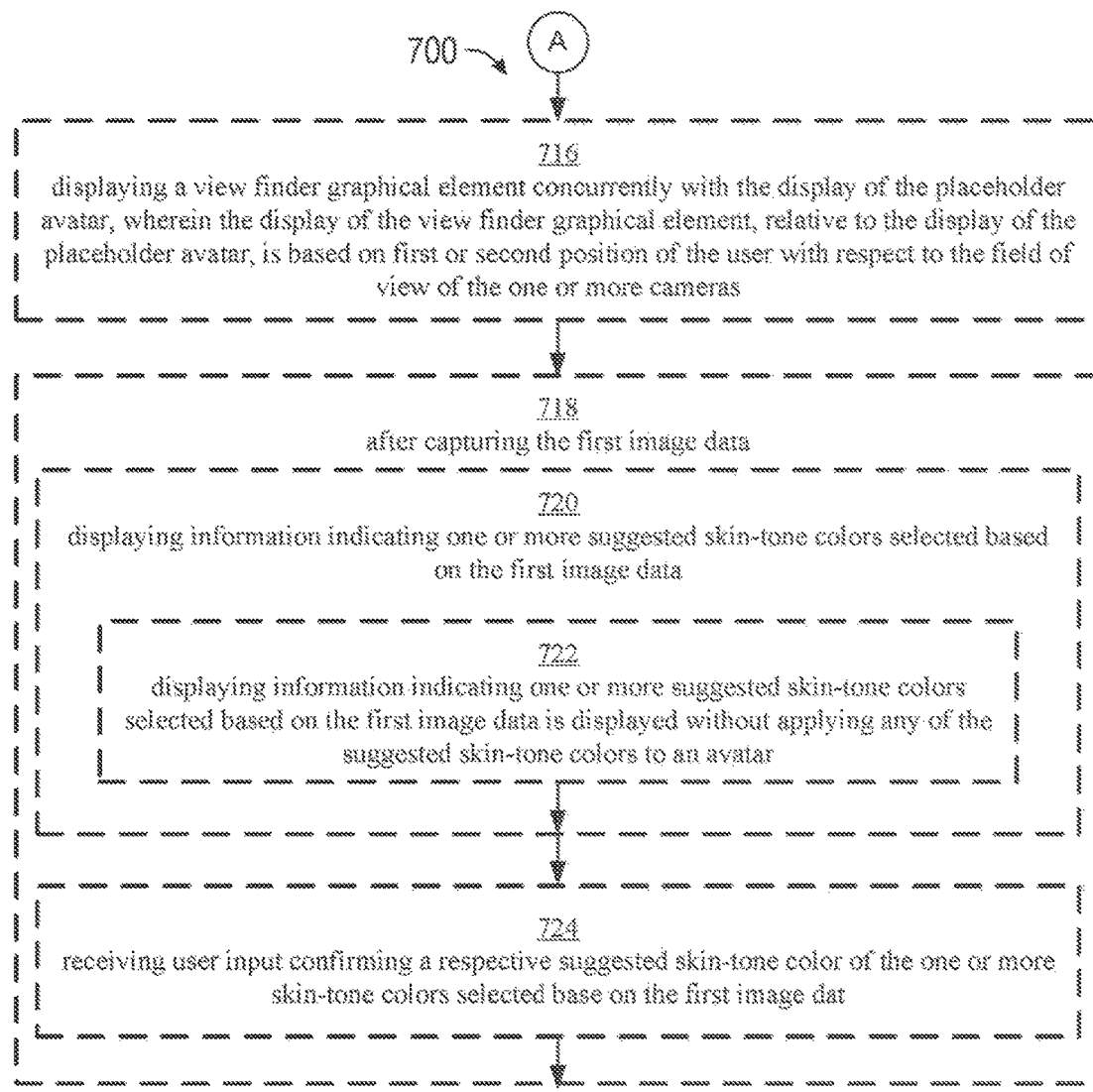

FIG. 6A depicts device 600, which in some examples is a specific form factor for device 100, device 300, or device 500 described above. Device 600 includes display 601, which in some embodiments is a touch-sensitive display, and camera 602. Additionally, in some embodiments of device 600, additional sensors (e.g., depth sensors, IR sensors, etc.) and/or other components (e.g., flash or IR emitter) are present along with camera 602.

In FIG. 6A, display 601 is displaying login interface 603 that includes username text field 606, password text field 607, and affordance 608 for entering an interface that allows for creating a new account or recovering a username. Selection of one of the text fields, for example, via touch 609, causes device 600 to display a text entry interface, as shown in FIG. 6B.

In FIG. 6A, back button 604 returns the user to a previous screen that, for example, allowed the user to choose a language or specify other device settings. Next button 605 causes device 600 to attempt to authenticate the username and password entered in username text field 606 and password text field 607.

Figure 6B:
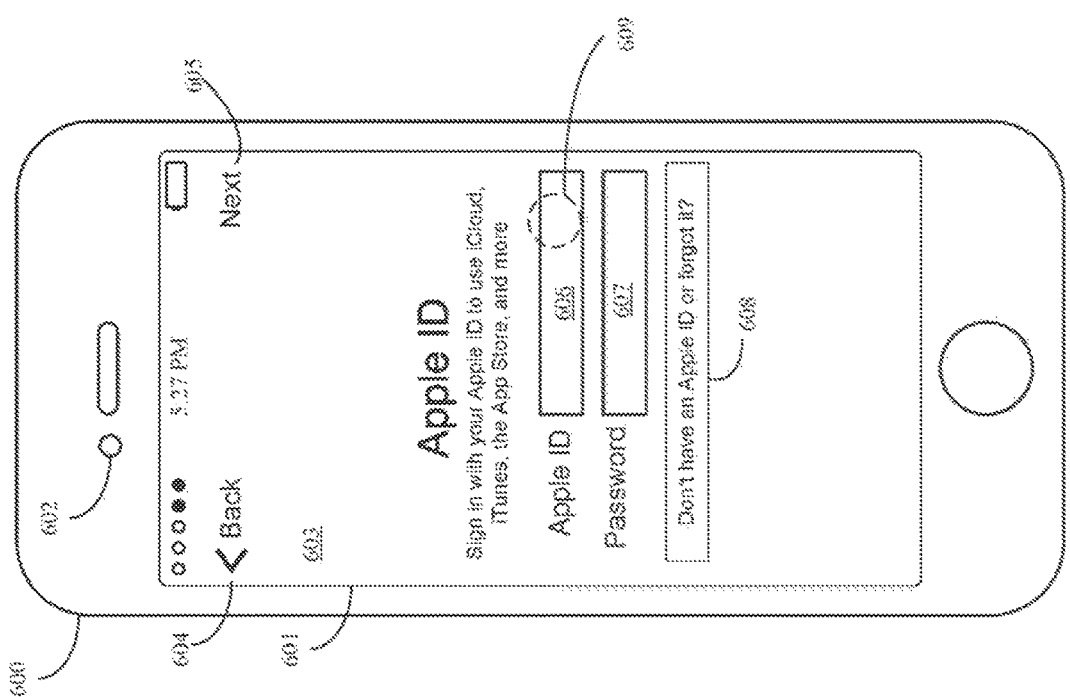

FIG. 6B depicts login interface 603 with keyboard 608 displayed. Keyboard 608 allows the user to enter text into text fields 606 and 607. The user requests device 600 to authenticate the enter username and password my selecting next button 605 using, for example, a touch on display 601 where next button 605 is displayed.

Figure 6D:
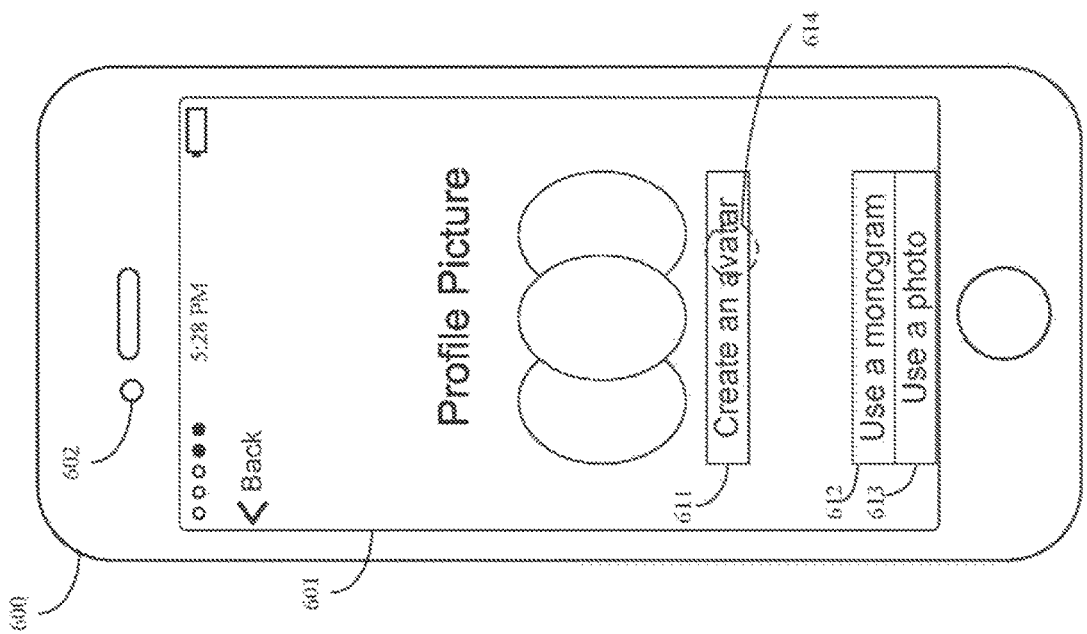
Figure 6C:
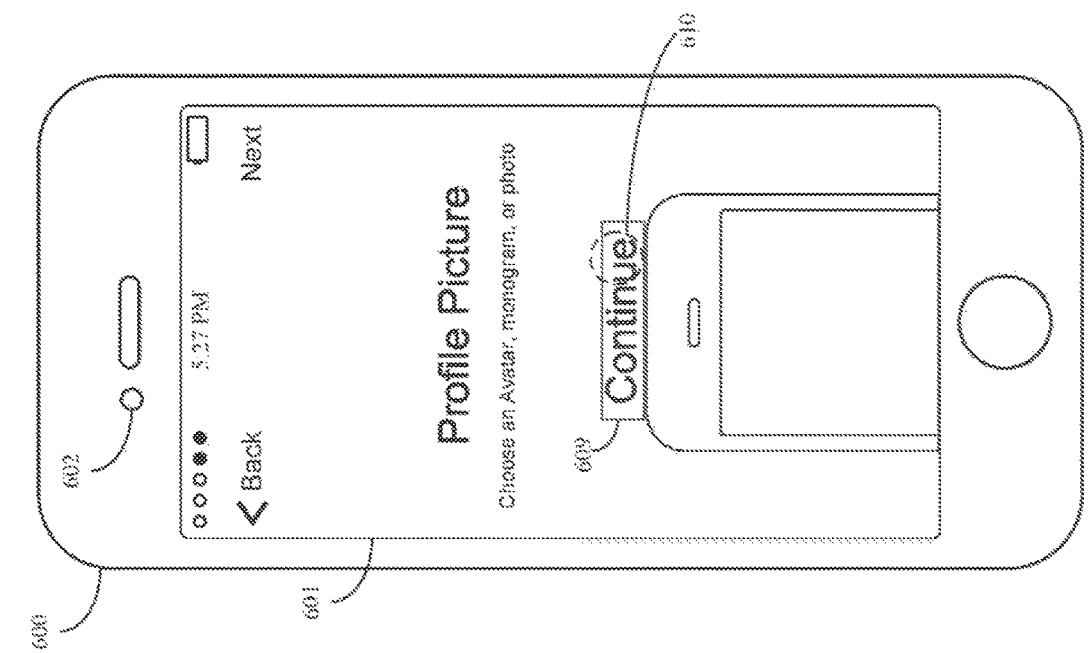

Subsequent to (or in response to), successfully authenticating the entered username and password, device starts a profile picture creation process, as depicted in FIG. 6C. The user begins the process by selecting button 609, for example, via touch 610 on display 601.

FIG. 6D depicts device 600 displaying the next steps in the profile picture creation process. In FIG. 6D, the user is given the choice to create an avatar (via affordance 611), use a monogram (via affordance 612), or use a photo (via affordance 613). In response to the user selecting to create an avatar, for example, via touch 614, device 600 enters the avatar creation interface that is described with respect to FIGS. 6E-6M. Selection of affordance 612 enters a monogram creation interface that allows a user to create a monogram by, for example, entering one, two, or three characters for the monogram and selecting one or more colors (e.g., for the characters and/or for the background).

FIG. 6E depicts avatar creation interface 615, which includes view finder 616, placeholder avatar 617, and affordance 618 for continuing with the avatar creation process. View finder 616 represents a field of view of a camera of device 600, such as camera 602, and is not required to be present in all embodiments.

Placeholder avatar 617 is a silhouette or mannequin that does not represent specific characteristics of the user, except for, in some examples, the gender of the user. For example, placeholder avatar 617 optionally is an outline of a generic person and does not depend on detected characteristics (e.g., skin tone, face shape, or hair style) of the user (e.g., as detected by captured image data). In response to the user selecting to continue the avatar creation process, for example, via touch 619 on affordance 618, device 600 determines the relative positioning of the user with respect to the field of view of the camera. If the user is properly aligned with the field of view, device 600 captures image data of the user using camera 602 and/or other sensors. If, however, the user is not properly aligned, device 600 updates avatar creation interface 615, such as depicted in FIG. 6F.

In FIG. 6F, device 600 has determined that the image data currently collected by camera 602 and/or other sensors of device 600 does not meet a set of image criteria (e.g., alignment criteria, sizing criteria, lighting criteria, positioning criteria). Specifically, in this case, the user is offset from the center of the field of view. In response to this determination, device 600 updates avatar creation interface 615 to provide feedback in the form of instructions 620 for how the user should adjust their relative position to device 600 (e.g., by moving their head/body, device 600, or both). Avatar creation interface 615 also provides feedback about the misalignment by showing that avatar placeholder 617 is offset compared to view finder 616.

Device 600 continues to evaluate image data to determine whether image criteria are met. If the criteria are not met, device 600 updates avatar creation interface 615 to provide additional user feedback, such as seen in FIGS. 6G and 6H.

Figure 6H:
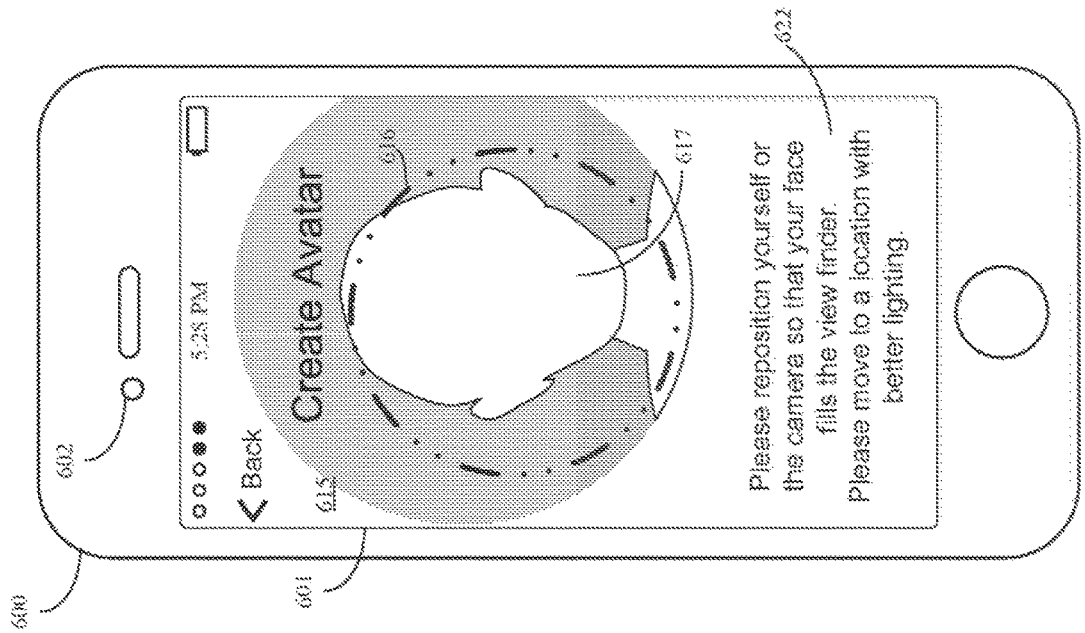
Figure 6G:
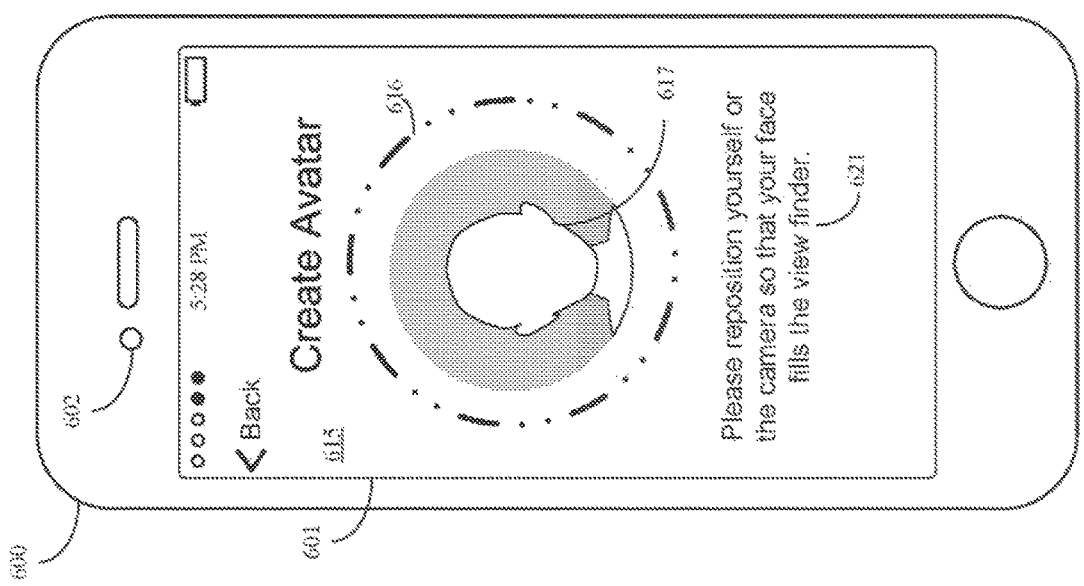

Specifically, in FIG. 6G device 600 has determined that the user is too far from device 600 (e.g., too far from camera 602). In response, device 600 updated avatar creation interface 615 to show that placeholder avatar 617 is small compared to view finder 616. Additionally, instructions 621 are provided to give the user feedback on how to change the relative positioning.

Similarly, in FIG. 6H, device 600 has determined that the user is too close to device 600 (e.g., too close to camera 602). In response, device 600 updated avatar creation interface 615 to show that placeholder avatar 617 is large compared to view finder 616. Additionally, instructions 622 are provided to give the user feedback on how to change the relative positioning.

Figure 6J:
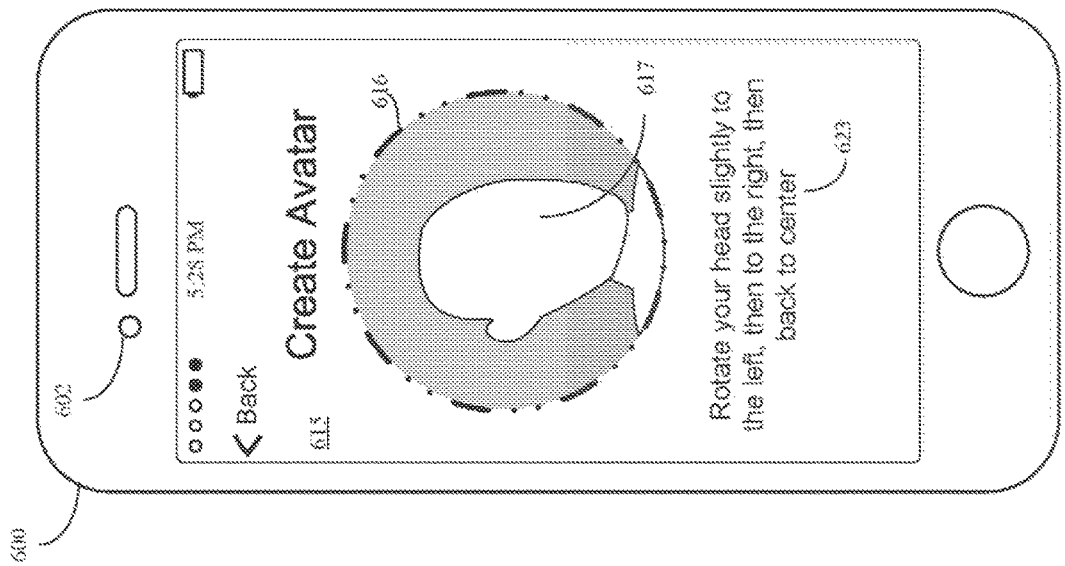
Figure 6I:
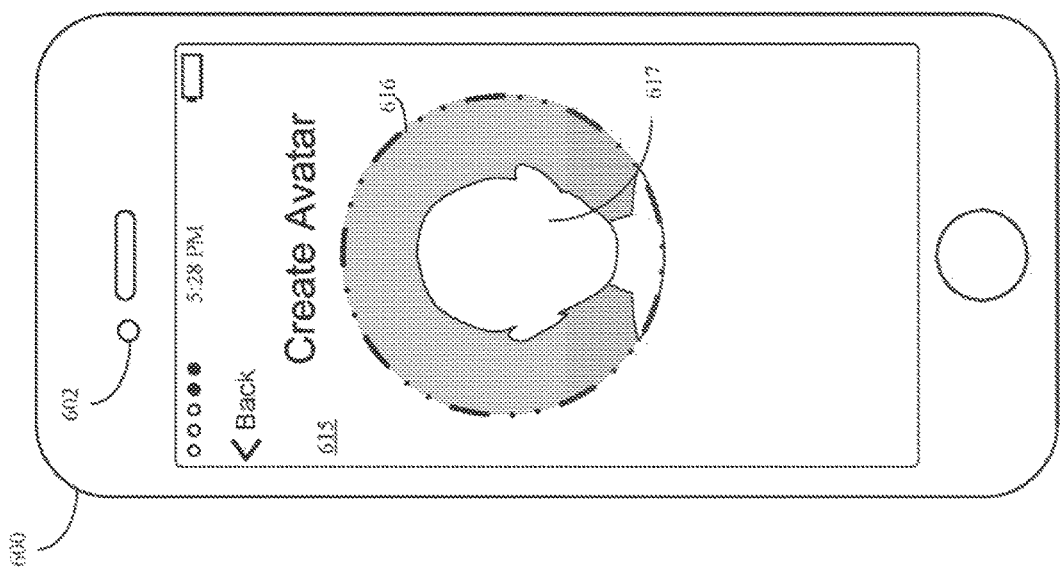

In FIG. 6I, device 600 has determined that the image criteria are met, as indicated by placeholder avatar 617 filling view finder 616. In response, device 600 captures image data of the user using camera 602. This image data, in some examples, is still and/or video image data.

As depicted in FIG. 6J, after device 600 captures image data in FIG. 6G, device 600 updates avatar creation interface 615 to instruct the user to reposition to obtain further image data. Specifically, avatar creation interface 615 provides feedback to the user via instructions 623 and an update to placeholder avatar 617 to show a rotated head to provide guidance to the about how to position their head. Optionally, after the user completes the slight rotation of their head to the left, the placeholder avatar 617 updates to depict the head rotated in the other direction. While the user completes the requested movements, device 600 captures image data (e.g., still and/or video image data) continuously or based on predefined conditions (e.g., additional image criteria being met, such as a certain level of rotation being completed).

Figure 6L:
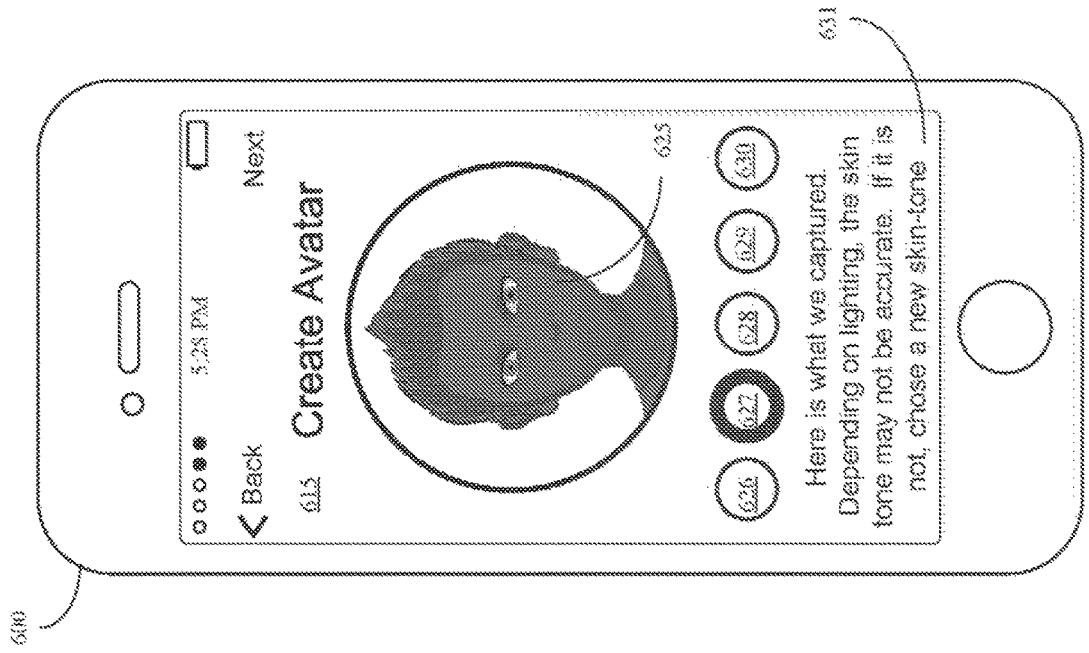
Figure 6K:
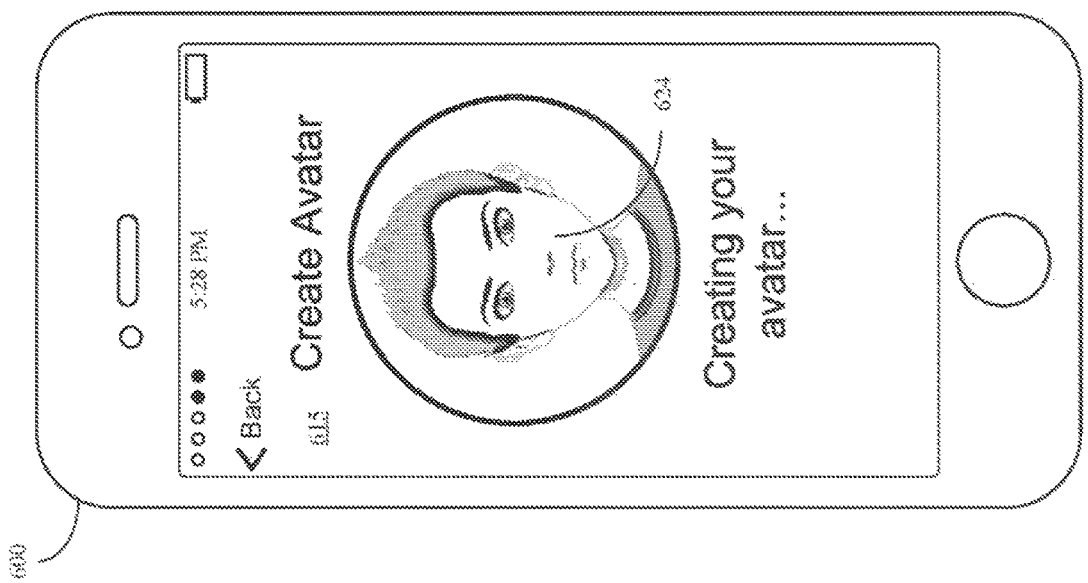

Once device 600 has captured sufficient image data to generate an avatar for the user, avatar creation interface 615 is updated as depicted in FIG. 6K. In some examples, avatar 624, which is based on the previously captured image data, is shown in various stages of generation. For example, as the avatar is generated, additional features and details appear over time. In some embodiments, while structural features of the avatar are displayed, coloring, such as skin tone is not displayed until after the user can confirmed that the generated skin tone is correct.

FIG. 6L depicts avatar creation interface 615 after avatar 625 has been generated based on the captured image data. While avatar 625 is depicted to have a skin tone based on the captured image data, in some embodiments, the displayed avatar will not have a skin tone that is based on the captured image data (e.g., it uses a pre-determined skin tone that is independent of the capture image data) or a skin tone is not applied to the avatar at all.

In FIG. 6L, avatar creation interface 615 presents the user with the option to confirm or adjust the generated skin tone. Specifically, each of affordances 626-630 shows a particular skin tone. Additionally, an indicator (e.g., the bolding on affordance 627) shows the currently selected skin tone. Additional skin tone options are optionally accessed via a swipe gesture on the area where affordances 626-630 are located. Once the user has decided on the correct skin tone, the next button is selected to view final avatar 633 before customization, as depicted in FIG. 6M. The user can optionally access the customization interface, for example, as described with respect to FIGS. 9A-9H below, by selecting next button 634.

FIG. 7 is a flow diagram illustrating a method for creating a user avatar using an electronic device in accordance with some embodiments. Method 700 is performed at a device (e.g., 100, 300, 500) with a display. Some operations in method 700 are, optionally, combined, the order of some operations are, optionally, changed, and some operations are, optionally, omitted.

As described below, method 700 provides an intuitive way for creating a user avatar. The method reduces the cognitive burden on a user for creating a user avatar, thereby creating a more efficient human-machine interface. For battery-operated computing devices, enabling a user to create avatars faster and more efficiently conserves power and increases the time between battery charges.

An electronic device (e.g., device 600 of FIGS. 6A-6M) with a display (e.g., display 601) and one or more cameras (e.g., camera 602) displays (702) a placeholder avatar (e.g, 617) (e.g., a generic outline such as a silhouette or a mannequin (with or without a background) that represents the user, which is 2-D or 3-D and/or is not based on user's physical appearance) on the display, wherein the display of the placeholder avatar is based on a first position of a user with respect to a field of view of the one or more cameras (e.g., camera 602) of the electronic device (e.g., as depicted in FIGS. 6F-6H) (e.g., the relative position, the relative size, or the orientation of the place holder avatar represents the user within image data from the one or more cameras). In some examples, the size of the placeholder avatar relative to a view finder is changed based on how far away the user is from the one or more cameras (e.g., FIGS. 6F and 6G). In some examples, the position of the placeholder avatar relative to the view finder is changed based on the position of the user within the field of view of the one or more cameras (e.g., FIG. 6E). In some examples, the orientation of the placeholder avatar is changed based on the orientation of the user with respect to the one or more cameras. In some examples, the placeholder avatar includes a background that fits within the view finder when the user is positioned correctly with respect to the electronic device (FIG. 6I). In some embodiments, the placeholder avatar is a predetermined silhouette of a person independent of the image data of the user.

While displaying the placeholder avatar, the electronic device detects (704) movement of the user to a second position with respect to the field of view of the one or more cameras. For example, optionally, the electronic device uses image data from a camera (e.g., 602) to determine when the user is in a different relative position with the electronic device. In some embodiments, the first image data includes both still data (e.g., a single image) and video data (e.g., a series of sequential images). In some embodiments, instead of the electronic device detecting movement of the user, the electronic device is continuously evaluating captured image data to determine if the image criteria (described below) are met.

In response to detecting the movement of the user (706) to the second position with respect to the field of view of the one or more cameras the electronic device: in accordance with a determination that the second position of the user with respect to the field of view of the one or more cameras (e.g., 602) meets the first set of image criteria (e.g., as shown in FIG. 6I), captures (708) (e.g., automatically capture without user input and/or in response to the first set of image criteria being met) first image data (e.g., still and/or video image data that includes visual, infrared, and/or depth data) of the user with the one or more cameras (e.g., 602); and in accordance with a determination that the second position of the user with respect to the field of view of the one or more cameras does not meet the first set of image criteria and while continuing to display the placeholder avatar (e.g., 617), provides (710) first guidance (e.g., 616 and 617 in FIGS. 6G-6I, 620-621) to the user to change position with respect to the electronic device to a first target position (e.g., positioning the placeholder avatar to show that the electronic device needs to be moved or reoriented to center the user in the image data, resizing the placeholder avatar to show that the electronic device needs to be moved closer or further away from the user, displaying text instructions, or other visual indicators about how to move the user or the electronic device). By providing user feedback concerning the correct positioning of the user's head relative to the electronic device, the electronic device provides a simpler process for creating a user avatar and the usability of the electronic device is enhanced. The simpler process allows the user to complete the avatar creation quickly, which makes the electronic device more efficient, reduces power usage, and improves battery life of the device.

In accordance with some embodiments, the electronic device, after capturing the first image data, generates (714) a user-specific avatar (e.g., 624, 625) (e.g., a 2D or 3D model with features that reflect the user's features) that contains features selected based on an appearance of the user determined based on the first image data (e.g., generating a 3D avatar representing the user based on at least the first image data and the second image data). In some examples, the avatar reflects characteristics of the user such as skin tone, eye color, hair color, hair style, and facial hair. In some examples, generating the user-specific avatar occurs after capturing additional image data (e.g., from one or more additional positions of the user) and the generation of the user-specific avatar is further based on the additional image data. In some examples, the user-specific avatar includes only a head. In some examples, the user-specific avatar includes a head, neck, shoulders, and part of a torso. In some examples, the user-specific avatar is a full-body avatar.

In accordance with some embodiments, the electronic device displays the generated user-specific avatar (e.g., 624, 625) on the display (e.g., FIGS. 6K-6M) (e.g., replacing display of the placeholder avatar with the user-specific avatar or changing an appearance of the placeholder avatar by morphing the placeholder avatar into the user-specific avatar).

In accordance with some embodiments, the electronic device displays (716) a view finder graphical element (e.g., 616) (e.g., a circle representing the middle of the field of view of the one or more cameras) concurrently with the display of the placeholder avatar (e.g., 617), wherein the display of the view finder graphical element, relative to the display of the placeholder avatar, is based on first or second position of the user with respect to the field of view of the one or more cameras (e.g., FIGS. 6F-6H). In some examples, if the placeholder avatar and view finder graphical element coincide, the one or more cameras and user are properly positioned (e.g., FIG. 6I). Alternatively and optionally, if the user is too far from the one or more cameras, the placeholder avatar appears smaller compared to the view finder graphical element (e.g., FIG. 6G). As another option, if the user is offset from the one or more cameras, the placeholder avatar is similarly offset from the view finder graphical element so that the placeholder avatar does not coincide with the view finder graphical element (e.g., FIG. 6F). By displaying a graphical view finder and displaying a placeholder avatar relative to the graphical view finder, a user can more easily align themselves with the camera of the electronic device, which enhances the efficiency and accuracy of using the electronic device to create a user-specific avatar. Thus, the electronic device uses less power and prolongs the battery life of the device.

In accordance with some embodiments, the electronic device determines whether the second position (e.g., orientation, user proximity, user position within the one or more cameras' field of view, and/or lighting of the user) of the user with respect to the field of view of the one or more cameras (e.g., 602) meets the first set of image criteria (e.g., criteria about proximity to the one or more cameras, orientation of the user, lighting, or relative position of the user to the one or more cameras). By determining whether second image data meets image criteria, the electronic device provides an enhanced avatar creation process that avoids using low quality or incorrect image data. Additionally, by providing feedback to the user regarding the image data, the electronic device is more likely to capture the image data needed to efficiently generate an accurate avatar of the user. Eliminating the use of incorrect or low quality image data makes the electronic device more efficient, reduces power usage, and improves battery life of the device.

In accordance with some embodiments the electronic device, after capturing the first image data, provides second guidance (e.g., 623) to the user to change position with respect to the electronic device to a second target position (e.g., displaying the user outline with a rotation to indicate that the user should rotate their head or displaying textual or other visual instructions to rotate the user's head); updates the display of the placeholder avatar (e.g., FIG. 6J) (e.g., showing the user outline rotating or positioned differently with respect to the view finder) based on image data captured after the first image data; after providing the second guidance, determines whether a third position of the user with respect to the electronic device meets a second set of image criteria (e.g., requirements about the orientation of the user's head with respect to the one or more cameras; proximity of the user to the one or more cameras; position of the user with respect to the one or more cameras); in accordance with a determination that the second detected position meets the second set of image criteria (e.g., similar criteria as the first set of image criteria with the additional criteria of a rotation of the user with respect to the electronic device), captures second image data (e.g., similar to the first image data) of the user with the one or more cameras; and in accordance with a determination that the second detected position does not meet the second set of image criteria, continues to provide the second guidance (e.g., guidance that take the same or different form as the guidance provided previously) to the user to change position with respect to the electronic device to the second target position. By providing additional guidance to the user, the electronic device is able to efficiently obtain additional image data at a variety of positions necessary to generate a user-specific avatar. Thus, the user can more quickly and efficiently interact with the electronic device, which makes the electronic device more efficient, reduces power usage, and improves battery life of the device.

In accordance with some embodiments, the first guidance (e.g., 620-622) is provided to the user (712) without changing an appearance of the placeholder avatar (e.g., 617 in FIGS. 6F-6H) based on the first image data (e.g., while in some embodiments the position and size of the placeholder avatar is based on image data, the features, shape, shading, and other aspects of the visual appearance of the placeholder avatar are not based on the first image data). In some embodiments, they are not based on any image data. In some examples, the placeholder avatar is moved within the view finder without changing the appearance (e.g., physical characteristics or features) of the avatar itself (e.g., FIGS. 6F-6I). By not updating the characteristics of the placeholder avatar based on captured image data, the likelihood that the user will continue with the avatar creation process is increased by avoiding intermediate results that may not be accurate, thereby enhancing the ability of the electronic device to create a user-specific avatar. Thus, the man-machine interface is enhanced and the likelihood of the user aborting the avatar creation process is reduced.

In accordance with some embodiments, providing the first guidance (e.g., 620-622) includes providing user feedback (e.g., haptic feedback, visual feedback, or audible feedback) when the second position of the user with respect to the field of view of the one or more cameras meets the first set of image criteria or providing instructions (e.g., textual instructions, animated instructions, or audio instructions) based on how the user should be positioned relative to the field of view of the one or more cameras (e.g., instruction the user to either move the electronic device or reposition themselves) to be in the first target position with respect to the device. By providing user feedback when the first set of image criteria are met, the usability of the electronic device is enhanced by keeping the user informed of the creation process.

In accordance with some embodiments, the electronic device, after capturing (718) the first image data (e.g., displaying a calculated skin tone based on the first image data or displaying a range of skin tones based on the first image data) displays (720) information (e.g., FIG. 6L) indicating one or more suggested skin tone colors (e.g., 626-630) selected based on the first image data; receives (724) user input confirming a respective suggested skin tone color of the one or more skin tone colors selected base on the first image data (e.g., selecting a confirmation affordance or selecting a particular skin tone); and the electronic device generation of the user-specific avatar is further based on the suggested skin tone color. In some examples, generating the user-specific avatar occurs after capturing additional image data (e.g., from one or more additional positions of the user) and the generation of the user-specific avatar is further based on the additional image data. By allowing the user to confirm the skin tone or select a new skin tone, the electronic device provides an enhanced avatar creation process by accounting for variations in lighting (which can affect skin tone determination) during the image capture process. This reduces the likelihood that the user will have to repeat the avatar creation process, which makes the electronic device more efficient, reduces power usage, and improves battery life of the device.

In accordance with some embodiments, displaying (722) information indicating one or more suggested skin tone colors selected based on the first image data is displayed without applying any of the suggested skin tone colors to an avatar. In some embodiments the electronic device generates the user-specific placeholder avatar (e.g., 624) based the first image data and using a predetermined skin tone color independent of the first image data (e.g., generating a black and white avatar that has shapes and features that resemble the user in the first image data without any skin tone coloring); and displays the user-specific placeholder avatar prior to receiving the user input confirming the respective suggested skin tone color. In some examples, generating the user-specific avatar occurs after capturing additional image data (e.g., from one or more additional positions of the user) and the generation of the user-specific avatar is further based on the additional image data. By allowing a user to select a new skin tone before painting the generated avatar, the electronic device provides a more accessible avatar creation process that reduces the risk of a user being disappointed with the skin tone that was selected based on the captured image data. This reduces the likelihood that the user will have to repeat the avatar creation process, which makes the electronic device more efficient, reduces power usage, and improves battery life of the device.

In accordance with some embodiments the electronic device, in response to capturing the first image data, updates a display of a progress indicator (e.g., an indicator around the view finder graphical element or a bar indicator), wherein the display of the progress indicator is based on the amount of avatar image data captured. In some examples, the progress indicator indicates progress towards achieving a target amount of image data for generating an avatar.

In accordance with some embodiments the electronic device captures image data of the user (e.g., the first image data or other image data) and, in accordance with a determination that the image data of the user fails to meet a lighting criteria (FIG. 6H), displays instructions (e.g., 622) for the user to change the lighting for the field of view of the one or more cameras. By providing guidance regarding lighting, the electronic device increases the accuracy of the skin tone determination by ensuring that the captured image data has proper lighting (which, in some circumstances), affects skin tone determinations based on image data, thereby providing an enhanced avatar creation process. This reduces the likelihood that the user will have to repeat the avatar creation process, which makes the electronic device more efficient, reduces power usage, and improves battery life of the device.

In accordance with some embodiments the electronic device determines a physical feature (e.g., a hair style, facial hair, or eye color) or an accessory feature (e.g., eye glasses, piercings, or tattoos) of the user based on the first image data, and generates the user-specific avatar includes adding a representation of the physical feature or the accessory feature to the user-specific avatar (e.g., FIGS. 6K-6L). In some embodiments, the user-specific avatar is expression independent (e.g., no smiling or frowning) regardless of whether the user has an expression in the first image data. In some examples, the first image data of the user includes image data identified by the electronic device as indicative of a facial expression and the user-specific avatar is generated so as to be expression independent or expression neutral. In other examples, the method does not involve identifying image data indicative of a facial expression.

In accordance with some embodiments, generating the user-specific avatar based on the first image data includes generating a plurality of avatars and wherein the plurality of avatars include a first avatar and a second avatar different than the first avatar, and the electronic device displays the plurality of avatars and receives user input selecting one of the plurality of avatars. In some examples, each of the avatars in the plurality of avatars is different. In some examples, the plurality of avatars different based on variations to a predefined set of characteristics for the avatar.

In accordance with some embodiments the electronic device, after generating the user-specific avatar, stores the avatar as a recipe (e.g., a non-graphical representation of the avatar), wherein the recipe defines the avatar structure (e.g., eyes, nose, mouth, glasses) and avatar parameters (e.g., eye color, nose size, mouth shape, glasses type). By storing the user-specific avatar as a recipe, the electronic device is able to more efficiently store and transmit the user-specific avatar by sending smaller amounts of data, such as only have to send changes to the user-specific avatar recipe instead of the entire user-specific avatar recipe. Thus, the electronic device is more efficient, reduces power usage, and improves battery life of the device.

Note that details of the processes described above with respect to method 700 (e.g., FIG. 7) are also applicable in an analogous manner to the methods described below/above. For example, methods 1000 and 1600 optionally include one or more of the characteristics of the various methods described above with reference to method 700. For example, method 700 can include certain steps of method 1000 or method 1600 (e.g., some or all of methods 1000 and 1600 can be performed subsequent to method 700 as part of the same interface). For brevity, these details are not repeated below.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 includes a display unit 802 configured to display a graphic user interface, a camera unit 804, and a processing unit 806 coupled to the display unit 802 and the camera unit 804. In some embodiments, the processing unit 806 includes a display enabling unit 810, a detecting unit 812, an image capturing unit 814, and a providing unit 816 and optionally a generating unit 818, a determining unit 820, an updating unit 822, a receiving unit 824, and a storing unit 826.

The processing unit 806 is configured to display (e.g., using display enabling unit 810) a placeholder avatar on the display, wherein the display of the placeholder avatar is based on a first position of a user with respect to a field of view of the one or more cameras of the electronic device. The processing unit 806 is configured to, while displaying the placeholder avatar, detect (e.g., using detecting unit 812) movement of the user to a second position with respect to the field of view of the one or more cameras. In response to detecting the movement of the user to the second position with respect to the field of view of the one or more cameras, the processing unit 806 is configured to: in accordance with a determination that the second position of the user with respect to the field of view of the one or more cameras meets the first set of image criteria, capture (e.g., using image capturing unit 814) first image data of the user with the one or more cameras, and in accordance with a determination that the second position of the user with respect to the field of view of the one or more cameras does not meet the first set of image criteria and while continuing to display the placeholder avatar, provide (e.g., using providing unit 816) first guidance to the user to change position with respect to the electronic device to a first target position.

In some embodiments, the processing unit 806 is further configured to, after capturing the first image data, generating (e.g., using generating unit 818) a user-specific avatar that contains features selected based on an appearance of the user determined based on the first image data.

In some embodiments, the processing unit 806 is further configured to display (e.g., using display enabling unit 810) the generated user-specific avatar on the display.

In some embodiments, the processing unit 806 is further configured to display (e.g., using display enabling unit 810) a view finder graphical element concurrently with the display of the placeholder avatar, wherein the display of the view finder graphical element, relative to the display of the placeholder avatar, is based on first or second position of the user with respect to the field of view of the one or more cameras.

In some embodiments, the processing unit 806 is further configured to determine (e.g., using determining unit 820) whether the second position of the user with respect to the field of view of the one or more cameras meets the first set of image criteria.

In some embodiments, the processing unit 806 is further configured to, after capturing the first image data, provide (e.g., using providing unit 816) second guidance to the user to change position with respect to the electronic device to a second target position; update (e.g., using updating unit 822) the display of the placeholder avatar based on image data captured after the first image data; after providing the second guidance, determine (e.g., using determining unit 820) whether a third position of the user with respect to the electronic device meets a second set of image criteria; in accordance with a determination that the second detected position meets the second set of image criteria, capture (e.g., using image capturing unit 814) second image data of the user with the one or more cameras; and in accordance with a determination that the second detected position does not meet the second set of image criteria, continue to provide (e.g., using providing unit 816) the second guidance to the user to change position with respect to the electronic device to the second target position.

In some embodiments the first guidance is provided to the user without changing an appearance of the placeholder avatar based on the first image data.

In some embodiments providing the first guidance includes providing user feedback when the second position of the user with respect to the field of view of the one or more cameras meets the first set of image criteria or providing instructions based on how the user should be positioned relative to the field of view of the one or more cameras to be in the first target position with respect to the device.

In some embodiments, the processing unit 806 is further configured to, after capturing the first image data: display (e.g., using display enabling unit 810) information indicating one or more suggested skin tone colors selected based on the first image data; receive (e.g., using receiving unit 824) user input confirming a respective suggested skin tone color of the one or more skin tone colors selected base on the first image data; and wherein generating the user-specific avatar is further based on the suggested skin tone color.

In some embodiments displaying information indicating one or more suggested skin tone colors selected based on the first image data is displayed without applying any of the suggested skin tone colors to an avatar.

In some embodiments, the processing unit 806 is further configured to generate (e.g., using generating unit 818) the user-specific placeholder avatar based the first image data and using a predetermined skin tone color independent of the first image data; and display (e.g., using display enabling unit 810) the user-specific placeholder avatar prior to receiving the user input confirming the respective suggested skin tone color.

In some embodiments, the processing unit 806 is further configured to, in response to capturing the first image data, update (e.g., using updating unit 822) a display of a progress indicator, wherein the display of the progress indicator is based on the amount of avatar image data captured.

In some embodiments the first image data includes both still data and video data.

In some embodiments, the processing unit 806 is further configured to capture (e.g., using image capturing unit 814) image data of the user; and in accordance with a determination that the image data of the user fails to meet a lighting criteria, display (e.g., using display enabling unit 810) instructions for the user to change the lighting for the field of view of the one or more cameras.

In some embodiments, the processing unit 806 is further configured to determine (e.g., using determining unit 820) a physical feature or an accessory feature of the user based on the first image data, and generating the user-specific avatar includes adding a representation of the physical feature or the accessory feature to the user-specific avatar.

In some embodiments the user-specific avatar is expression independent regardless of whether the user has an expression in the first image data.

In some embodiments generating the user-specific avatar based on the first image data includes generating a plurality of avatars and wherein the plurality of avatars include a first avatar and a second avatar different than the first avatar, the processing unit further configured to: display (e.g., using display enabling unit 810) the plurality of avatars; and receive (e.g., using receiving unit 824) user input selecting one of the plurality of avatars.

In some embodiments, the processing unit 806 is further configured to, after generating the user-specific avatar, store (e.g., using storing unit 826) the avatar as a recipe, wherein the recipe defines the avatar structure and avatar parameters.

In some embodiments the placeholder avatar is a predetermined silhouette of a person independent of the image data of the user.

The operations described above with reference to FIGS. 7A and 7B are, optionally, implemented by components depicted in FIGS. 1A-1B or FIG. 8. For example, capturing operation 708 is, optionally, implemented by camera module 143, optical sensor controller 158, and optical sensor 164. Similarly, it would be clear to a person having ordinary skill in the art how other processes can be implemented based on the components depicted in FIGS. 1A-1B.

FIGS. 9A-9H illustrate exemplary user interfaces for customizing a user avatar, in accordance with some embodiments. The user interfaces in these figures are used to illustrate the processes described below, including the processes in FIG. 10.

FIG. 9A depicts device 600 (described above with respect to FIG. 6A), which in some examples is a specific form factor for device 100, device 300, or device 500 described above. Device 600 includes display 601, which in some embodiments is a touch-sensitive display.

In FIG. 9A, device 600 is displaying avatar customization interface 900 on display 601. Avatar customization interface 900, in some examples, is accessed via the avatar creation interface described above with respect to FIGS. 6A-6M, 7A-7B, and 8. In other examples, avatar customization interface 900, or similar interface, is accessed via other methods, such as an app installed on device 600. Avatar customization interface 900 includes avatar-display region 900A, feature-selection control region 900B, and feature-option control region 900C. Avatar-display region 900A displays a currently selected avatar for editing. In the case of FIG. 9A, the currently select avatar is avatar 901.

Feature-selection control region 900B includes a ribbon of feature representations 907-911. Each representation corresponds to a feature (e.g., eyes, ears, nose, face, eyeglasses, hair, chin, eyebrows) for avatar 901. If additional feature representations are available but cannot be display due to space constraints, device 600 displays the additional feature representations in response to user input, such as a swipe on feature-selection control region 900B. Additionally, feature-control region 900B includes an indicator showing the currently selected avatar feature. In the case of FIG. 9A, the bolding on representation 909 indicates that the feature associated with representation 909 is selected for editing. In other examples, other indicators (e.g., arrows, highlighting, or being positioned in the center) are used. In some examples, one or more of the feature representations are in the shape of the corresponding feature. For example, if feature representation 908 corresponds to the avatar's eyes, then feature representation 908 is in the shape of an eye or otherwise is created to graphically show that it corresponds to eyes.

Feature-option control region 900C includes a ribbon of option representations 902-906 that correspond to different available options for the selected avatar feature. For example, in FIG. 9A, if feature representation 909 corresponds to the ear feature, option representations 902-906, in some examples, represent different types (e.g., shapes, sizes, appearances) of ears. Similar to the feature representations, one or more of the option representations are in the shape of the corresponding option. For example, if feature representation 909 corresponds to the avatar's ear, then feature representation 909 is in the shape of an ear or otherwise is created to graphically show that it corresponds to an ear. Likewise, one or more option representations 902-906 are in a shape that reflects the type of ear that corresponds to the representation. For example, a small, wide ear option representation, in some examples, is a small and wide (as compared to other representations) ear. Additionally, option-control region 900C includes an indicator showing the currently selected option. In the case of FIG. 9A, the bolding on representation 906 indicates that the option associated with representation 906 is selected for avatar 901. In other examples, other indicators (e.g., arrows, highlighting, or being positioned in the center) are used.

FIG. 9B depicts avatar customization interface 900 after a new feature has been selected for editing, for example, via touch input 912 (FIG. 9A) on feature representation 908, which corresponds to the hair of the avatar. In FIG. 9B, device 900 has updated avatar customization interface 900 to indicate that the feature (e.g., hair in FIG. 9B) corresponding to representation 908 is selected for editing; to show option representations 913-917 that correspond to the feature selected for editing; to indicate that option representation 915 (e.g., the hair style of avatar 901 depicted in FIG. 9B) is the currently selected feature option for avatar 901; to show a color-selection control region 900D that includes color representations 918-922 that correspond to available colors for the selection feature option; and to indicate a currently selected color (the color corresponding to representation 920) for the currently selected feature option.

Figure 9C:
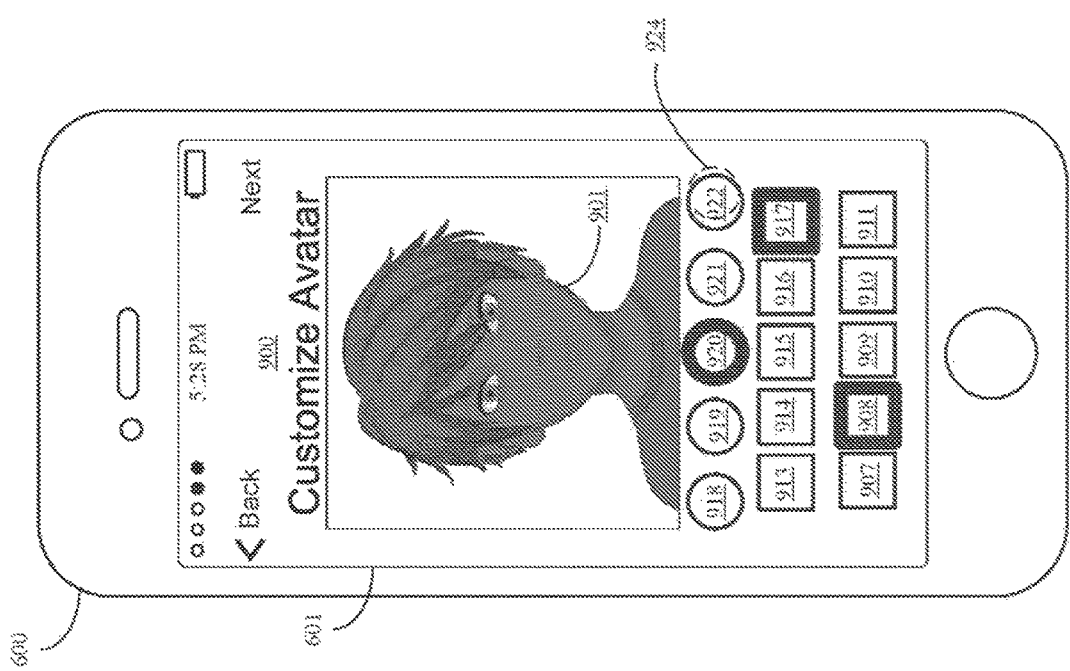
Figure 10A:
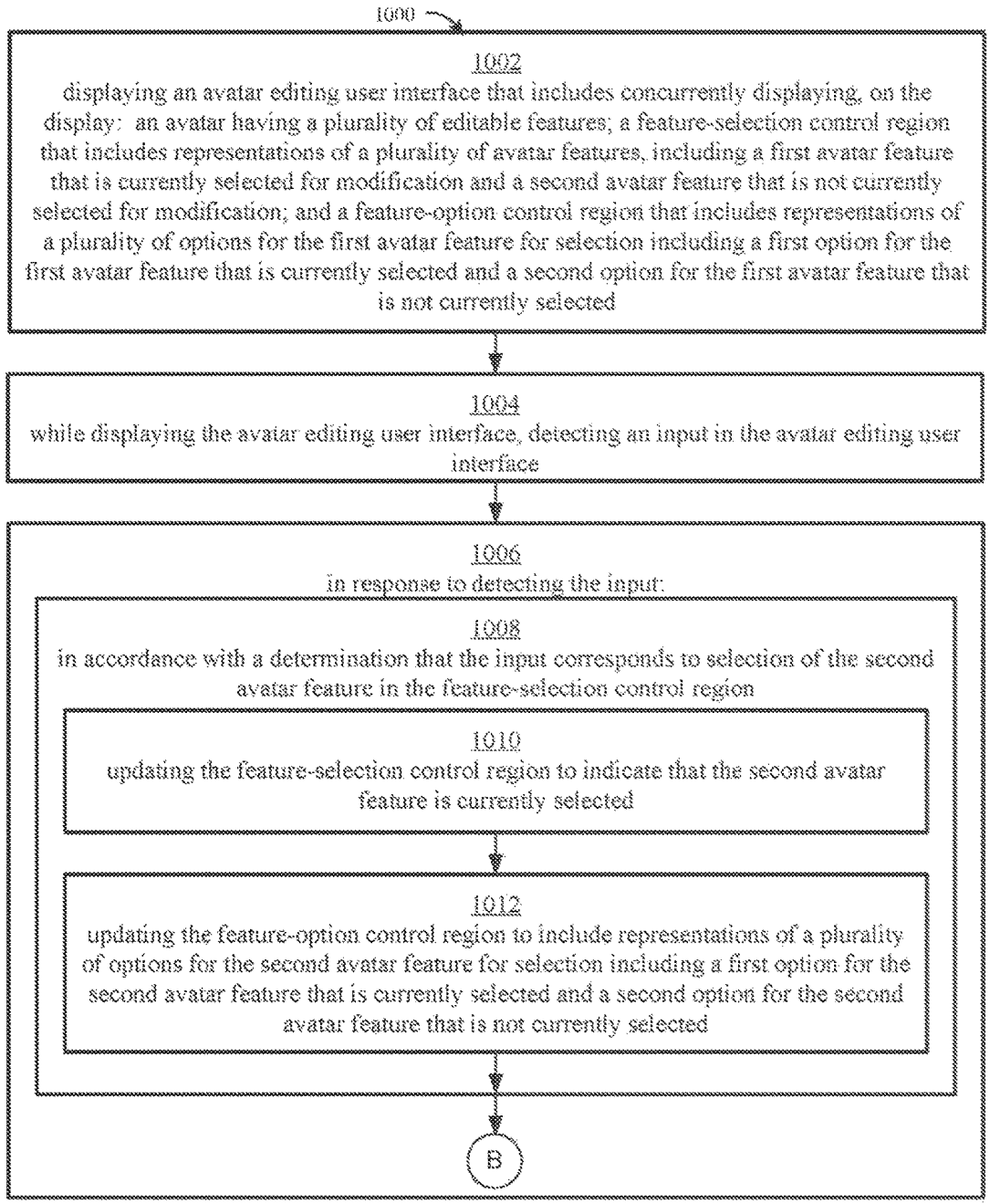
FIGS. 10A-10B is a flow diagram illustrating a method for customizing a user avatar.
Figure 10B:
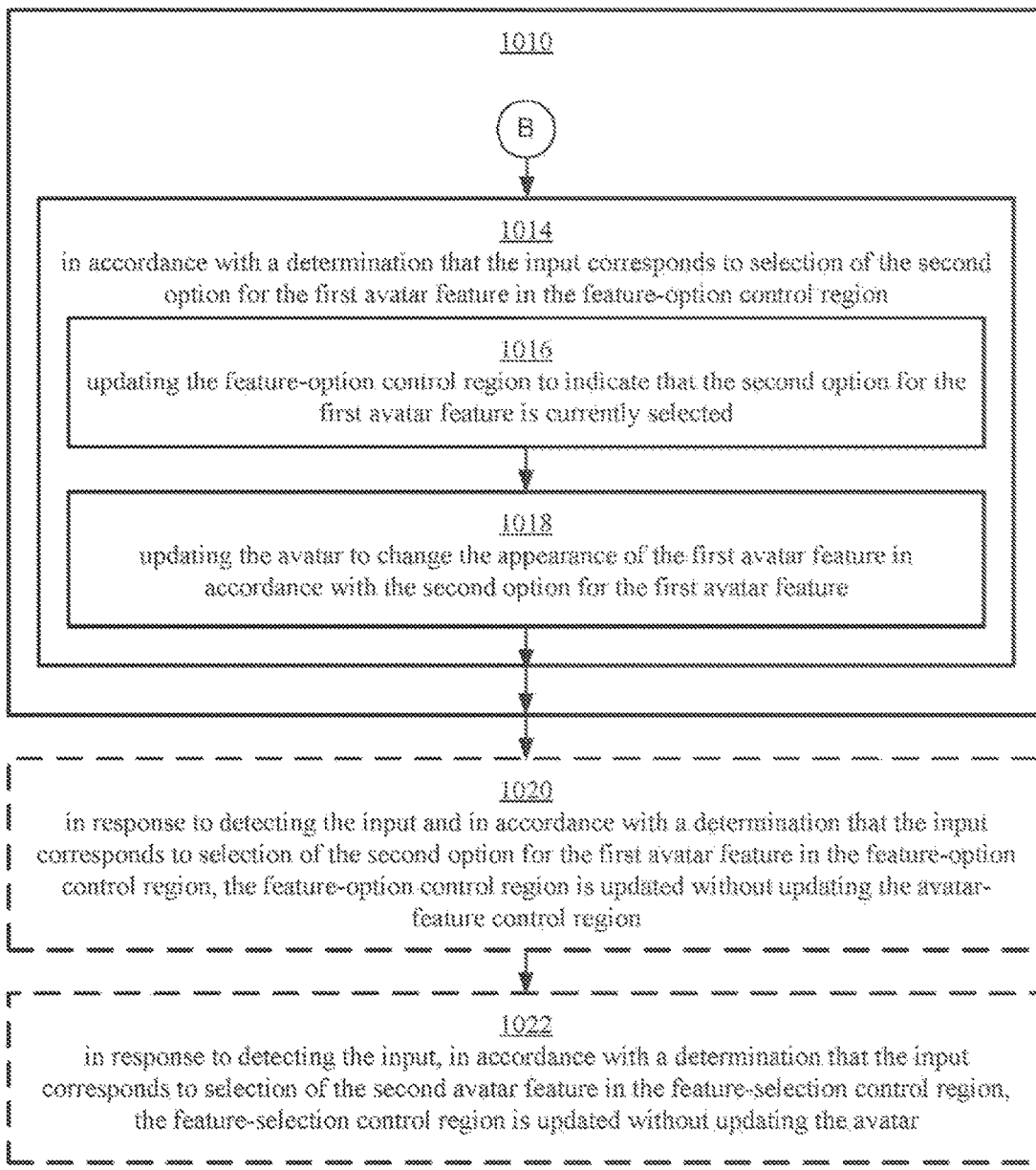

FIG. 9C depicts avatar customization interface 900 after the user selected a new hair style corresponding to representation 917, for example via touch 923 in FIG. 9B. Avatar 901 is updated to reflect the new hair style. Additionally, avatar customization interface 900 is updated to indicate that representation 917 is the currently selected feature option.

FIG. 9D depicts avatar customization interface 900 after the user selected a new hair color corresponding to representation 922, for example via touch 924 in FIG. 9C. Avatar 901 is updated to reflect the new hair color. Additionally, avatar customization interface 900 is updated to indicate that representation 922 is the currently selected color option.

Figure 9F:
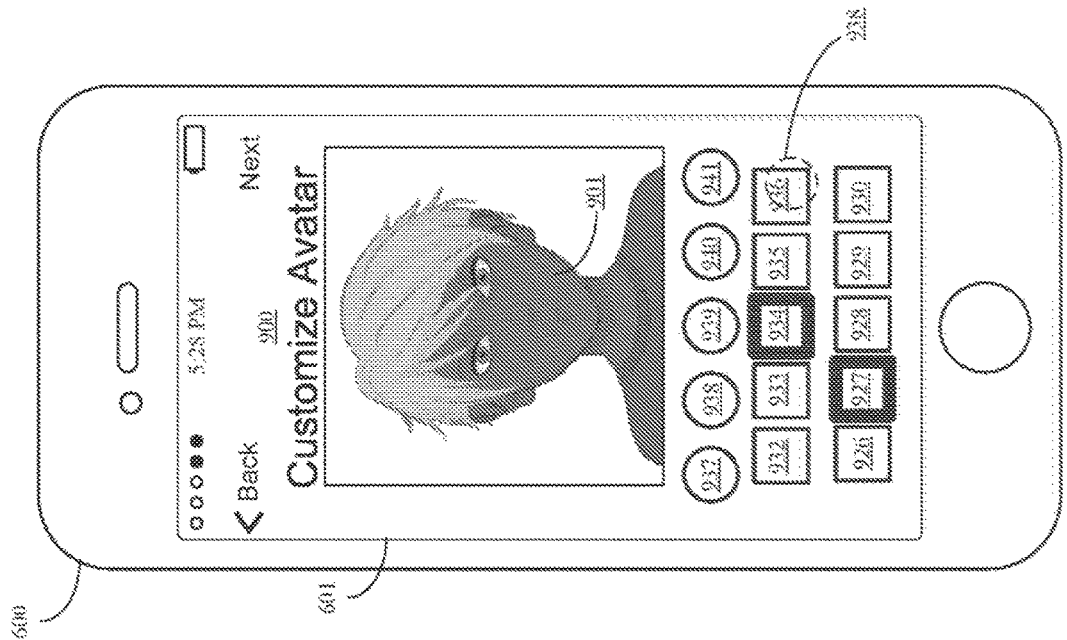
Figure 9E:
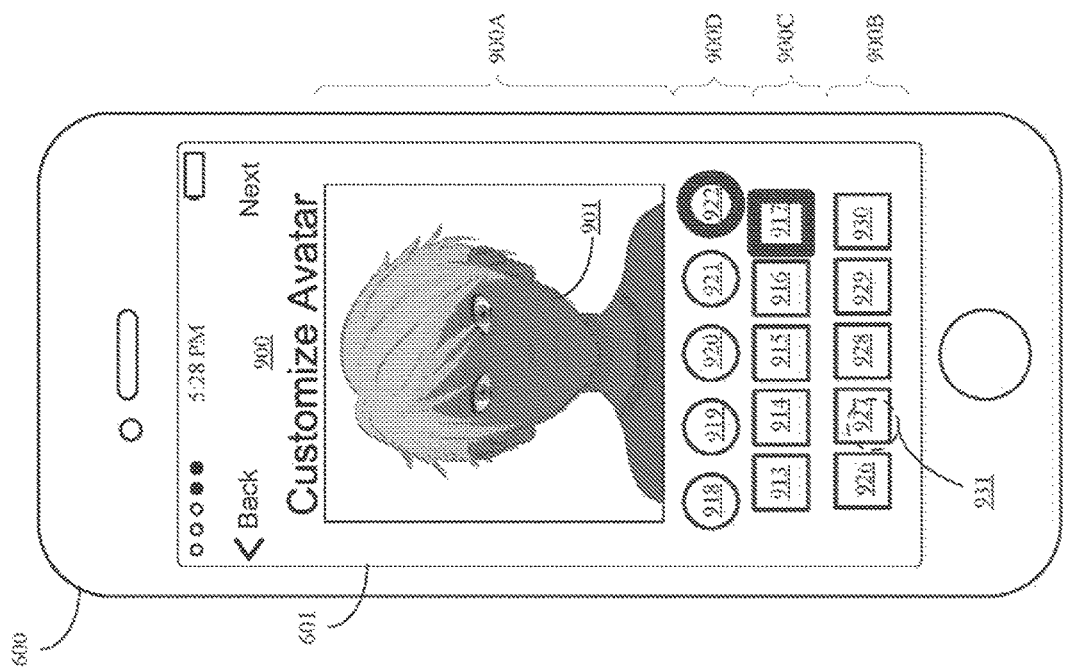

FIG. 9E depicts avatar customization interface 900 after additional feature representations 926-930 are displayed in feature-selection control region 900B. These additional feature representations 926-930 are displayed in response to, for example, a swipe gesture (e.g., swipe gesture 925 of FIG. 9D) received on display 601 over feature-selection control region 900B. In some embodiments, additional option and color representations are displayed in feature-option control region 900C and color-selection control region 900D, respectively, in response to receiving similar input in those regions.

FIG. 9F depicts avatar customization interface 900 after the feature (in this example, the feature is eyeglasses)

corresponding to representation 927 has been selected for editing, for example, via touch 931 of FIG. 9E. Option representations 932-936 display different style options for the avatar's eyeglasses. Option representation 934 corresponds to a no-eyeglasses option, which is reflected in avatar 901 in FIG. 9F. Additionally, although color representations 937-941 are available for the eyeglass feature, because the no-eyeglass option is currently selected, no color representation is currently indicated as being selected.

Figure 9H:
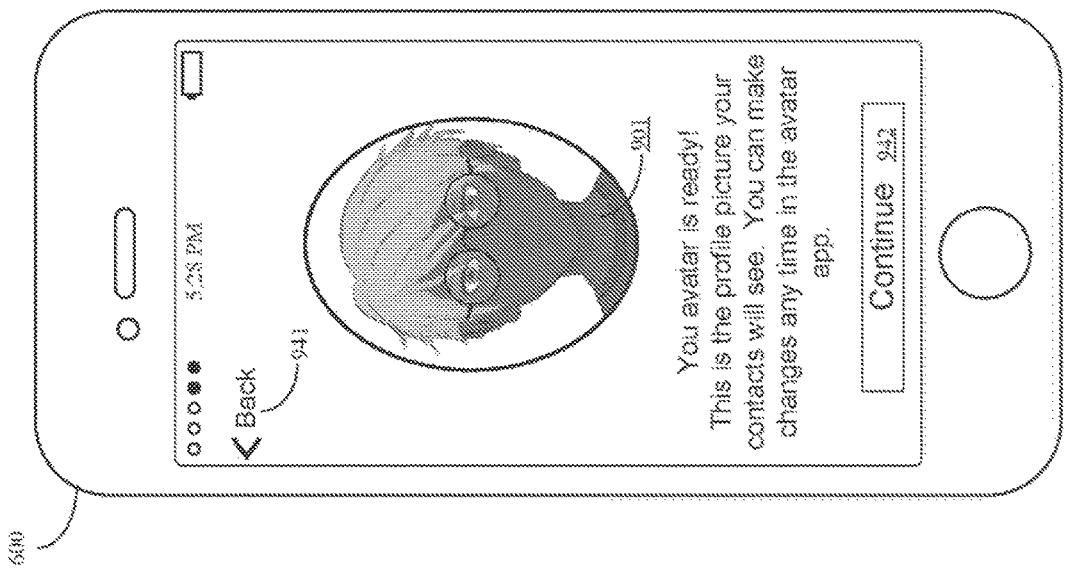
Figure 9G:
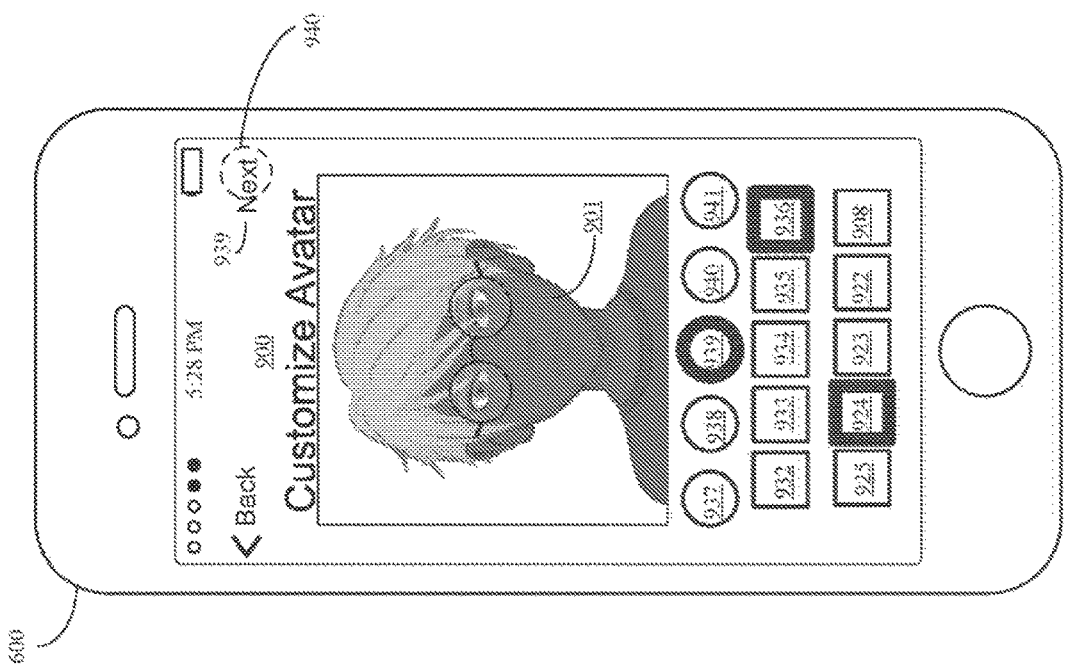

FIG. 9G depicts avatar customization interface 900 after the eyeglass style corresponding to representation 936 has been selected, for example, via touch 937 of FIG. 9F. As reflected in avatar 901, representation 936 corresponds to the eyeglasses that avatar 901 is depicted as wearing. Additionally, the color corresponding to representation 939 is selected for the eyeglasses, either by default or by user selection.

FIG. 9H depicts the completion of the avatar customization process in response to, for example, selection of next button 939 (FIG. 9G) via touch 940 of FIG. 9G. In response to selection of back button 941, the avatar customization process can be reentered. In response to selection of continue button 942, the user can continue the process that called the avatar customization process, or, in some embodiments, continue button 942 is instead an exit button that exits the application.

FIG. 10 is a flow diagram illustrating a method for customizing a user avatar using an electronic device in accordance with some embodiments. Method 1000 is performed at a device (e.g., 100, 300, 500) with a display. Some operations in method 1000 are, optionally, combined, the order of some operations are, optionally, changed, and some operations are, optionally, omitted.

As described below, method 1000 provides an intuitive way for customizing a user avatar. The method reduces the cognitive burden on a user for customizing a user avatar, thereby creating a more efficient human-machine interface. For battery-operated computing devices, enabling a user to customizing a user avatar faster and more efficiently conserves power and increases the time between battery charges.

An electronic device (e.g., device 600 of FIG. 9A) with a display (e.g., display 601) and one or more input devices (e.g., display 601 when it is a touch-sensitive display). The electronic device displays (1002) an avatar editing user interface (e.g., 900) that includes concurrent display, on the display, of: an avatar (e.g., 901) (e.g., an avatar loaded from memory or an avatar that was generated according to the previous claim) having a plurality of editable features (e.g., 907-911) (e.g., hair styles, facial features, clothing styles, accessories); a feature-selection control region (e.g., 900B) that includes representations (e.g., 907-911) (e.g., user-selectable user interface objects in a shape that corresponds to the category, such that a hair feature category will have an affordance that looks like a wig and a nose feature category will have an affordance in the shape of a nose) of a plurality of avatar features, including a first avatar feature that is currently selected for modification (e.g., 909 in FIG. 9A) (e.g., the hair style feature category corresponds to a plurality of hair style types, such as no hair, curly hair, straight hair) and a second avatar feature that is not currently selected for modification (e.g., 907, 908, 910, or 911); and a feature-option control region (e.g., 900C) that includes representations (e.g., 902-906) of a plurality of options for the first avatar feature for selection including a first option (e.g., 906) for the first avatar feature that is currently selected and a second option (e.g., 902-903) for the first avatar feature that is not currently selected. In some embodiments the representations in the feature-selection control region have a shape based on the shape of their respective avatar features. In some embodiments the representations in the feature-option control region have a shape based on the shape of their respective avatar feature options. In some embodiments the display of the avatar includes an indicator for the first avatar feature when the first avatar feature is currently selected. By displaying different control regions for feature selection and feature options, the electronic device provides an avatar customization process that is enhanced with an intuitive interface that is quickly understood by users. Thus, the user can customize the avatar with fewer interactions, which makes the electronic device more efficient, reduces power usage, and improves battery life of the device.

While displaying the avatar editing user interface, the electronic device detects (1004) an input in the avatar editing user interface (e.g., 912). In response to detecting the input (1006) and in accordance with a determination that the input corresponds to selection of the second avatar feature (e.g., 908 in FIG. 9A) in the feature-selection control region (1008), the electronic device updates (1010) the feature-selection control region to indicate that the second avatar feature is currently selected (e.g., FIG. 9B) (e.g., moving a feature indicator to highlight the second avatar feature); and updates (1012) the feature-option control region to include representations (e.g., 913-917) (e.g., in some embodiments, the feature option representations are in the same shape as the corresponding feature option, such as the representation for curly hair will look curly) of a plurality of options for the second avatar feature for selection including a first option (e.g., 915) for the second avatar feature that is currently selected and a second option (e.g., 913, 914, 916, or 917) for the second avatar feature that is not currently selected. In some examples, the display of feature options for the first feature is replaced with feature options for the second feature. For example, when the first feature is hair style and the second feature is nose style, display of representation for different hair style options are replaced with display of affordances for different nose style options.

In accordance with a determination that the input (e.g., 923) corresponds to selection of the second option (e.g., 917) for the first avatar feature in the feature-option control region (1014), the electronic device updates (1016) the feature-option control region to indicate that the second option for the first avatar feature is currently selected (FIG. 9C); and updates (1018) the avatar to change the appearance of the first avatar feature in accordance with the second option for the first avatar feature (e.g., the hair of avatar 901 is updated from FIG. 9B to FIG. 9C) (e.g., changing the avatar based on characteristics of the feature option or if the feature selection is for nose styles, the shape of a nose changes to correspond to the selected nose style). In some embodiments, the electronic device updating the avatar to change the appearance of the first avatar feature in accordance with the second option for the first avatar feature includes the electronic device transitioning the first avatar feature based on the first option to the first avatar feature based on the second option via an animation. In some embodiments, in response to detecting the input and in accordance with a determination that the input corresponds to selection of the second option for the first avatar feature in the feature-option control region, the feature-option control region is updated (1020) without updating the feature-selection control region (e.g., the hair of avatar 901 is updated from FIG. 9B to FIG. 9C but the feature-selection control region remains the same). In some embodiments, in response to detecting the input, in accordance with a determination that the input corresponds to selection of the second avatar feature in the feature-selection control region, the feature-selection control region is updated (1020) without updating the avatar (e.g., the transition from FIG. 9A to FIG. 9B updates the feature-selection control region but does not change the avatar). In some examples, the input includes a gesture input, such as a tap, a swipe, or other type of gesture. By separating the updates of display of the feature options and feature selections, the electronic device' operability is enhanced by not updating the control regions or avatar when the respective portions are not changed while maintaining the user's ability to review what other feature and options are available, which makes the electronic device more efficient, reduces power usage, and improves battery life of the device.

In accordance with some embodiments, displaying the avatar editing user interface further includes the electronic device concurrently displaying on the display a color-selection region (e.g., 900D) that includes representations of a plurality of color options (e.g., 918-922) for the first avatar feature, including a first color that is currently selected (e.g., 920) and a second color (e.g., 918, 919, 921, or 922) that is not currently selected, wherein the color-selection region is displayed concurrently with the avatar (e.g., 901), the feature-selection control region (e.g., 900B), and the feature-option control region (e.g., 900C). In some embodiments the electronic device, while displaying the color-selection region, in response to detection of a user input (e.g., 924) corresponding to selection of the second color (e.g., 922), updating the display of the first avatar feature in the avatar based on the second color (e.g., FIG. 9D).

In accordance with some embodiments, the first avatar feature is avatar clothing (e.g., a shirt, hat, or tie) and updating the display of the first avatar feature in the avatar based on the second color includes updating the color of the avatar clothing to the second color (e.g., changing the entire color of the clothing or some portion of the clothing, such as a color of part of a clothing pattern). In some embodiments, the first avatar feature (e.g., 924) is an avatar accessory (e.g., glasses, a hat, piercing, or jewelry).

In accordance with some embodiments, the display is a touch-sensitive display and the electronic device, in response to receiving a gesture (e.g., a touch-and-drag gesture or a pinch gesture) on the touch-sensitive display, modifies a characteristic of first avatar feature based on the gesture; and updates the display of the avatar based on the modified parameter. In some examples, the received gesture is a pinch gesture, a touch-and-drag gesture, or other type of gesture. In some embodiments, the modification occurs in accordance with the processes described with respect to FIGS. 15A-15F and 16A-16B, below. By using gestures to modify the features of the avatar, the avatar customization process is made more efficient by avoiding the use of more complex controls to adjust the settings of the various features. This allows more information to be presented on the screen and the electronic device to operate more efficiently, which improves overall performance and/or prolongs battery life.

In accordance with some embodiments the electronic device displays an avatar management interface including a plurality of previously saved avatars (e.g., a 3×3 listing of avatars); receives user input selecting a previously saved avatar; and in response to the user input selecting the previously save avatar, displays the previously saved avatar in the avatar editing user interface. By providing for different variations of a generated avatar, the electronic device provides enhances the avatar editing process by making it faster for a user to select an avatar that the user is comfortable sharing as representative of the user, which makes the electronic device more efficient, reduces power usage, and improves battery life of the device.

In accordance with some embodiments the electronic device, after updating the avatar to change the appearance of the first avatar feature in accordance with the second option for the first avatar feature, stores the avatar as an avatar recipe (e.g., a non-graphical representation of the avatar), wherein the avatar recipe defines avatar structure, including the second option, (e.g., eyes, nose, mouth, glasses) and avatar parameters (e.g., eye color, nose size, mouth shape, glasses type).

In accordance with some embodiments the electronic device sends the avatar recipe to a contact. In some examples, the avatar recipe is sent to another user in response to a user input corresponding to a request to send the avatar recipe to the other user. For example, the avatar recipe is sent to another user as described below with respect to process 1300 of FIGS. 13A and 13B.

In accordance with some embodiments, the electronic device, in accordance with not detecting, via the one or more input devices, input associated with the avatar editing user interface for a predetermined period of time (e.g., after a predetermined period of time after liftoff, after the user breaks contact with the touch screen), updates the display of the avatar with an avatar animation.

In accordance with some embodiments, the electronic device updates the avatar to change the appearance of the first avatar feature in accordance with the second option for the first avatar feature (e.g., in FIGS. 9F to 9G, the avatar is updated to include glasses) includes the electronic device modifying an expression of the avatar based on the second option. In some examples, if the first avatar feature is for eyeglasses and the first option and the second option are different styles of eyeglasses, the selection of the second option randomly causes the avatar to be excited, smile, give positive feedback, or otherwise provide feedback.

In some embodiments, the electronic device, while displaying the avatar, in response to detecting input via one or more input devices of the electronic device (e.g., a mouse cursor or touch), updates the eyes of the avatar based on a position associated with the input (e.g., the position of a cursor on the screen or the position of a touch input). In some embodiments, the electronic device updates the avatar based on an animation loop, wherein the animation loop includes a series of expressions for the avatar. In some embodiments, the animation loop has a time duration and the electronic device determines a random time offset less than the time duration, wherein updating the avatar based on the animation loop includes updating the avatar starting at a position in the animation loop based on the random time offset (e.g., to avoid synchronization of the animation loop with other avatars that are displaying the same animation loop). In some embodiments, the electronic device ceases to update the avatar based on the animation loop after a predetermined period of time. By animating an avatar according to an animation loop with a random beginning time, the electronic device is enhanced by ensuring that multiple avatars (e.g., avatars for different users) displayed together are not animated in unison. This increases the likelihood that the user will sustain interaction with the avatar in the customization process or in other situations.

Figure 11:
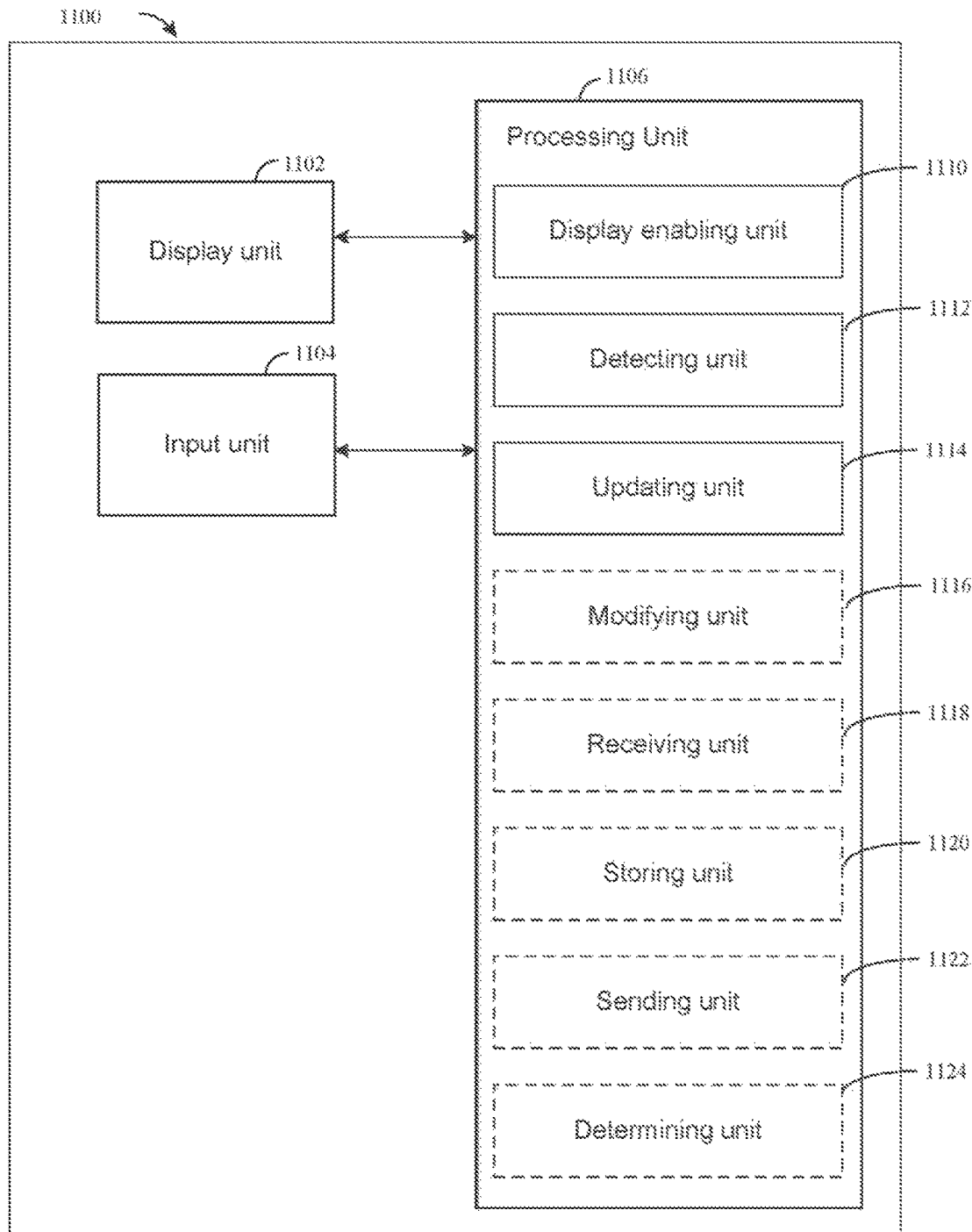
FIG. 11 shows an exemplary functional block diagram of an electronic device.

In accordance with some embodiments, FIG. 11 shows an exemplary functional block diagram of an electronic device 1100 configured in accordance with the principles of the various described embodiments. In accordance with some embodiments, the functional blocks of electronic device 1100 are configured to perform the techniques described above. The functional blocks of the device 1100 are, optionally, implemented by hardware, software, or a combination of hardware and software to carry out the principles of the various described examples. It is understood by persons of skill in the art that the functional blocks described in FIG. 11 are, optionally, combined or separated into sub-blocks to implement the principles of the various described examples. Therefore, the description herein optionally supports any possible combination or separation or further definition of the functional blocks described herein.

As shown in FIG. 11, an electronic device 1100 includes a display unit 1102 configured to display a graphic user interface, an input unit 1104, and a processing unit 1106 coupled to the display unit 1102 and input unit 1104. In some embodiments, the processing unit 1106 includes a display enabling unit 1110, a detecting unit 1112, and an updating unit 1114, and, optionally, a modifying unit 1116, a receiving unit 1118, a storing unit 1120, a sending unit 1122, and a determining unit 1124.

The processing unit 1106 is configured to display (e.g., using display enabling unit 1110) an avatar editing user interface that includes concurrently displaying, the display includes: an avatar having a plurality of editable features; a feature-selection control region that includes representations of a plurality of avatar features, including a first avatar feature that is currently selected for modification and a second avatar feature that is not currently selected for modification; a feature-option control region that includes representations of a plurality of options for the first avatar feature for selection including a first option for the first avatar feature that is currently selected and a second option for the first avatar feature that is not currently selected. The processing unit 1106 is further configured to, while displaying the avatar editing user interface, detect (e.g., using detecting unit 1112) an input in the avatar editing user interface. In response to detecting the input, the processing unit 1106 is configured to, in accordance with a determination that the input corresponds to selection of the second avatar feature in the feature-selection control region, update (e.g., using updating unit 1114) the feature-selection control region to indicate that the second avatar feature is currently selected; and update (e.g., using updating unit 1114) the feature-option control region to include representations of a plurality of options for the second avatar feature for selection including a first option for the second avatar feature that is currently selected and a second option for the second avatar feature that is not currently selected. The processing unit 1106 is further configured to, in accordance with a determination that the input corresponds to selection of the second option for the first avatar feature in the feature-option control region, update (e.g., using updating unit 1114) the feature-option control region to indicate that the second option for the first avatar feature is currently selected; and update (e.g., using updating unit 1114) the avatar to change the appearance of the first avatar feature in accordance with the second option for the first avatar feature.

In some embodiments, in response to detecting the input and in accordance with a determination that the input corresponds to selection of the second option for the first avatar feature in the feature-option control region, the feature-option control region is updated without updating the avatar-feature control region.

In some embodiments, in response to detecting the input and in accordance with a determination that the input corresponds to selection of the second avatar feature in the feature-selection control region, the feature-selection control region is updated without updating the avatar.

In some embodiments, the display of the avatar editing user interface further includes concurrently display on the display of a color-selection region that includes representations of a plurality of color options for the first avatar feature, including a first color that is currently selected and a second color that is not currently selected, wherein the color-selection region is displayed concurrently with the avatar, the feature-selection control region, and the feature-option control region.

In some embodiments the processing unit 1106 is further configured to, while displaying the color-selection region, in response to detection of a user input corresponding to selection of the second color, update (e.g., using updating unit 1114) the display of the first avatar feature in the avatar based on the second color.

In some embodiments, the first avatar feature is avatar clothing and updating the display of the first avatar feature in the avatar based on the second color includes updating the color of the avatar clothing to the second color.

In some embodiments, the first avatar feature is an avatar accessory.

In some embodiments, the display unit is a touch-sensitive display unit, the processing unit 1106 further configured to, in response to receiving a gesture on the touch-sensitive display, modify (e.g., using modifying unit 1116) a characteristic of first avatar feature based on the gesture; and update (e.g., using updating unit 1114) the display of the avatar based on the modified parameter.

In some embodiments the processing unit 1106 is further configured to display (e.g., using display enabling unit 1110) an avatar management interface including a plurality of previously saved avatars; and receive (e.g., using receiving unit 1118) user input selecting a previously saved avatar; and in response the user input selecting the previously save avatar, display (e.g., using display enabling unit 1110) the previously saved avatar in the avatar editing user interface.

In some embodiments the processing unit 1106 is further configured to, after updating the avatar to change the appearance of the first avatar feature in accordance with the second option for the first avatar feature, store (e.g., using storing unit 1120) the avatar as an avatar recipe, wherein the avatar recipe defines avatar structure, including the second option, and avatar parameters.

In some embodiments the processing unit 1106 is further configured to send (e.g., using sending unit 1122) the avatar recipe to a contact.

In some embodiments the processing unit 1106 is further configured to receive (e.g., using receiving unit 1118) an avatar recipe for a first contact; and display (e.g., using display enabling unit 1110) a contact information for a plurality of contacts, including the first contact, wherein the contact information displayed for the first contact includes an avatar based on the avatar recipe for the first contact.

In some embodiments, the display of the avatar includes an indicator for the first avatar feature when the first avatar feature is currently selected.

In some embodiments, the representations in the feature-selection control region have a shape based on the shape of their respective avatar features.

In some embodiments, the representations in the feature-option control region have a shape based on the shape of their respective avatar feature options.

In some embodiments the processing unit 1106 is further configured to, in accordance with not detecting, via the one or more input devices, input associated with the avatar editing user interface for a predetermined period of time, update (e.g., using updating unit 1114) the display of the avatar with an avatar animation.

In some embodiments, updating the avatar to change the appearance of the first avatar feature in accordance with the second option for the first avatar feature includes modifying an expression of the avatar based on the second option.

In some embodiments the processing unit 1106 is further configured to, while displaying the avatar, in response to detecting input via one or more input devices of the electronic device, update (e.g., using updating unit 1114) the eyes of the avatar based on a position associated with the input.

In some embodiments the processing unit 1106 is further configured to update (e.g., using updating unit 1114) the avatar based on an animation loop, wherein the animation loop includes a series of expressions for the avatar.

In some embodiments the animation loop has a time duration and the processing unit 1106 is further configured to determine (e.g., using determining unit 1124) a random time offset less than the time duration, wherein updating the avatar based on the animation loop includes updating the avatar starting at a position in the animation loop based on the random time offset.

In some embodiments the processing unit 1106 is further configured to cease to update the avatar based on the animation loop after a predetermined period of time.

In some embodiments, updating the avatar to change the appearance of the first avatar feature in accordance with the second option for the first avatar feature includes transitioning the first avatar feature based on the first option to the first avatar feature based on the second option via an animation.

The operations described above with reference to FIGS. 10A and 10B are, optionally, implemented by components depicted in FIGS. 1A-1B or FIG. 11. For example, detecting operation 1004 is, optionally, implemented by event sorter 170, display controller 156, and touch-sensitive display system 112. Similarly, it would be clear to a person having ordinary skill in the art how other processes can be implemented based on the components depicted in FIGS. 1A-1B.

FIGS. 12A-12J illustrate exemplary user interfaces for using avatar stickers in messages, in accordance with some embodiments. The user interfaces in these figures are used to illustrate the processes described below, including the processes in FIG. 13.

Figure 12A:
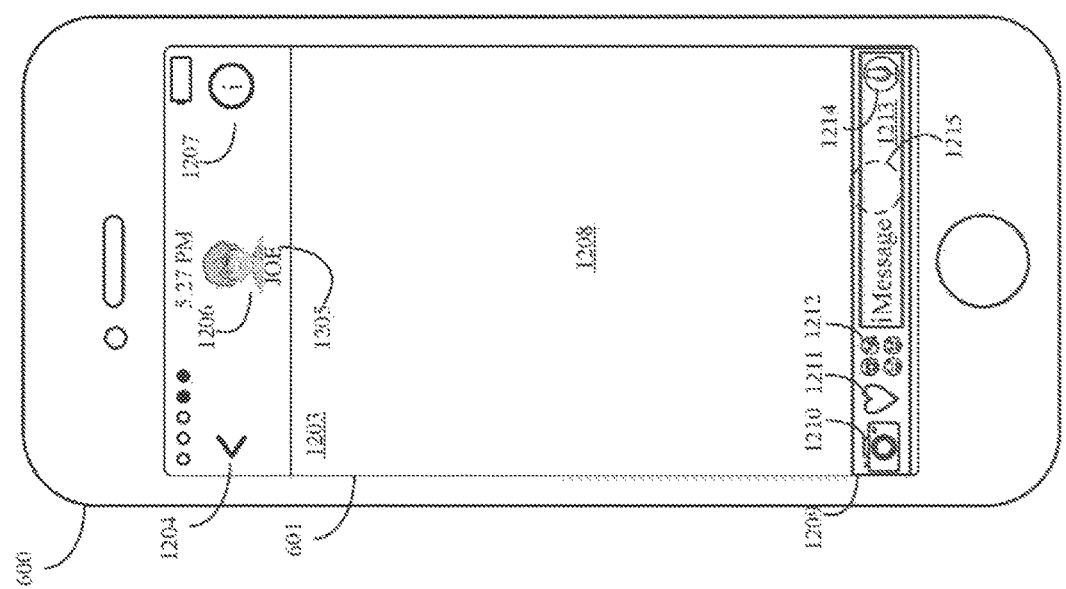
Figure 13A:
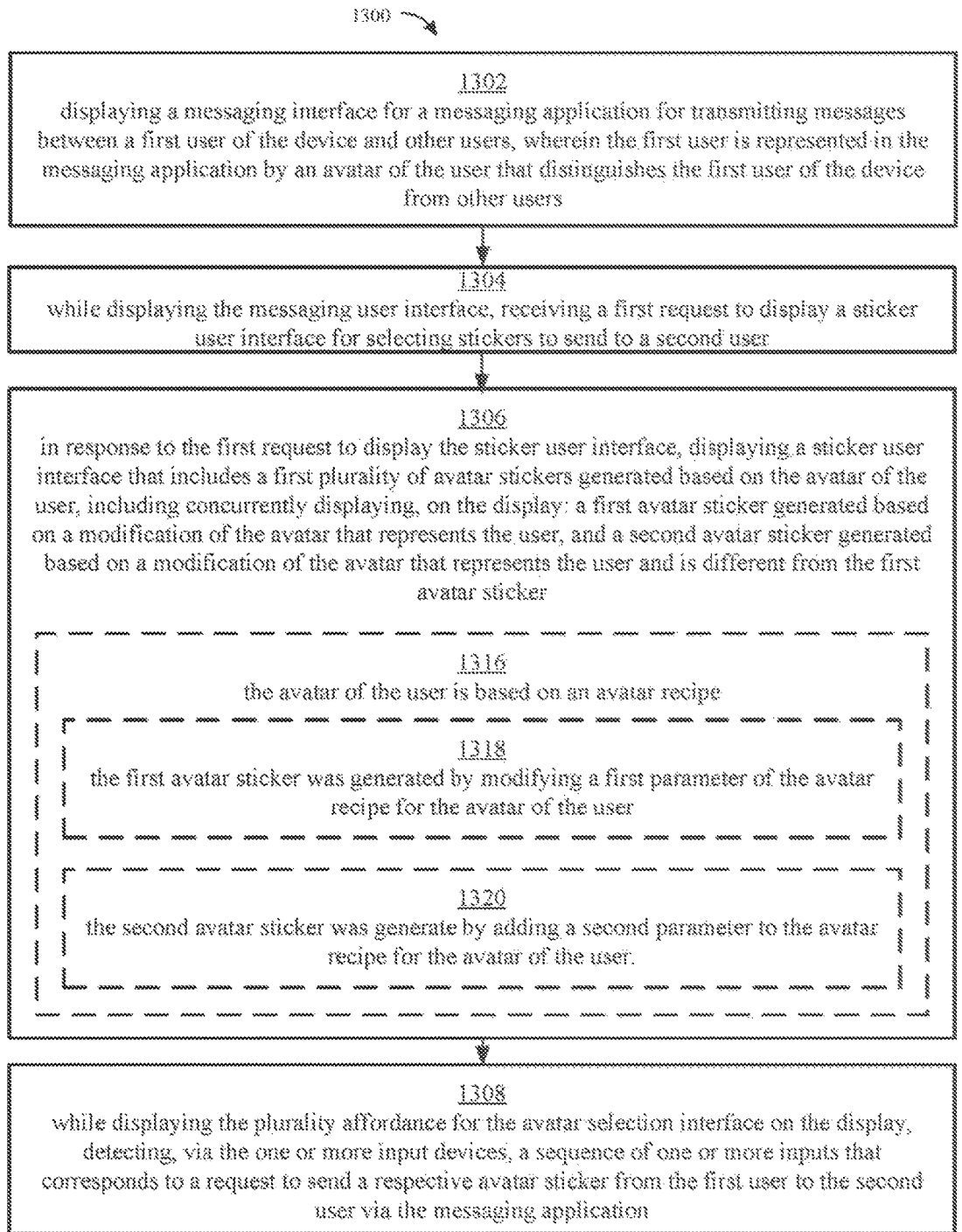
FIGS. 13A-13B is a flow diagram illustrating a method for using avatar stickers in messages.
Figure 13B:
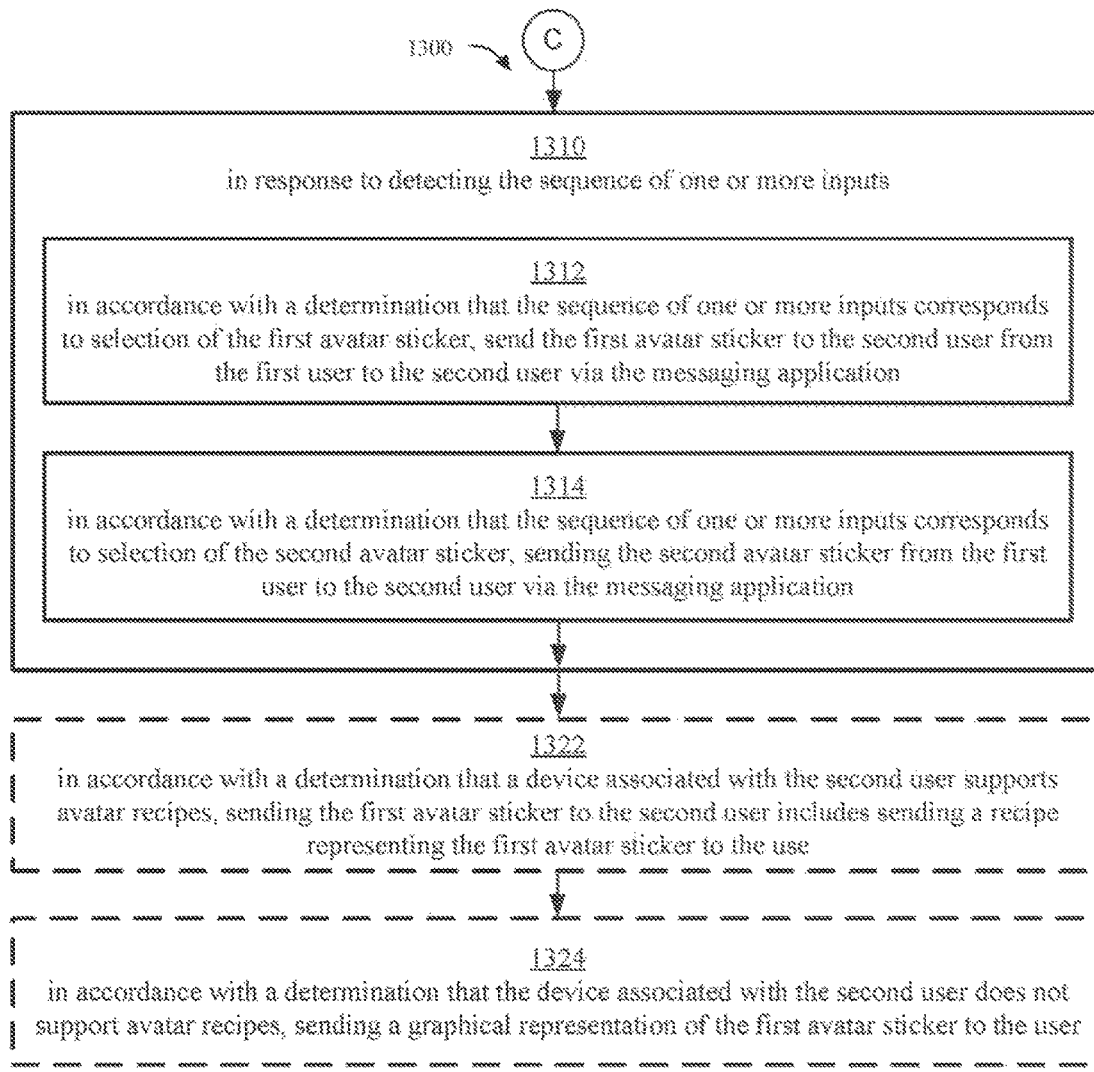

FIG. 12A depicts device 600 (described above with respect to FIG. 6A), which in some examples is a specific form factor for device 100, device 300, or device 500 described above. Device 600 includes display 601, which in some embodiments is a touch-sensitive display.

In FIG. 12A, display 1201 is displaying messaging interface 1203 for another named "Joe." Messaging interface 1203 includes back button 1204, username 1205, user picture 1206, and contact information button 1207. In response to the user selecting back button 1204, by, for example, touching back button 1204 on display 1201, messaging interface 1203 returns to a main messaging screen where recent messages are displayed and/or other users are selected for communicating with. Username 1205 and user picture 1206 indicate the current other user that messaging interface 1203 is configured to communicate with. User picture 1206 is, for example, an avatar (e.g., emoji or other graphical representation (e.g., a non-photorealistic representation)) for the other user, a picture of the other user, or some other image associated with the other user. In response to the user selecting contact information button 1207, options, settings, and other actions associated with the contact are accessible. In some examples, the contact information button 1207 causes device 1200 to open a contact interface page that allows the user to initiate communicate with the other user using other channels of communication, allows the user to send certain types of information (e.g., a current location) to the other user, allows the user to change communications settings for the other user, and/or allows the user to review information related to previous communications with the user.

Messaging interface 1203 includes message area 1208, which is empty in FIG. 12A, and message entry area 1209. Message entry area includes photo button 1210, drawing button 1211, sticker button 1212, text entry field 1213, and voice recognition button 1214. Photo button 1210 allows the user to either select an existing picture/video or capture a new picture/video to include in a message to the other user. Drawing button 1211 allows the user to create a sketch to include in a message to the other user. Sticker button 1212 allows a user to select stickers to include in a message to the other user. Text entry field 1213 allows a user to enter text that will be included in a message to the other user. In FIG. 12A, text entry field 1213 includes the word "iMessage," which indicates the type of textual message that will be sent to the other user. Voice recognition button 1214 allows a user to enter text for text entry field 1213 by speaking into device 1200 instead of manually entering the text.

As depicted in FIG. 12B, in response to user input selecting text entry field 1213, such as touch 1215 in FIG. 12A, keyboard 1216 is displayed on display 1201. Additionally, text entry field 1213 is moved up the display and expanded by hiding photo button 1210, drawing button 1211, and sticker button 1212 of FIG. 12A. These buttons are redisplayed if the user selects expand button 1217. Additionally, in some examples, a cursor (not shown) is displayed inside of text entry field 1213.

As depicted in FIG. 12C, in response to selection of letters on keyboard 1216 (e.g., via touches on keyboard 1216, such as touches 1218 and 1219 in FIG. 12B on the letters "H" and "I," respectively), text entry field 1213 is updated to include the selected letters. Additionally, voice recognition button 1214 (FIG. 12B) is replaced with send button 1220, which sends the currently entered message, including entered text and other data such as image data, to the other user.

FIG. 12D depicts messaging interface 1203 after additional text entry via additional touches on keyboard 1216. Text entry field 1213 includes the additional entered text.

Once the user is done entering text in text entry field 1213, the user indicates that the message is ready to be sent by, for example, selecting send button 1220 via touch 1221 on display 1201. In response, device 1200 prepares the message that includes, in the example of FIG. 12D, the text in text entry field 1213. Once the message is ready to send, device 1200 sends the message to the other user (the other user named "Joe" in the case of the example of FIGS. 12A-12J).

Figure 12E:
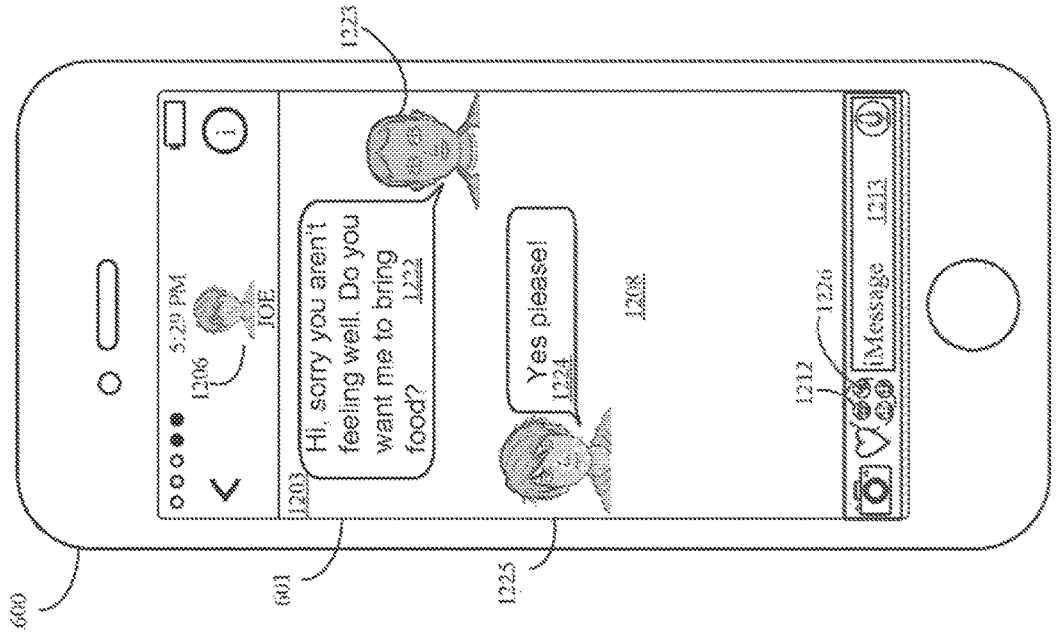

As depicted in FIG. 12E, after sending the message to the other user, the message content, including the text of text entry field 1213, is displayed in message area 1208 in displayed in text box 1222. Text box 1222, optionally, also includes other, non-textual content of the message (e.g., images, animations, video, etc.). In addition to displaying text box 1222, avatar 1223 is also displayed adjacent to text box 1222 (e.g., the message is coming from the avatar's mouth). In some embodiments, avatar 1223 is generated based on a previously defined (e.g., baseline) avatar or avatar model (e.g., a wire, mesh, or structural model) that represents the user of device 1200.

Figure 12F:
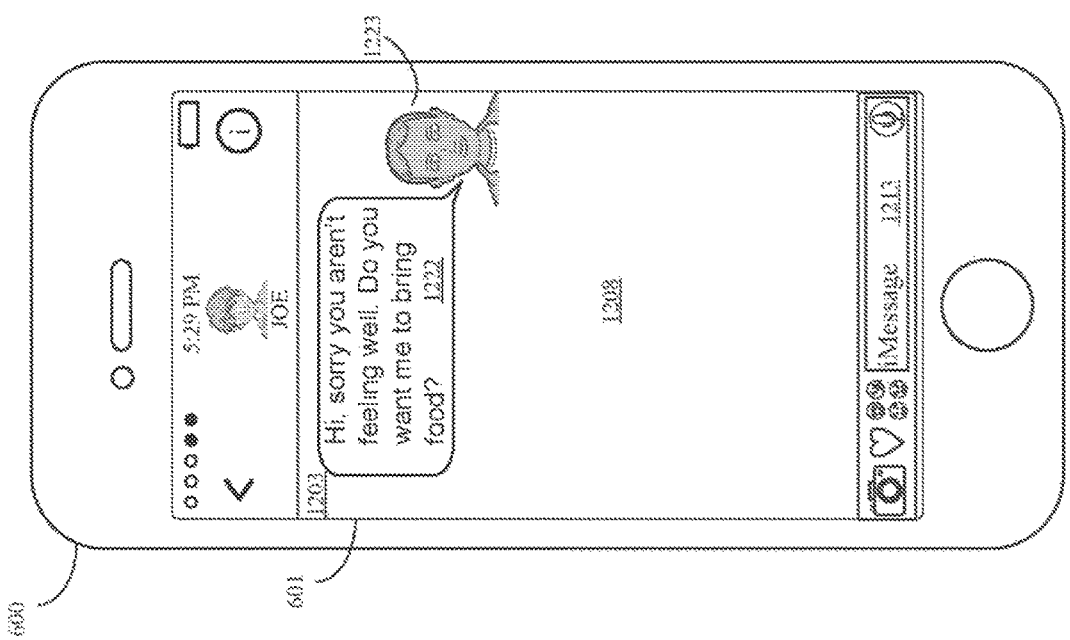

FIG. 12F depicts messaging interface 1203 after a message was received from the other user named "Joe" (e.g., received from an electronic device associated with the other user "Joe"). The content of the message is displayed in text box 1224 in message area 1208. Additionally, an associated avatar 1225 is displayed adjacent text box 1224. Like avatar 1223, avatar 1225 is based on a previously defined avatar or avatar model, except the predefined (e.g., baseline) avatar or avatar model is for "Joe," instead of the user of device 1200. The previously defined avatar or avatar model is, optionally, set by the user of device 1200 or is provided by the other user or by a remote server. Device 1200, optionally, stores the previously defined avatar or avatar model locally or it retrieves the previously defined avatar or avatar model as needed.

Figure 12G:
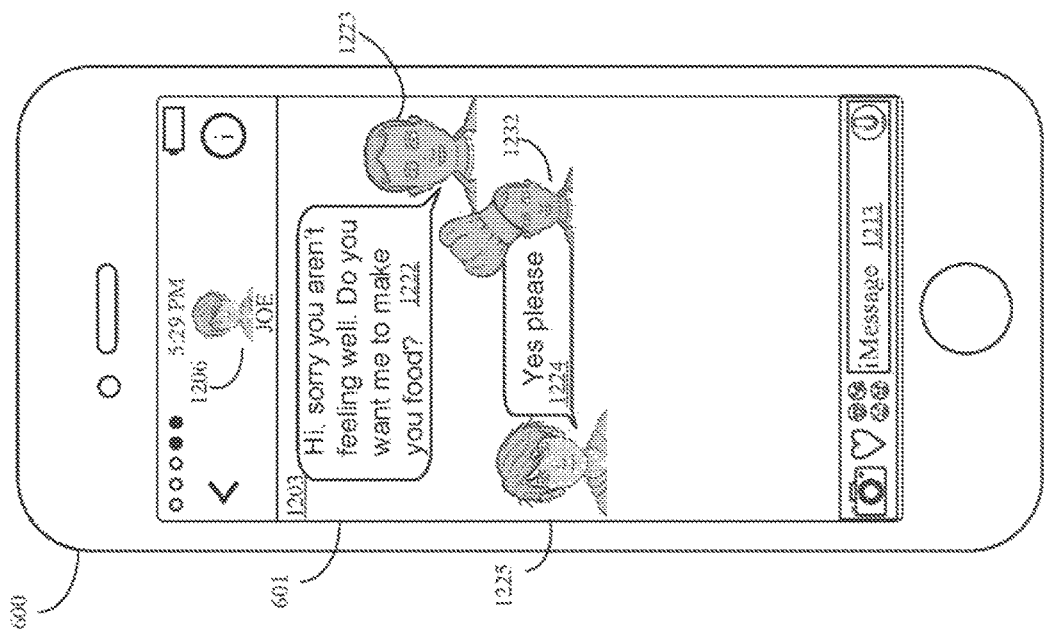

FIG. 12G depicts messaging interface 1203 updated with sticker interface 1227 that is displayed in response to, for example, user selection of sticker button 1212 with touch 1226 in FIG. 12F. Sticker interface 1227 displays three avatar stickers, 1228, 1229, and 1230 that are based on the previously defined (e.g., baseline) avatar or avatar model (e.g., a wire, mesh, or structural model) that represents the user of device 1200. For example, if a recipe is used to define a baseline avatar, the avatar stickers in sticker interface 1227 are generated based on the recipe by, for example, add elements to or modifying existing elements in the avatar recipe. In some embodiments, an avatar recipe is a non-graphical representation of an avatar. For example, in some cases, an avatar recipe is defined using a structured document such as XML or using a data interchange format, such as JSON. The recipe optionally defines an avatar in terms of structural features (e.g., eyes, ears, mouth, hair) and/or various settings (e.g., size, orientation, style, color) of features.

The stickers in sticker interface 1227 are, optionally, generated based on context obtained from, for example, device 600 (e.g., location, weather at the location, calendar appointments) or the messaging interface (e.g., messages that have already been received or sent, and/or message text that has been entered but not sent, and/or the recipient of the sticker).

In FIG. 12G, as an example, sticker 1230 was generated based on the predefined avatar model and information from messaging interface 1203 that indicates the conversation was about making food. Similarly, sticker 1229 was generated based on the predefined avatar model and information form messaging interface 1203 that indicates that the conversation was about the user of device 600 bringing something to Joe. Sticker 1228 was generated based on the predefined avatar model but not based on context from the device 600 or messaging interface 1203. Instead, sticker 1228 is the most commonly used sticker by the user of device 600. Sticker 1228 is animated as indicated by the arrows. Although sticker interface 1227 depicts three stickers, additional stickers, if available, are optionally accessed in the interface via, for example, a horizontal swipe gesture on the interface.

Figure 12H:
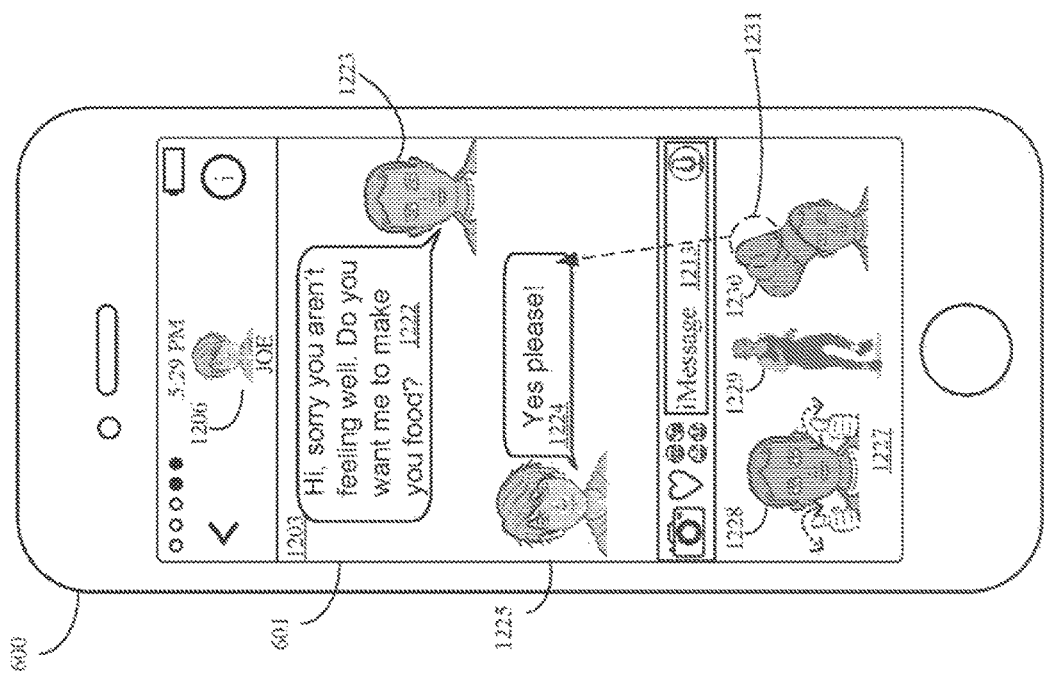

In response to device 600 receiving drag and drop gesture 1231, which drags sticker 1230 from sticker interface 1227 to text box 1224, a sticker is attached to text box 1223. Specifically, sticker 1232, which is identical to sticker 1230 in FIG. 12G, is placed on text box 1224 as depicted in FIG. 12H. Additionally, sticker 1232 is sent to Joe with additional information (e.g., placement information) for similar placement on Joe's text box displayed on Joe's device. In some embodiment, an avatar sticker recipe is sent to Joe representing sticker 1232. In some embodiments, only the additions or modifications to the user of device 600's baseline avatar model are sent to Joe's electronic device if Joe's electronic device already has or can obtain the user of device 600's baseline avatar model.

Figure 12J:
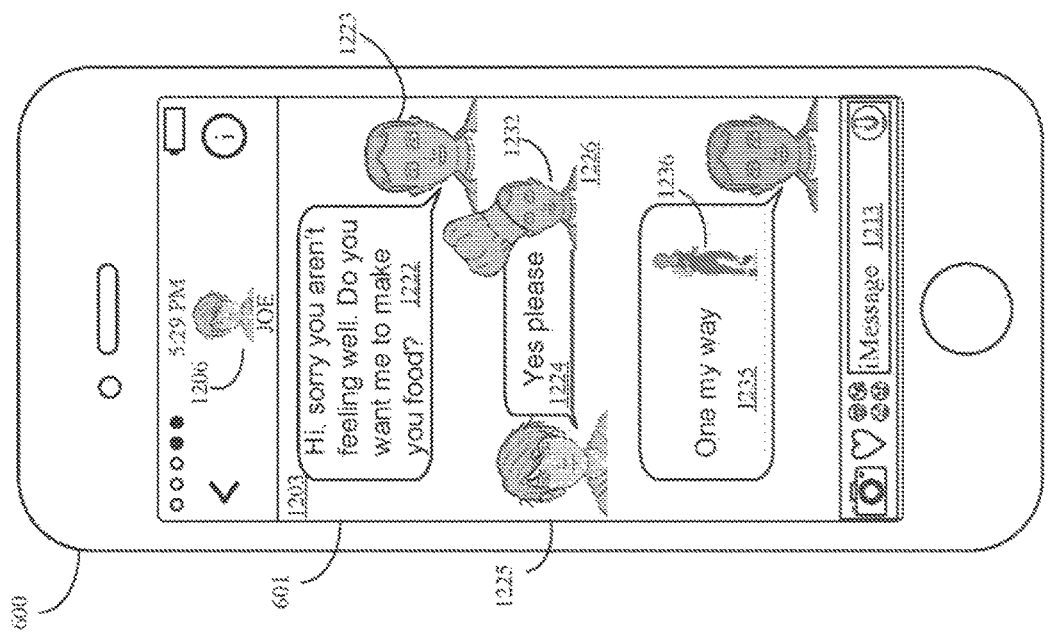
Figure 12I:
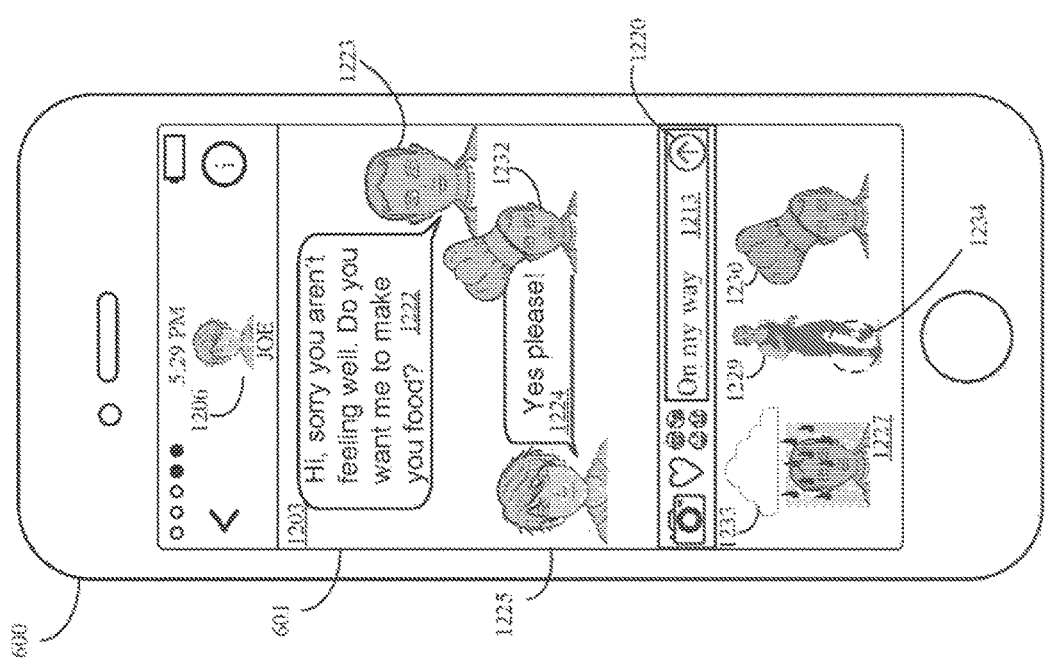

FIG. 12I depicts messaging interface after the user has entered text for a message in text entry field 1213 in a similar manner as described with respect to FIGS. 12A-12D. Additionally, the user has again entered sticker interface 1227. This time, however, a different set of stickers was generated. Specifically, sticker 1233 shows the user's avatar in response to, for example, device 600 determining that it is raining at the user's current location.

In response to a selection of sticker 1229 via, for example, touch 1234, sticker 1229 and the already entered text portion of the message are sent to Joe and displayed in messaging interface 1203 as text box 1235 and sticker 1236, as depicted in FIG. 12J.

FIGS. 13A and 13B are a flow diagram illustrating a method for using avatar stickers in messages on an electronic device in accordance with some embodiments. Method 1300 is performed at a device (e.g., 100, 300, 500) with a display. Some operations in method 1300 are, optionally, combined, the order of some operations are, optionally, changed, and some operations are, optionally, omitted.

As described below, method 1300 provides an intuitive way for using avatar stickers in messages. The method reduces the cognitive burden on a user for using avatar stickers in messages, thereby creating a more efficient human-machine interface. For battery-operated computing devices, enabling a user to use avatar stickers in messages faster and more efficiently conserves power and increases the time between battery charges.

An electronic device (e.g., device 600 of FIG. 12A) has a display (e.g., display 601) and one or more input devices. The electronic device displays (1302) a messaging interface (e.g., 1203) (e.g., a message entry interface after a anther user has been selected) for a messaging application (e.g., iMessages or other messaging applications) for transmitting messages between a first user of the device and other users, wherein the first user is represented in the messaging application by an avatar (e.g., 1233) of the user that distinguishes the first user of the device from other users (e.g., user associated with 1206 and 1225). The electronic device, while displaying the messaging user interface, receives (1304) a first request (e.g., gesture 1226) to display a sticker user interface (e.g., 1227) for selecting stickers (e.g., 1228-1230) to send to a second user.

In response to the first request to display the sticker user interface, the electronic device displays (1306) a sticker user interface that includes a first plurality of avatar stickers (e.g., 1228-1230) generated based on the avatar of the user, including concurrently displaying, on the display: a first avatar sticker (e.g., 1228) generated based on a modification (e.g., to generate an avatar sticker avatar recipe parameters are added, changed, and/or removed from the avatar recipe to generate avatar stickers) of the avatar that represents the user (e.g., 1223) (e.g., modified to be smiling, have an umbrella, or to be running), and a second avatar sticker (e.g., 1229) generated based on a modification of the avatar that represents the user and is different from the first avatar sticker. By modifying an existing avatar to produce avatar stickers for a user, the electronic device is able to operate more efficiently and has more flexibility by being able to change what stickers are generated and/or displayed without having to first generate a baseline avatar, which makes the electronic device more efficient, reduces power usage, and improves battery life of the device.

The electronic device, while displaying the plurality affordance for the avatar selection interface on the display, detects (1308), via the one or more input devices (e.g., display 601), a sequence of one or more inputs (e.g., gesture 1231 or 1234) that corresponds to a request to send a respective avatar sticker (1230) from the first user to the second user via the messaging application. In some examples, the sequence of one or more inputs corresponds to a gesture that selects a sticker, drags the sticker to a particular location in the messaging interface, and releases the selected sticker. In some examples, the sequence of one or more inputs is a tap gesture of a selected sticker for sending to another user.

In response to detecting the sequence of one or more inputs (1310): the electronic device, in accordance with a determination that the sequence of one or more inputs corresponds to selection of the first avatar sticker, sends (1312) the first avatar sticker to the second user from the first user to the second user via the messaging application (e.g., FIGS. 12-12H); and in accordance with a determination that the sequence of one or more inputs corresponds to selection of the second avatar sticker (e.g., 1229), sends (1314) the second avatar sticker from the first user to the second user via the messaging application (e.g., 12I-12J).

In accordance with some embodiments, the avatar of the user is based on an avatar recipe (1316) (e.g., a non-graphical representation of the avatar). In some examples, the avatar recipe is a structured document, such as XML, that defines avatar features and avatar parameters that are used to generate the avatar. In some embodiments, the first avatar sticker was generated (1318) by modifying a first parameter of the avatar recipe for the avatar of the user. In some embodiments, the first avatar sticker (e.g., 1228) is animated (e.g., in the first avatar sticker, the avatar is waving, winking, or being rained on). In some embodiments, the second avatar sticker (e.g., 1230) includes a prop (e.g., an umbrella, a flag, or other object besides the avatar or objects normally associated with the avatar, such as eyeglasses). In some examples, the avatar recipe for the avatar of the user includes a parameter representing an expression or emotion of the user. Optionally, the addition of an expression or emotion parameter to the avatar recipe will affect how multiple features in the first avatar sticker are generated. In one example, a happy emotion changes the appearance of the mouth, eyes, and contour of the face in the corresponding first avatar sticker as compared to the appearance of these features in an avatar sticker generated from an unmodified sticker. In some embodiments, the second avatar sticker was generated (1320) by adding a second parameter to the avatar recipe for the avatar of the user. In some examples, a parameter is added to the avatar recipe, such as a parameter representing an accessory for the avatar. In one example, an umbrella parameter is added so that the avatar sticker will include the avatar generated from the avatar recipe under an umbrella. In some embodiments, sending the first avatar sticker to the second user includes sending a recipe representing the first avatar sticker to the user. By using an avatar recipe to generate and/or transmit the avatar stickers, smaller amounts of data can be transmitted faster and processing requirements are lower, which improves the performance (e.g., battery life and responsiveness) of the electronic devices involved.

In accordance with some embodiments, as part of sending the first avatar sticker to the second user from the first user to the second user via the messaging application the electronic device, in accordance with a determination that a device associated with the second user supports avatar recipes (e.g., the device is using the same messaging application as the first user or a different, compatible messaging application), sends (1322) the first avatar sticker to the second user includes sending a recipe representing the first avatar sticker to the user and in accordance with a determination that the device associated with the second user does not support avatar recipes, sends (1324) a graphical representation of the first avatar sticker to the user. By sending the first avatar stick as a recipe, the electronic device is able to send less data and send it more quickly as compared to sending a graphical representation, which improves the efficient and performance of the electronic device. Additionally, in some embodiments, the data can be reduced even more by only sending the additions or modification to a baseline avatar for the user of the electronic device that the recipient's electronic device already has access to.

In accordance with some embodiments, the sticker user interface is displayed concurrently with at least a portion of the messaging interface (e.g., FIGS. 12G and 12I). In some examples, the sticker interface is displayed overlapping part of the messaging interface. In some examples, the sticker interface is displayed next (e.g., to the left or right or on top of over below) the messaging interface. In some example, the messaging interface is slides to one direction so the sticker interface and the messaging interface are concurrently displayed without the interfaces overlapping. By displaying the sticker user interface with the messaging interface, the electronic device provides for a better user experience that allows the user to review past messages while selecting an avatar sticker to send as part of a message in the messaging application. This improves the man-machine interface by displaying more data on the screen and making sustained interactions with the device easier.

In accordance with some embodiments, the electronic device, prior to receiving the request to display the sticker user interface, receives user input for a textual portion (e.g., 1213) of a user message and sends the textual portion of the user message to the second user via the messaging application after detecting the sequence of one or more inputs (e.g., FIGS. 12I-12J). By allowing for the entry of text before the selection of an avatar sticker, the electronic device enables the user to send a message that incorporates textual content as well as sticker content, which makes the electronic device more efficient, reduces power usage, and improves battery life of the device, by reducing the number of user interactions necessary to send desire information (e.g., the user only has to send one message instead of multiple messages).

In accordance with some embodiments, the electronic device, after sending the first avatar sticker or the second avatar sticker, while displaying the plurality affordance for the avatar selection interface on the display, detecting, via the one or more input devices, a second sequence of one or more inputs that corresponds to a request to send a respective avatar sticker from the first user to the second user via the messaging application (e.g., FIG. 12J). In response to detecting the second sequence of one or more inputs, in accordance with a determination that the sequence of one or more inputs corresponds to selection of the second avatar sticker, the electronic device, sends the second avatar sticker from the first user to the second user via the messaging application.

Figure 14:
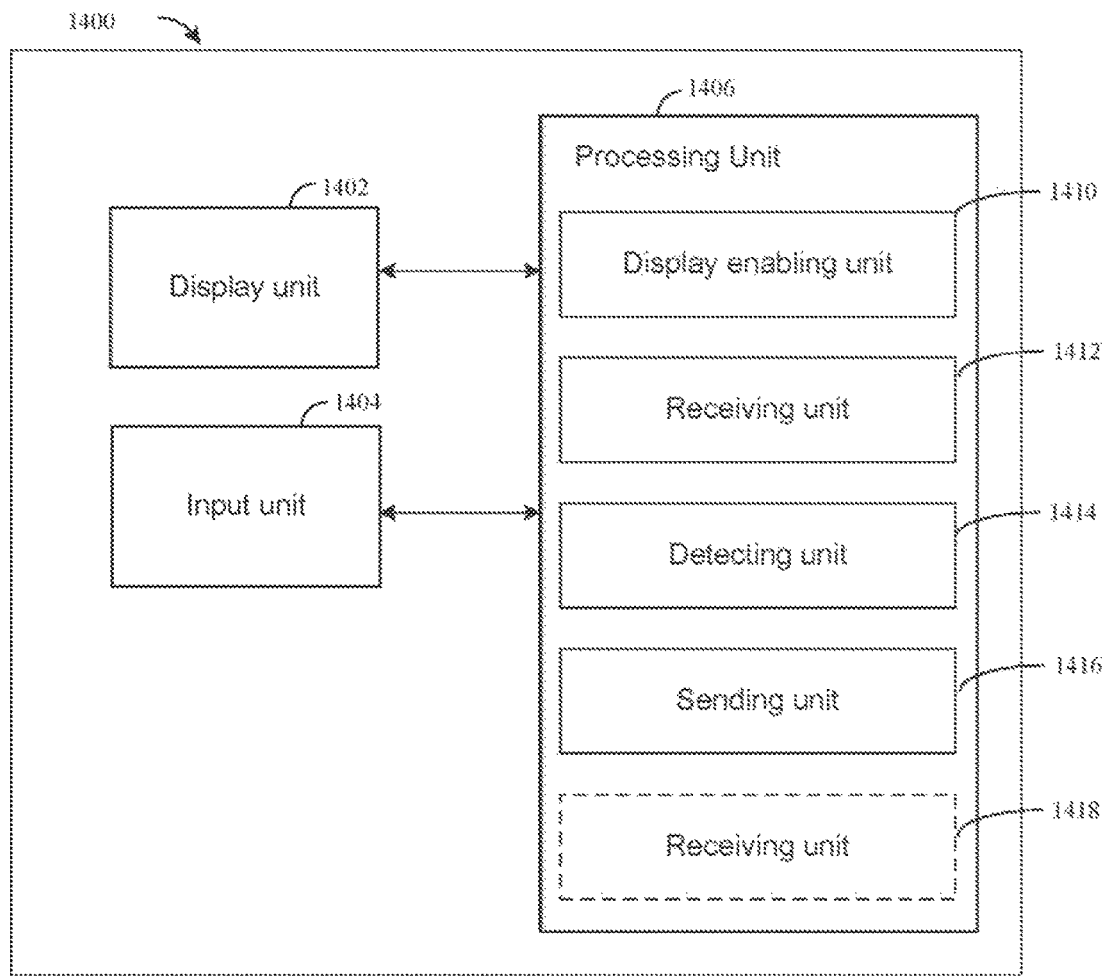
FIG. 14 shows an exemplary functional block diagram of an electronic device.

In accordance with some embodiments, FIG. 14 shows an exemplary functional block diagram of an electronic device 1400 configured in accordance with the principles of the various described embodiments. In accordance with some embodiments, the functional blocks of electronic device 1400 are configured to perform the techniques described above. The functional blocks of the device 1400 are, optionally, implemented by hardware, software, or a combination of hardware and software to carry out the principles of the various described examples. It is understood by persons of skill in the art that the functional blocks described in FIG. 14 are, optionally, combined or separated into sub-blocks to implement the principles of the various described examples. Therefore, the description herein optionally supports any possible combination or separation or further definition of the functional blocks described herein.

As shown in FIG. 14, an electronic device 1400 includes a display unit 1402 configured to display a graphic user interface, an input unit 1104, and a processing unit 1406 coupled to the display unit 1402 and the input unit 1104. In some embodiments, the processing unit 1406 includes a display enabling unit 1410, a receiving unit 1412, a detecting unit 1414, and a sending unit 1416 and, optionally, a receiving unit 1418.

The processing unit 1406 is configured to display (e.g., using display enabling unit 1410) a messaging interface for a messaging application for transmitting messages between a first user of the device and other users, wherein the first user is represented in the messaging application by an avatar of the user that distinguishes the first user of the device from other users. The processing unit 1406 is further configured to, while displaying the messaging user interface, receive (e.g., using receiving unit 1412) a first request to display a sticker user interface for selecting stickers to send to a second user. In response to the first request to display the sticker user interface, the processing unit 1406 is configured to display (e.g., using display enabling unit 1410) a sticker user interface that includes a first plurality of avatar stickers generated based on the avatar of the user, including concurrently displaying, on the display unit: a first avatar sticker generated based on a modification of the avatar that represents the user, and a second avatar sticker generated based on a modification of the avatar that represents the user and is different from the first avatar sticker. The processing unit 1406 is configured to while displaying the plurality affordance for the avatar selection interface on the display, detect (e.g., using detecting unit 1414), via the one or more input devices, a sequence of one or more inputs that corresponds to a request to send a respective avatar sticker from the first user to the second user via the messaging application. In response to detecting the sequence of one or more inputs: the processing unit 1406 is configured to, in accordance with a determination that the sequence of one or more inputs corresponds to selection of the first avatar sticker, send (e.g., using sending unit 1416) the first avatar sticker to the second user from the first user to the second user via the messaging application; and in accordance with a determination that the sequence of one or more inputs corresponds to selection of the second avatar sticker, send (e.g., using sending unit 1416) the second avatar sticker from the first user to the second user via the messaging application.

In some embodiments, the avatar of the user is based on an avatar recipe. In some embodiments, the first avatar sticker was generated by modifying a first parameter of the avatar recipe for the avatar of the user. In some embodiments, the second avatar sticker was generated by adding a second parameter (e.g., a parameter adding an accessory or specifying a facial expression) to the avatar recipe for the avatar of the user. In some embodiments, sending the first avatar sticker to the second user includes sending a recipe representing the first avatar sticker to the second user.

In some embodiments, the processing unit 1406 being configured to send the first avatar sticker to the second user from the first user to the second user via the messaging application further comprises the processing unit 1406 being further configured to, in accordance with a determination that a device associated with the second user supports avatar recipes, send (e.g., using sending unit 1416) the first avatar sticker to the second user includes sending a recipe representing the first avatar sticker to the user; and in accordance with a determination that the device associated with the second user does not support avatar recipes, send (e.g., using sending unit 1416) a graphical representation of the first avatar sticker to the user.

In some embodiments, the sticker user interface is displayed concurrently with at least a portion of the messaging interface. In some embodiments, the first avatar sticker is animated. In some embodiments, the second avatar sticker includes a prop.

In some embodiments the processing unit 1406 is further configured to, prior to receiving the request to display the sticker user interface, receive (e.g., using receiving unit 1418) user input for a textual portion of a user message; and send (e.g., using sending unit 1416) the textual portion of the user message to the second user via the messaging application after detecting the sequence of one or more inputs.

In some embodiments the processing unit 1406 is further configured to, after sending the first avatar sticker or the second avatar sticker, while displaying the plurality affordance for the avatar selection interface on the display, detect, via the one or more input devices, a second sequence of one or more inputs that corresponds to a request to send a respective avatar sticker from the first user to the second user via the messaging application; and in response to detecting the second sequence of one or more inputs, in accordance with a determination that the sequence of one or more inputs corresponds to selection of the second avatar sticker, send the second avatar sticker from the first user to the second user via the messaging application.

The operations described above with reference to FIGS. 13A and 13B are, optionally, implemented by components depicted in FIGS. 1A-1B or FIG. 14. For example, detecting operation 1308 is, optionally, implemented by event sorter 170, display controller 156, and touch-sensitive display system 112. Similarly, it would be clear to a person having ordinary skill in the art how other processes can be implemented based on the components depicted in FIGS. 1A-1B.

FIGS. 15A-15F illustrate exemplary user interfaces for notifications, in accordance with some embodiments. The user interfaces in these figures are used to illustrate the processes described below, including the processes in FIG. 16.

Figure 15A:
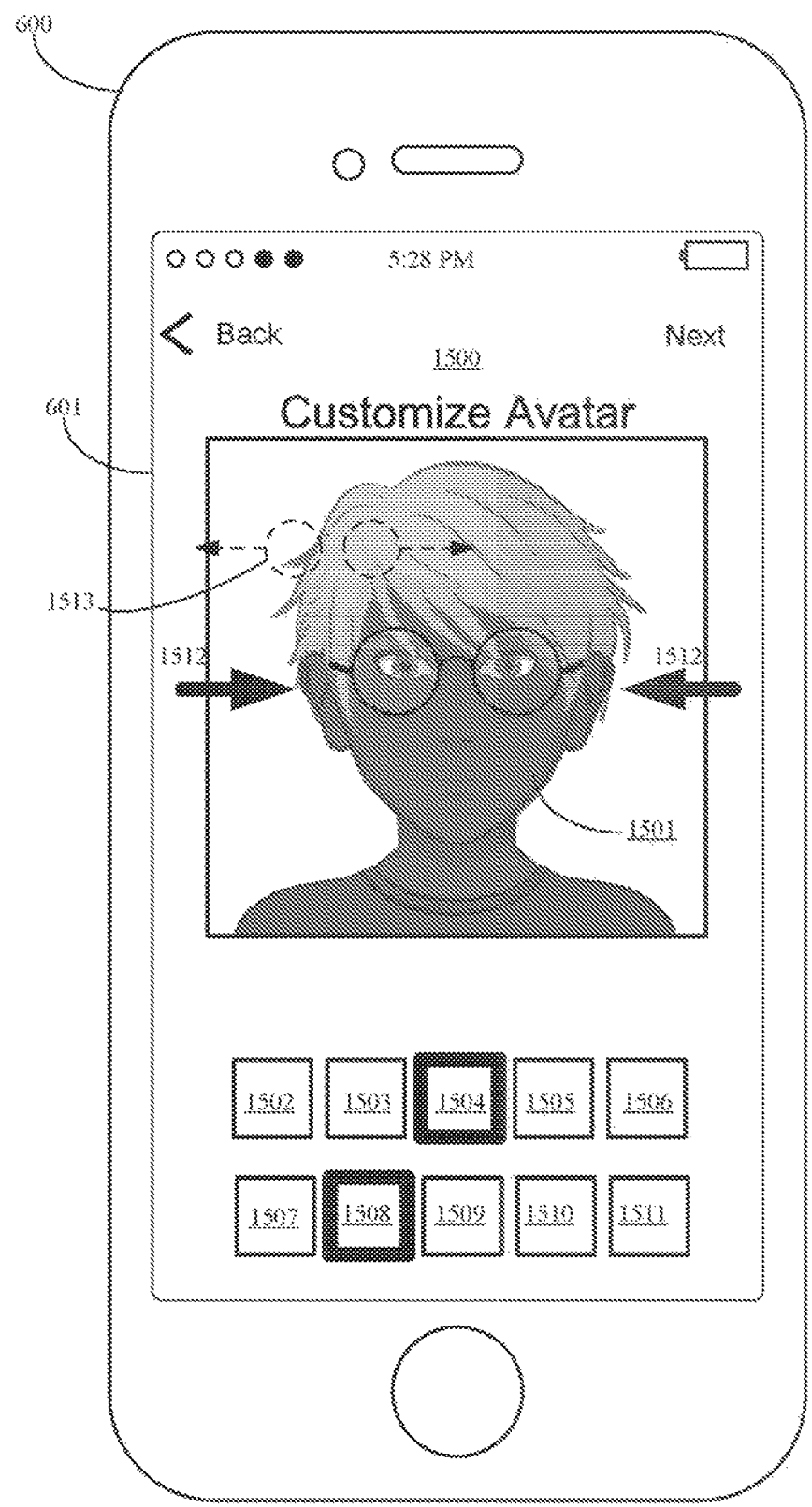
FIGS. 15A-15F illustrate exemplary user interfaces for using gestures to edit an avatar.
Figure 16A:
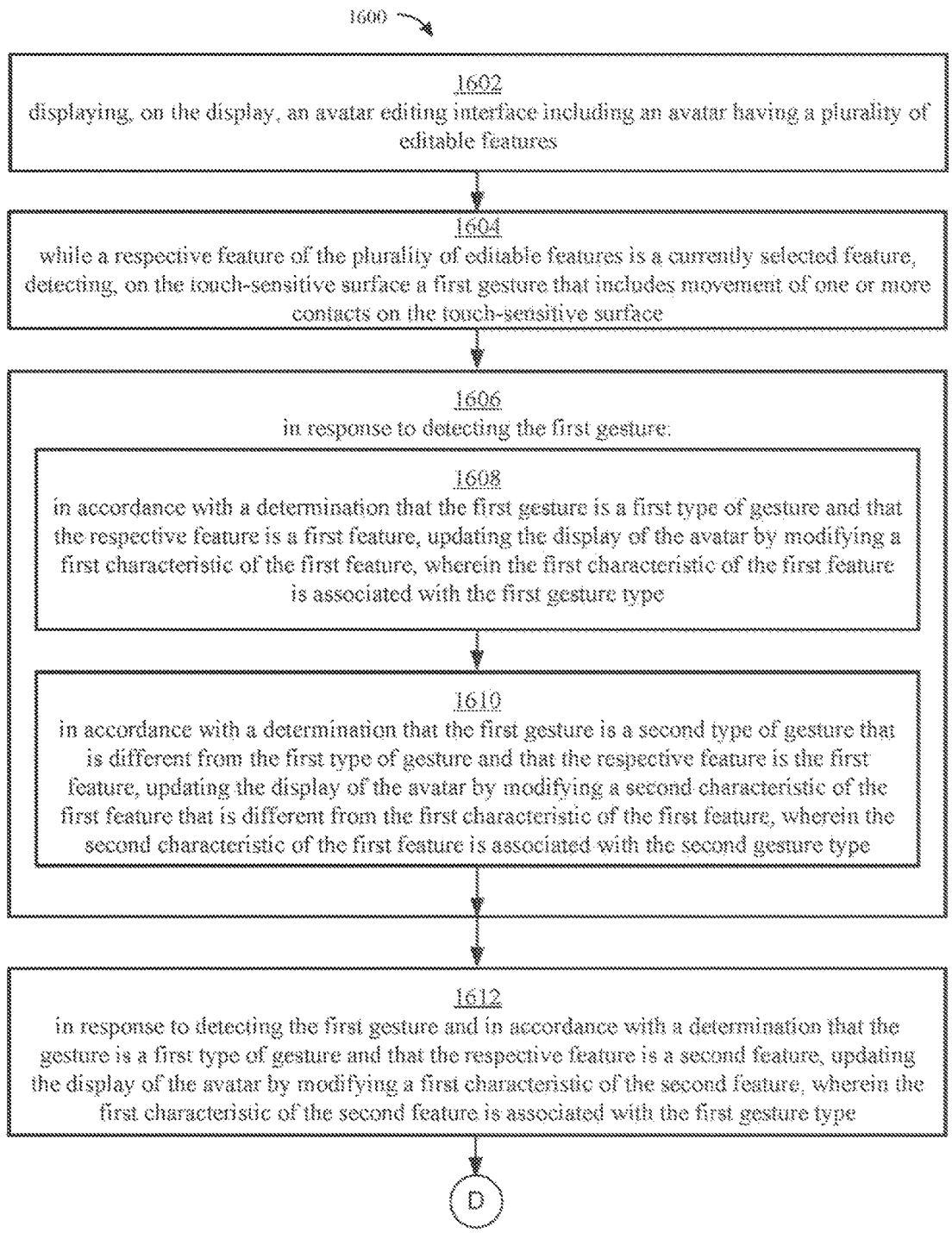
FIGS. 16A-16B is a flow diagram illustrating a method for using gestures to edit an avatar.
Figure 16B:
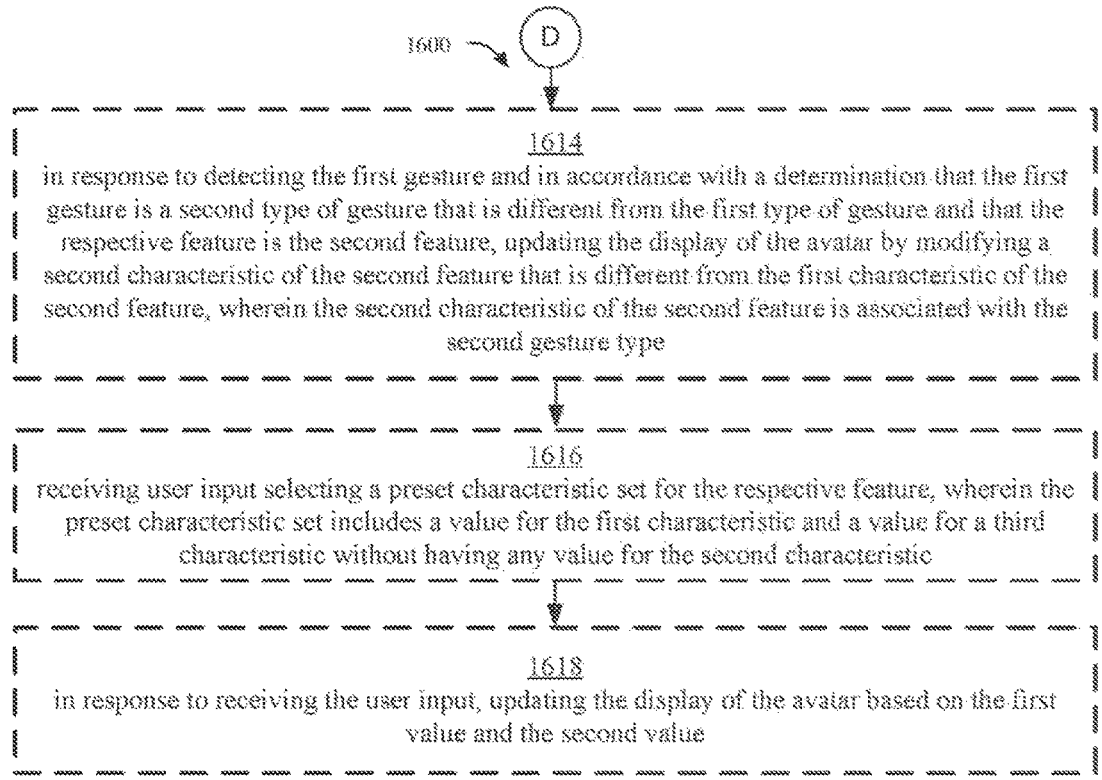

FIG. 15A depicts device 600 (described above with respect to FIG. 6A), which in some examples is a specific form factor for device 100, device 300, or device 500 described above. Device 600 includes display 601, which in some embodiments is a touch-sensitive display.

In FIG. 15A, device 600 is displaying avatar customization interface 1500 on display 601. In some embodiments avatar customization interface 1500 is the same as avatar customization interface 900 described above with respect to FIGS. 9A-9H. Avatar customization interface 1500 includes display of avatar 1501, feature-selection control region containing feature representations 1507-1511, and feature-option control region containing option representations 1502-1506. Feature representations 1507-1511 correspond to avatar features that can be edited in avatar customization interface 1500 and includes an indicator (the bolding around indicator 1508) that identifies a representation that corresponds to a feature that is currently selected for editing. Option representations 1502-1511 correspond to feature options that each correspond to a different style (e.g., shape, size, type) of the selected feature. In some embodiments the feature-selection control region and the feature-option control region are implemented the same as described above with respect to FIGS. 9A-9H.

Avatar customization interface 1500 also includes indicators 1512 that provide a visual indication of what avatar feature is currently selected for editing in the feature-selection control region. In some embodiments, other indicators are used, such as highlighting, circles, movement of the feature, and/or other styles of indicators.

Avatar customization interface 1500 enables editing of the selected avatar feature in response to gestures received on display 601 when display 601 is a touch sensitive display. Device 600 determines the appropriate modification to avatar 1501 based on any of several factors, including the type of gesture (e.g., tap, pinch, drag, rotation), the direction (e.g., vertical, horizontal, clockwise, counter clockwise, expanding, squeezing), the currently selected avatar feature, and/or the location of the gesture.

Figure 15B:
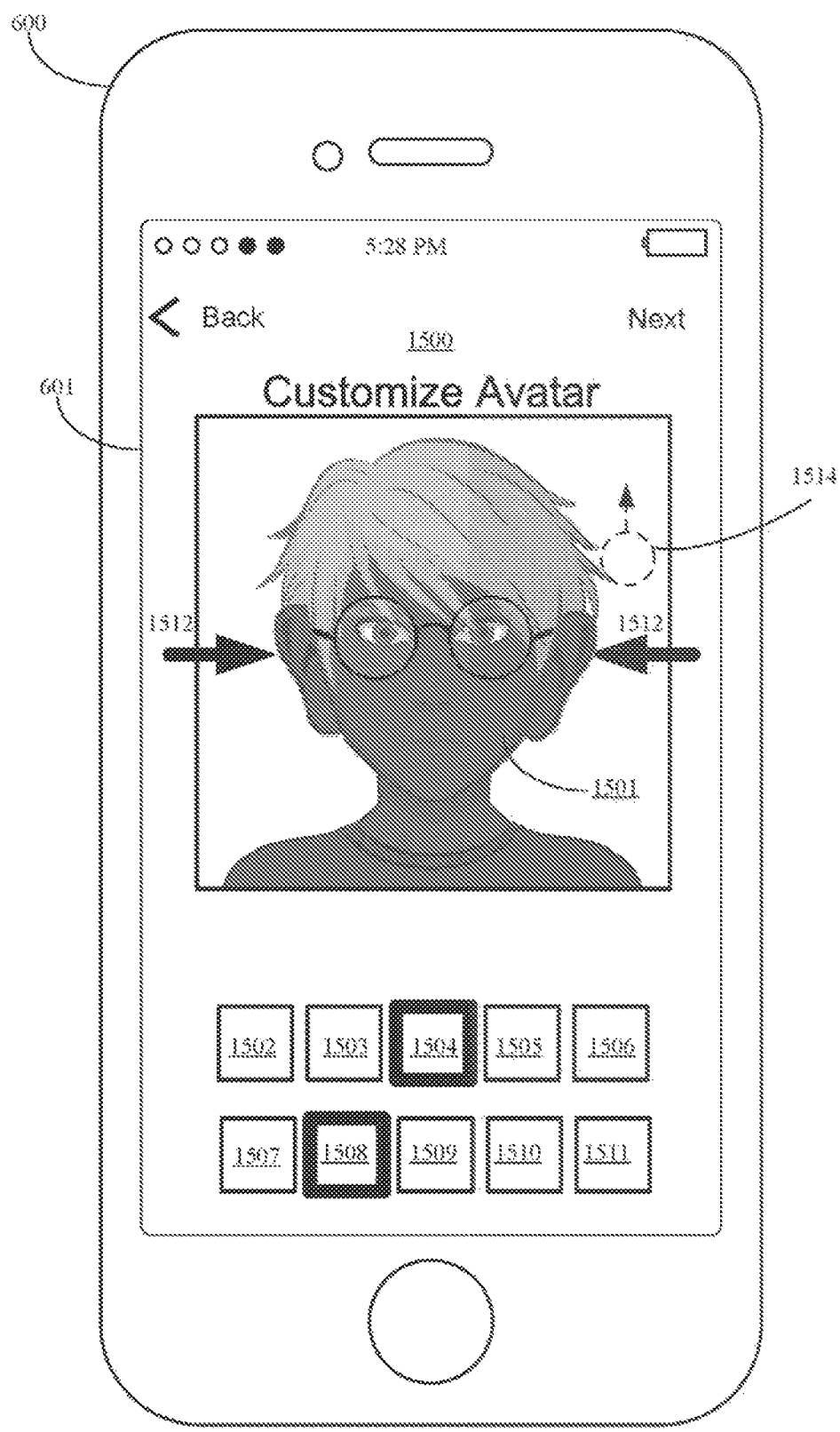

For example, if pinch gesture 1513 in FIG. 15A is received when ears are currently selected for editing (representation 1508 corresponds to ears), device 600 scales the ears in accordance with the pinch gesture (e.g., an expanding pinch grows the ears while a squeezing pinch shrinks the ears). The results of expanding pinch 1513 of FIG. 15A on avatar 1501 are depicted in FIG. 15B. Specifically, in FIG. 15B, the ears on avatar 1501 have increased in scale as compared to the ears of avatar 1501 in FIG. 15A.

Figure 15C:
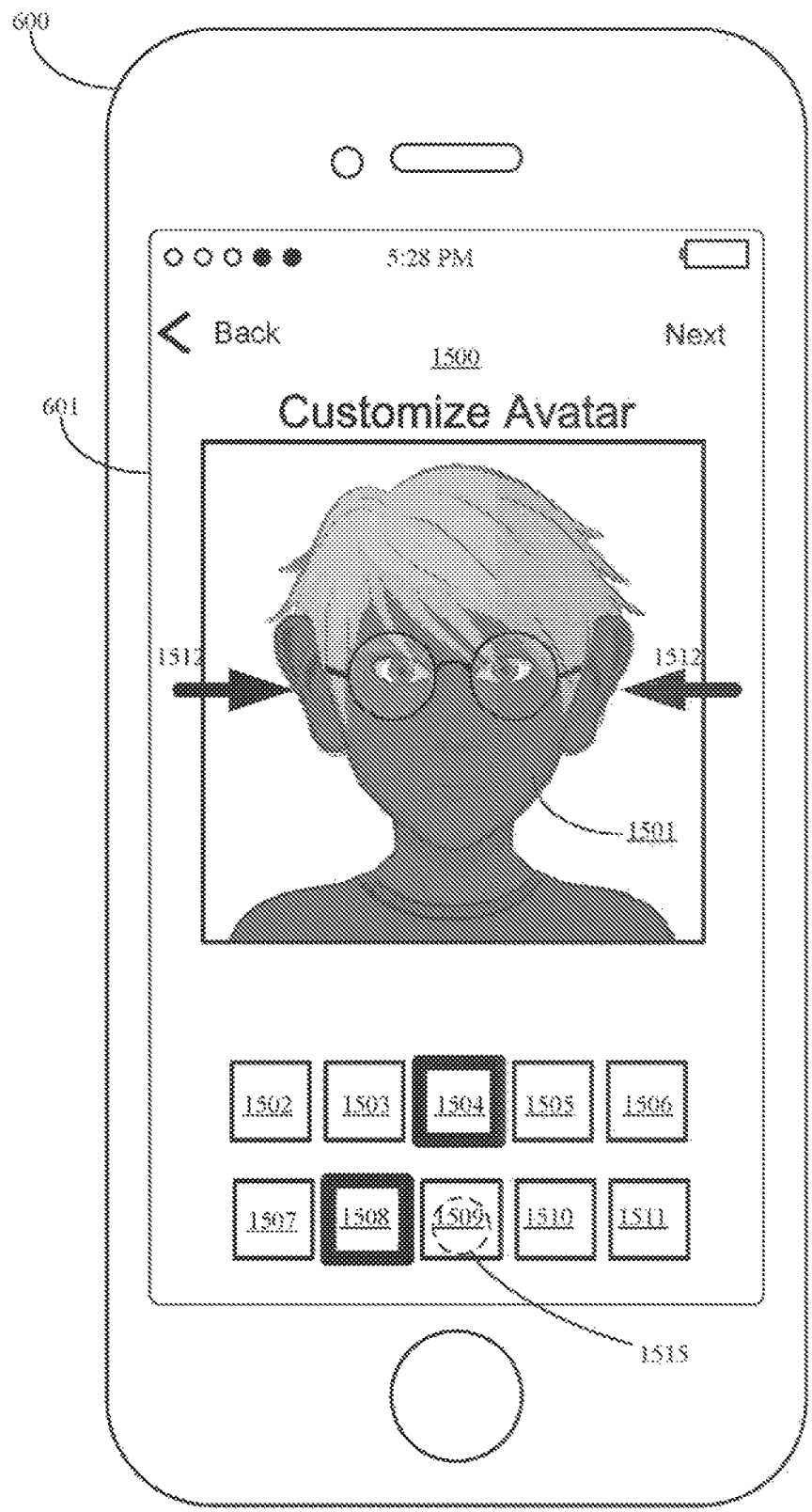

As another example, if vertical drag gesture 1514 of FIG. 15B is received when ears are currently selected for editing (representation 1508 corresponds to ears), device 600 moves the vertical position of the ears in accordance with the drag gesture (e.g., an upward drag moves the ears up while a downward drag moves the ears down). The results of vertical drag 1514 of FIG. 15B on avatar 1501 are depicted in FIG. 15C. Specifically, in FIG. 15C, the ears on avatar 1501 have moved up as compared to the ears of avatar 1501 in FIG. 15B.

Figure 15D:
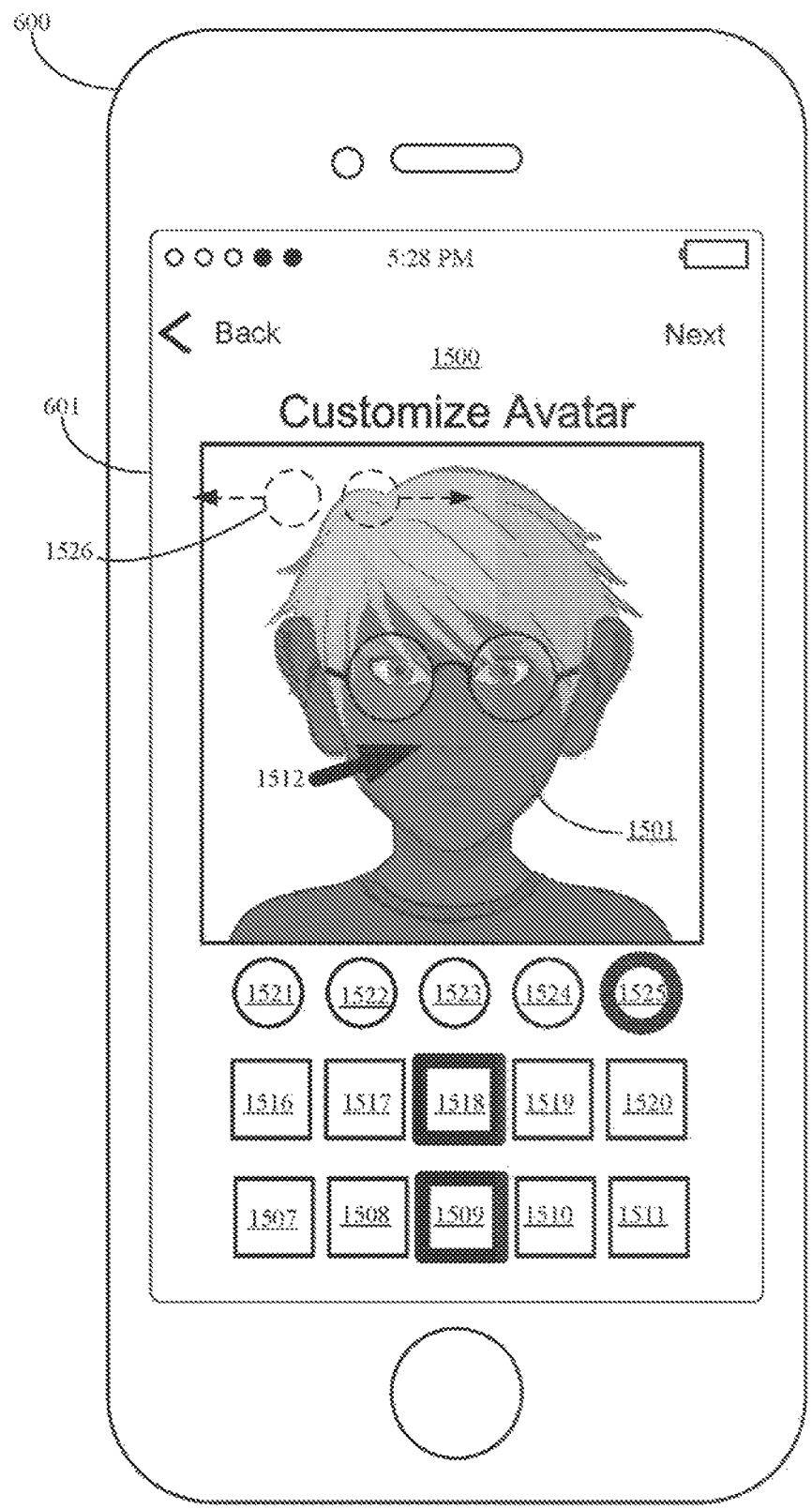

FIG. 15D depicts avatar customization interface 1500 in response to device 600 receiving the selection of a different feature representation (e.g., representation 1509) via, for example, touch 1515 of FIG. 15C. In FIG. 15D, indicator 1512 has moved to show that the feature corresponding to representation 1509 that is selected for editing is the nose. Additionally, feature-option control region now contains new feature option representations 1516-1520. As described with respect to FIGS. 9A-9H above, color-selection control region with color representation 1521-1525 is also displayed with an indication that the color corresponding to representation 1525 is currently selected.

Figure 15E:
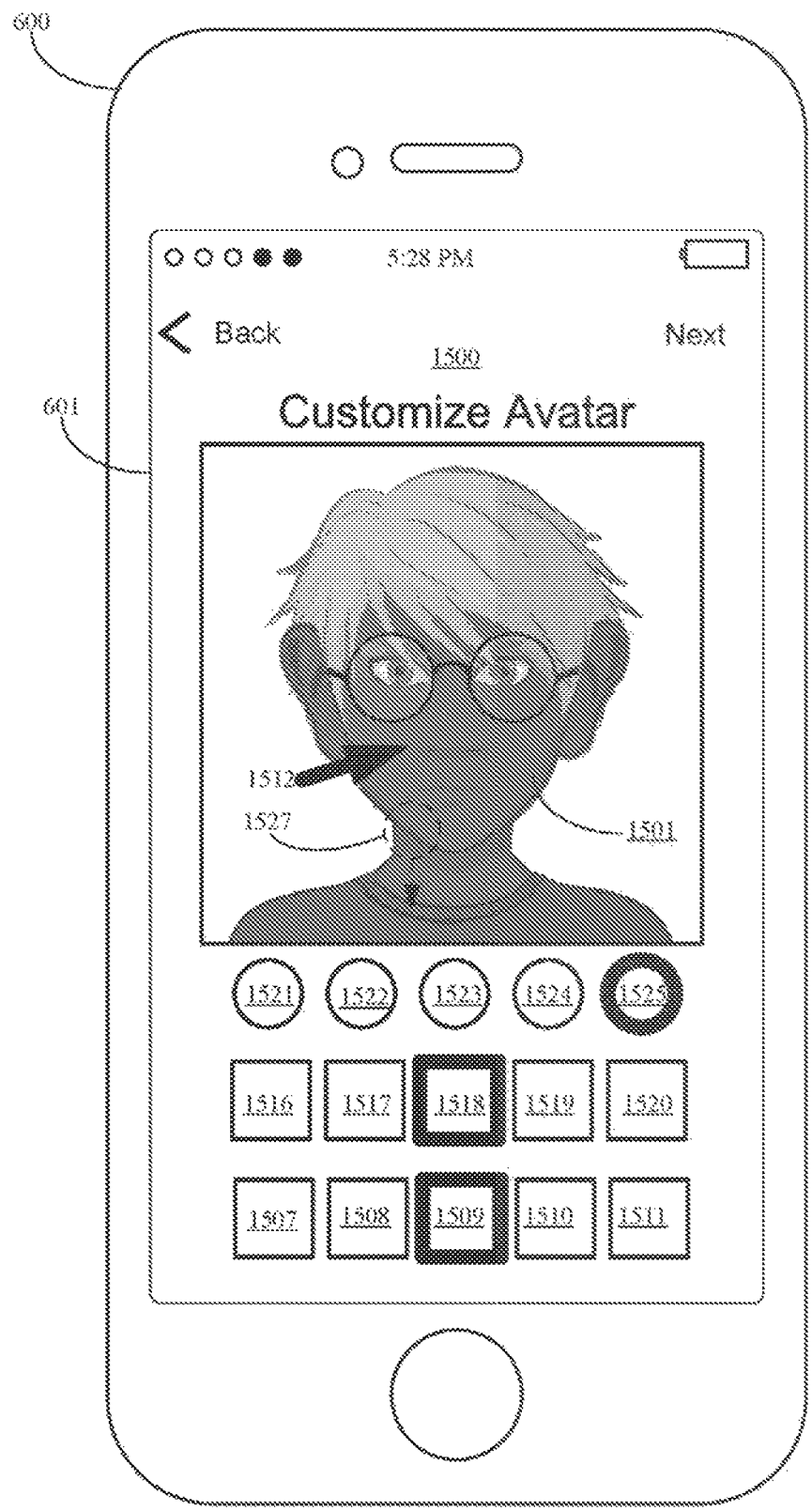

If pinch gesture 1526 in FIG. 15D is received when the nose is currently selected for editing (representation 1509 corresponds to the nose), device 600 changes the nose width in accordance with the pinch gesture (e.g., an expanding pinch widens the nose while a squeezing pinch narrows the nose). The results of expanding pinch 1526 of FIG. 15D on avatar 1501 are depicted in FIG. 15E. Specifically, in FIG. 15E, the nose on avatar 1501 has widened as compared to the nose of avatar 1501 in FIG. 15D. The effect (changing width) of pinch gesture 1526 (FIG. 15D) is different than the effect (changing scale) of pinch gesture 1513 (FIG. A) based on different avatar features being selected for editing.

Figure 15F:
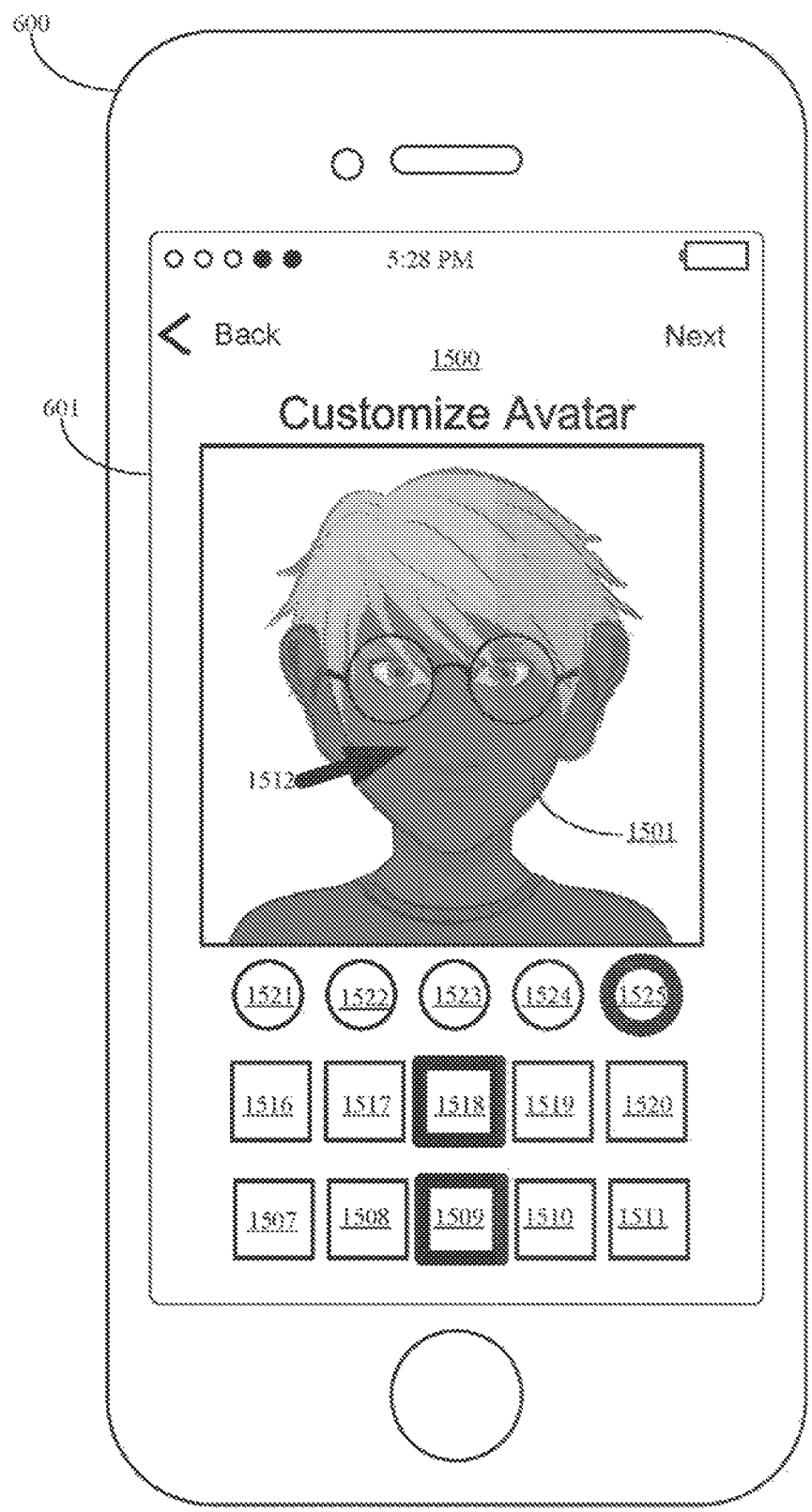

If vertical drag gesture 1527 of FIG. 15E is received when the nose is currently selected for editing (representation 1509 corresponds to the nose), device 600 moves the vertical position of the nose in accordance with the drag gesture (e.g., an upward drag moves the nose up while a downward drag moves the nose down). The results of vertical drag 1527 of FIG. 15E on avatar 1501 are depicted in FIG. 15F. Specifically, in FIG. 15F, the nose on avatar 1501 has moved up as compared to the ears of avatar 1501 in FIG. 15E. In this case, the effect of vertical drag gesture 1514 (FIG. 15B) is the same as the effect of vertical drag gesture 1527 (FIG. 15D) (both gestures result in adjusting the position of the nose), even though different avatar features are selected.

FIG. 16 is a flow diagram illustrating a method for using gestures to edit an avatar on an electronic device in accordance with some embodiments. Method 1600 is performed at a device (e.g., 100, 300, 500) with a display. Some operations in method 1600 are, optionally, combined, the order of some operations are, optionally, changed, and some operations are, optionally, omitted.

As described below, method 1600 provides an intuitive way for using gestures to edit an avatar. The method reduces the cognitive burden on a user for using gestures to edit an avatar, thereby creating a more efficient human-machine interface. For battery-operated computing devices, enabling a user to use gestures to edit an avatar faster and more efficiently conserves power and increases the time between battery charges.

An electronic device has a display and a touch-sensitive surface. The electronic device displays (1602), on the display, an avatar editing interface (e.g., 1500) including an avatar (e.g., 1501) having a plurality of editable features (e.g., an avatar generated from the process described above or an avatar retrieved from memory or a remote server). In some embodiments, the avatar editing interface includes a first selection indicator with feature affordances (e.g., 1512) (e.g., hair, nose, eye brows, eyes, ears, glasses) of one or more of the plurality of editable features selectable for editing.

While a respective feature of the plurality of editable features is a currently selected feature (e.g., feature corresponding to representation 1508), the electronic device detects (1604), on the touch-sensitive surface, a first gesture (e.g., gesture 1513 or gesture 1514) (e.g., a swipe, a pinch, a drag, a rotation) that includes movement of one or more contacts on the touch-sensitive surface.

In response to detecting the first gesture (1606) and in accordance with a determination that the first gesture (e.g., 1513 or 1514) is a first type of gesture (e.g., a pinch) and that the respective feature is a first feature (e.g., ears), the electronic device updates (1608) the display of the avatar by modifying a first characteristic (e.g., FIG. 15B) (e.g., scale of the ears) of the first feature (e.g., increasing or decreasing the scale of the ears), wherein the first characteristic of the first feature is associated with the first gesture type (e.g., the ears scale is associated with the pinch gesture); and in accordance with a determination that the first gesture is a second type of gesture (e.g., a vertical drag) that is different from the first type of gesture and that the respective feature is the first feature (e.g., the ears), the electronic device updates (1610) the display of the avatar by modifying a second characteristic (e.g., FIG. 15C) (e.g., the vertical position) of the first feature (e.g., in response to the vertical drag, modify the position of the ears) that is different from the first characteristic of the first feature, wherein the second characteristic of the first feature is associated with the second gesture type (e.g., the ears' vertical position is associated with the vertical drag gesture). In some examples, the mapping of gesture types to different characteristics of avatar features follows one or more of the rows in Table 1. By mapping different gestures to different characteristics of a single feature, as described in Table 1, the electronic device enhances the avatar editing interface by providing a lot of granularity in modifying features of the avatar while providing a simple and intuitive interface without extra user interface elements. This enables a user to interact with the electronic device using fewer interactions.

TABLE 1

| Gesture | Avatar Feature | Effect |
| --- | --- | --- |
| vertical drag | nose | vertical position |
|  | eyebrows | vertical position |
|  | ears | vertical position |
|  | eyes | vertical position |
|  | mouth | vertical position |
|  | eyeglasses | vertical position |
|  | top of head | vertical size |
|  | chin | vertical size |
| horizontal drag | eye | spacing |
|  | eyebrow spacing | spacing |
| pinch | chin | scale |
|  | ears | scale |
|  | eyeglasses | scale |
|  | nose | width |
|  | mouth | width |
|  | eyebrows | thickness |
| 2-finger rotate | mouth | rotate z-axis |
|  | eyebrows | orientation |
|  | eyes | orientation |
|  | nose | rotate z-axis |
|  | ears | rotate y-axis |

In response to detecting the first gesture (e.g., 1526 or 1527) and in accordance with a determination that the gesture is a first type of gesture (e.g., a pinch gesture) and that the respective feature is a second feature (e.g., nose), the electronic device updates (1612) the display of the avatar by modifying a first characteristic (e.g., FIG. 15E) (e.g., nose width) of the second feature (e.g., in response to the pinch gesture modifying the nose width), wherein the first characteristic of the second feature is associated with the first gesture type (e.g., nose width is associated with pinch gestures). In some embodiments, the first characteristic (e.g., nose width) of the second feature (e.g., nose) is different from the first characteristic (e.g., ears' scale) of the first feature (e.g., ears). By mapping the same gesture to different characteristics for different features, the electronic device provides a simple interface that maintains a high degree of freedom in customizing the avatar with a limited number of simple gestures, which improves the overall man-machine interface for the electronic device.

In accordance with some embodiments the electronic device, in response to detecting the first gesture (e.g., 1526 or 1527) and in accordance with a determination that the first gesture is a second type of gesture (e.g., vertical drag) that is different from the first type of gesture (e.g., a pinch) and that the respective feature is the second feature (e.g., nose), updates (1614) the display of the avatar by modifying a second characteristic (e.g., FIG. 15F) (e.g., vertical position of the nose) of the second feature (e.g., in response to a vertical drag, the vertical position of the nose is adjusted) that is different from the first characteristic (e.g., nose width) of the second feature, wherein the second characteristic of the second feature is associated with the second gesture type (e.g., nose vertical position is associated with vertical drag gestures). In some embodiments, the second characteristic (e.g., width of nose) of the second feature is different from the second characteristic (e.g., scale of ears) of the first feature.

In accordance with some embodiments, the first type of gesture is a pinch gesture, the first feature is a nose, and wherein the first characteristic is the width of the nose. In some embodiments, the second type of gesture is a vertical drag and the second characteristic is the vertical position of the first feature. Examples of other gestures are described above with reference to Table 1.

In accordance with some embodiments, the electronic device, in accordance with a determination that the first gesture modifies the first characteristic beyond a first allowable range for the first characteristic, ceases to modify the first characteristic of the first feature. In some embodiments, the electronic device, during the first gesture, detects an input that corresponds to a modification of the first characteristic beyond an allowable range for the first characteristic. After modifying the first characteristic beyond the allowable range for the first characteristic, the electronic device detects an end of the gesture. In response to detecting the end of the first gesture, the electronic device updates the display of the avatar by modifying the first characteristic of the first feature to be within a second allowable range for the second characteristic. In some examples, user input is received that exceeds an allowable range for the characteristic. In response to the user input, the characteristic is modified beyond the allowable range for the characteristic. In response to the termination of the user input, the display of the characteristic reverts back to an edge or within the allowable range for the characteristic. By putting limits on the amount that certain features can be modified, the electronic device improves avatar customization by ensure that the user does not create an invalid avatar, which wastes resources (e.g., processing time or battery power) of the electronic device.

In accordance with some embodiments, the first gesture is detected at a location on the touch-sensitive surface that is distinct from the location at which the first feature is displayed (FIG. 15D). In some embodiments, how the first gesture affects a characteristic of a feature of the avatar depends on the location of the first gesture.

In accordance with some embodiments, the electronic device receives (1616) user input selecting a preset characteristic set (e.g., 1519) for the respective feature (e.g., 1509) (e.g., a nose), wherein the preset characteristic set includes a value for the first characteristic (e.g., a nose width) and a value for a third characteristic (e.g., a nose length) without having any value for the second characteristic; and in response to receiving the user input, updates (1618) the display of the avatar based on the first value and the second value. In some examples, the preset characteristic set does not include any value for the second characteristic or includes a value for the second characteristic that is overridden by a previous user-set value for the second characteristic. In some embodiments, the third characteristic is not modifiable other than selection of one or more preset characteristic sets. In some embodiments, the display of the avatar based on the value for the first characteristic and the value for the third characteristic is based on a previously user-set value for the second characteristic. In some embodiments, the user input selecting the preset characteristic set is a selection of an affordance associated with the present characteristic, wherein the affordance has a shape representative of one or more values in the preset characteristic set. In some embodiments, in response to receiving the user input, the electronic device requests the preset characteristic set from a remote server. By using previously user-set parameters for a characteristic of an avatar feature, the electronic device enhances the avatar editing interface by minimizing the reentry of parameters and required interactions after a user selects a new preset for a given feature.

Figure 17:
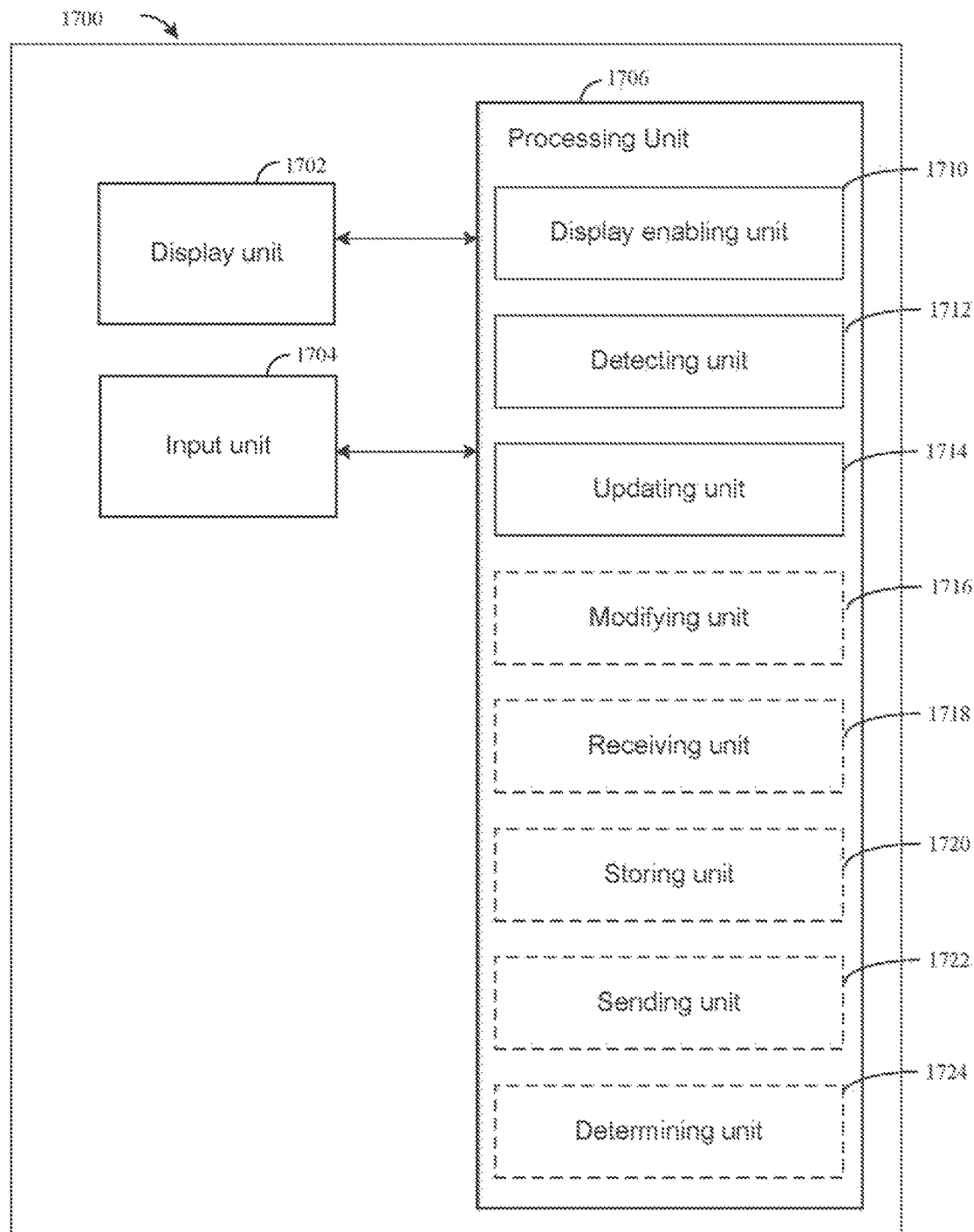
FIG. 17 shows an exemplary functional block diagram of an electronic device.

In accordance with some embodiments, FIG. 17 shows an exemplary functional block diagram of an electronic device 1700 configured in accordance with the principles of the various described embodiments. In accordance with some embodiments, the functional blocks of electronic device 1700 are configured to perform the techniques described above. The functional blocks of the device 1700 are, optionally, implemented by hardware, software, or a combination of hardware and software to carry out the principles of the various described examples. It is understood by persons of skill in the art that the functional blocks described in FIG. 17 are, optionally, combined or separated into sub-blocks to implement the principles of the various described examples. Therefore, the description herein optionally supports any possible combination or separation or further definition of the functional blocks described herein.

As shown in FIG. 17, an electronic device 1700 includes a display unit 1702 configured to display a graphic user interface and a processing unit 1706 coupled to the display unit 1402. In some embodiments, the processing unit 1706 includes a display enabling unit 1710, a detecting unit 1412, an image capturing unit 1414, and a providing unit 1416 and optionally a generating unit 1418, a determining unit 1420, an updating unit 1422, a receiving unit 1424, and a storing unit 1426.

The processing unit 1706 is configured to display (e.g., using display enabling unit 1710), on the display, an avatar editing interface including an avatar having a plurality of editable features. While a respective feature of the plurality of editable features is a currently selected feature, the processing unit 1706 is further configured to detect (e.g., using detecting unit 1712), on the touch-sensitive surface a first gesture that includes movement of one or more contacts on the touch-sensitive surface. In response to detecting the first gesture, the processing unit 1706 is further configured to, in accordance with a determination that the first gesture is a first type of gesture and that the respective feature is a first feature, update (e.g., using updating unit 1714) the display of the avatar by modifying a first characteristic of the first feature, wherein the first characteristic of the first feature is associated with the first gesture type; and in accordance with a determination that the first gesture is a second type of gesture that is different from the first type of gesture and that the respective feature is the first feature, update (e.g., using updating unit 1714) the display of the avatar by modifying a second characteristic of the first feature that is different from the first characteristic of the first feature, wherein the second characteristic of the first feature is associated with the second gesture type.

In some embodiments, the processing unit 1706 is further configured to, in response to detecting the first gesture and in accordance with a determination that the gesture is a first type of gesture and that the respective feature is a second feature, update (e.g., using updating unit 1714) the display of the avatar by modifying a first characteristic of the second feature, wherein the first characteristic of the second feature is associated with the first gesture type. In some embodiments, the first characteristic of the second feature is different from the first characteristic of the first feature.

In some embodiments, the processing unit 1706 is further configured to, in response to detecting the first gesture and in accordance with a determination that the first gesture is a second type of gesture that is different from the first type of gesture and that the respective feature is the second feature, update (e.g., using updating unit 1714) the display of the avatar by modifying a second characteristic of the second feature that is different from the first characteristic of the second feature, wherein the second characteristic of the second feature is associated with the second gesture type.

In some embodiments, the second characteristic of second feature is different from the second characteristic of the first feature. In some embodiments, the avatar editing interface includes a first selection indicator with feature affordances of one or more of the plurality of editable features selectable for editing. In some embodiments, the first type of gesture is a pinch gesture, the first feature is a nose, and wherein the first characteristic is the width of the nose. In some embodiments, the second type of gesture is a vertical drag and the second characteristic is the vertical position of the first feature.

In some embodiments, the processing unit 1706 is further configured to, in accordance with a determination that the first gesture modifies the first characteristic beyond a first allowable range for the first characteristic, cease to modify (e.g., using updating unit 1714) the first characteristic of the first feature.

In some embodiments, the processing unit 1706 is further configured to, during the first gesture, detect (e.g., using detecting unit 1712) an input that corresponds to a modification of the first characteristic beyond an allowable range for the first characteristic; after modifying the first characteristic beyond the allowable range for the first characteristic, detect (e.g., using detecting unit 1712) an end of the gesture; and in response to detecting the end of the first gesture, update (e.g., using updating unit 1714) the display of the avatar by modifying the first characteristic of the first feature to be within a second allowable range for the second characteristic.

In some embodiments, the first gesture is detected at a location on the touch-sensitive surface that is distinct from the location at which the first feature is displayed.

In some embodiments, the processing unit 1706 is further configured to receive (e.g., using receiving unit 1716) user input selecting a preset characteristic set for the respective feature, wherein the preset characteristic set includes a value for the first characteristic and a value for a third characteristic without having any value for the second characteristic; and in response to receiving the user input, update (e.g., using updating unit 1714) the display of the avatar based on the first value and the second value.

In some embodiments, the third characteristic is not modifiable other than selection of one or more preset characteristic sets. In some embodiments, the display of the avatar based on the value for the first characteristic and the value for the third characteristic is based on a previously user-set value for the second characteristic.

In some embodiments, the user input selecting the preset characteristic set is a selection of an affordance associated with the present characteristic, wherein the affordance has a shape representative of one or more values in the preset characteristic set.

In some embodiments, the processing unit 1706 is further configured to, in response to receiving the user input, request (e.g., using requesting unit 1718) the preset characteristic set from a remote server.

The operations described above with reference to FIGS. 16A and 16B are, optionally, implemented by components depicted in FIGS. 1A-1B or FIG. 17. For example, detecting operation 1604 is, optionally, implemented by event sorter 170, display controller 156, and touch-sensitive display system 112. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
   a display;
   one or more processors;
   one or more input devices;
   a memory; and
   one or more programs, wherein the one or more programs are stored in memory and configured to be executed by the one or more processors, the one or more programs including instructions for:
      displaying a messaging interface for a messaging application for transmitting messages between a first user of the device and other users, wherein the first user is represented in the messaging application by an avatar of the user that distinguishes the first user of the device from other users;
      while displaying the messaging interface, receiving a first request to display a sticker user interface for selecting stickers to send to a second user;
      in response to the first request to display the sticker user interface, displaying a sticker user interface that includes a first plurality of avatar stickers generated based on the avatar of the user, including concurrently displaying, on the display:
         a first avatar sticker generated based on a modification of the avatar that represents the user, and
         a second avatar sticker generated based on a modification of the avatar that represents the user and is different from the first avatar sticker;
      while displaying a plurality of affordances for the avatar selection interface on the display, detecting, via the one or more input devices, a sequence of one or more inputs that corresponds to a request to send a respective avatar sticker from the first user to the second user via the messaging application; and
      in response to detecting the sequence of one or more inputs:
         in accordance with a determination that the sequence of one or more inputs corresponds to selection of the first avatar sticker, sending the first avatar sticker to the second user from the first user to the second user via the messaging application; and
         in accordance with a determination that the sequence of one or more inputs corresponds to selection of the second avatar sticker, sending the second avatar sticker from the first user to the second user via the messaging application.

2. The electronic device of claim 1, wherein the avatar of the user is based on an avatar recipe.

3. The electronic device of claim 2, wherein the first avatar sticker was generated by modifying a first parameter of the avatar recipe for the avatar of the user.

4. The electronic device of claim 2, wherein the second avatar sticker was generated by adding a second parameter to the avatar recipe for the avatar of the user.

5. The electronic device of claim 1, wherein sending the first avatar sticker to the second user includes sending a recipe representing the first avatar sticker to the user.

6. The electronic device of claim 1, wherein sending the first avatar sticker to the second user from the first user to the second user via the messaging application comprises:
   in accordance with a determination that a device associated with the second user supports avatar recipes, sending the first avatar sticker to the second user includes sending a recipe representing the first avatar sticker to the user; and
   in accordance with a determination that the device associated with the second user does not support avatar recipes, sending a graphical representation of the first avatar sticker to the user.

7. The electronic device of claim 1, wherein the sticker user interface is displayed concurrently with at least a portion of the messaging interface.

8. The electronic device of claim 1, wherein the first avatar sticker is animated.

9. The electronic device of claim 1, wherein the second avatar sticker includes a prop.

10. The electronic device of claim 1, the one or more programs further including instruction for:
    prior to receiving the request to display the sticker user interface, receiving user input for a textual portion of a user message; and
    sending the textual portion of the user message to the second user via the messaging application after detecting the sequence of one or more inputs.

11. The electronic device of claim 1, the one or more programs further including instructions for:
    after sending the first avatar sticker or the second avatar sticker, while displaying the plurality of affordances for the avatar selection interface on the display, detecting, via the one or more input devices, a second sequence of one or more inputs that corresponds to a request to send a respective avatar sticker from the first user to the second user via the messaging application; and
    in response to detecting the second sequence of one or more inputs, in accordance with a determination that the second sequence of one or more inputs corresponds to selection of the second avatar sticker, sending the second avatar sticker from the first user to the second user via the messaging application.

12. A non-transitory computer readable storage medium storing one or more programs, the one or more programs comprising instructions, which when executed by one or more processors of an electronic device with a display and one or more input devices, cause the electronic device to:
    display a messaging interface for a messaging application for transmitting messages between a first user of the device and other users, wherein the first user is represented in the messaging application by an avatar of the user that distinguishes the first user of the device from other users;

while displaying the messaging interface, receive a first request to display a sticker user interface for selecting stickers to send to a second user;

in response to the first request to display the sticker user interface, display a sticker user interface that includes a first plurality of avatar stickers generated based on the avatar of the user, including concurrently displaying, on the display:

a first avatar sticker generated based on a modification of the avatar that represents the user, and a second avatar sticker generated based on a modification of the avatar that represents the user and is different from the first avatar sticker;

while displaying a plurality of affordances for the avatar selection interface on the display, detect, via the one or more input devices, a sequence of one or more inputs that corresponds to a request to send a respective avatar sticker from the first user to the second user via the messaging application; and in response to detecting the sequence of one or more inputs:

in accordance with a determination that the sequence of one or more inputs corresponds to selection of the first avatar sticker, send the first avatar sticker to the second user from the first user to the second user via the messaging application; and in accordance with a determination that the sequence of one or more inputs corresponds to selection of the second avatar sticker, send the second avatar sticker from the first user to the second user via the messaging application.

13. A method comprising:

at an electronic device having a display and one or more input devices;

displaying a messaging interface for a messaging application for transmitting messages between a first user of the device and other users, wherein the first user is represented in the messaging application by an avatar of the user that distinguishes the first user of the device from other users;

while displaying the messaging interface, receiving a first request to display a sticker user interface for selecting stickers to send to a second user;

in response to the first request to display the sticker user interface, displaying a sticker user interface that includes a first plurality of avatar stickers generated based on the avatar of the user, including concurrently displaying, on the display:

a first avatar sticker generated based on a modification of the avatar that represents the user, and a second avatar sticker generated based on a modification of the avatar that represents the user and is different from the first avatar sticker;

while displaying a plurality of affordances for the avatar selection interface on the display, detecting, via the one or more input devices, a sequence of one or more inputs that corresponds to a request to send a respective avatar sticker from the first user to the second user via the messaging application; and in response to detecting the sequence of one or more inputs:

in accordance with a determination that the sequence of one or more inputs corresponds to selection of the first avatar sticker, sending the first avatar sticker to the second user from the first user to the second user via the messaging application; and in accordance with a determination that the sequence of one or more inputs corresponds to selection of the second avatar sticker, sending the second avatar sticker from the first user to the second user via the messaging application.

\* \* \* \* \*